(12) United States Patent
Allan et al.

(10) Patent No.: US 12,735,352 B2
(45) Date of Patent: Sep. 15, 2026

(54) FOLDABLE SUBSTRATES AND METHODS OF MAKING

(71) Applicant: CORNING INCORPORATED, Corning, NY (US)

(72) Inventors: Douglas Clippinger Allan, Corning, NY (US); Yousef Kayed Qaroush, Painted Post, NY (US); Steven S Rosenblum, San Jose, CA (US); Chuanche Wang, Horseheads, NY (US); Tingge Xu, San Jose, CA (US)

(73) Assignee: CORNING INCORPORATED, Corning, NY (US)

( * ) Notice: Subject to any disclaimer, the term of this patent is extended or adjusted under 35 U.S.C. 154(b) by 3 days.

(21) Appl. No.: 18/689,537

(22) PCT Filed: Sep. 7, 2022

(86) PCT No.: PCT/US2022/042763

§ 371 (c)(1),
(2) Date: Mar. 6, 2024

(87) PCT Pub. No.: WO2023/038977

PCT Pub. Date: Mar. 16, 2023

(65) Prior Publication Data

US 2025/0136501 A1 May 1, 2025

Related U.S. Application Data

(60) Provisional application No. 63/243,300, filed on Sep. 13, 2021.

(51) Int. Cl.
*C03C 21/00* (2006.01)

(52) U.S. Cl.
CPC .......... *C03C 21/008* (2013.01); *C03C 21/002* (2013.01)

(58) Field of Classification Search
CPC ....... C03C 19/00; C03C 21/00–21/008; C03C 23/00–23/0095; G06F 1/00–1/3296
See application file for complete search history.

(56) References Cited

U.S. PATENT DOCUMENTS 8,854,623 B2 10/2014 Fontaine et al.
9,090,501 B2 7/2015 Okahata et al.
(Continued)

FOREIGN PATENT DOCUMENTS

WO 2021/041857 A1 3/2021
WO 2021/041882 A1 3/2021

OTHER PUBLICATIONS

International Search Report and Written Opinion of the International Searching Authority; PCT/US2022/042763; dated Dec. 22, 2022; 10 pages; European Patent Office.
(Continued)

*Primary Examiner* — Prashant J Khatri
(74) *Attorney, Agent, or Firm* — William M. Johnson

(57) ABSTRACT

Foldable substrates comprise a substrate thickness from about 80 micrometers to about 2 millimeters. Foldable substrates comprise a first portion, a second portion, and a central portion positioned therebetween. The central portion comprises a central thickness from about 25 micrometers to about 80 micrometers defined between a first central surface area and a second central surface area. A central total thickness variation of the central portion over the first central surface area is less than or equal to 10 micrometers. The central portion comprises a first transition region extending between a first surface area of the first portion and the first central surface area. The first central surface area is recessed from the first major surface by a first distance. A thickness of the first transition region smoothly and mono-
(Continued)

tonically decreases between the substrate thickness of the first portion and the central thickness of the central portion.

9 Claims, 21 Drawing Sheets

(56) References Cited

U.S. PATENT DOCUMENTS

| | | | |
|---|---|---|---|
| 9,578,150 | B2 | 2/2017 | Xie et al. |
| 9,725,359 | B2 | 8/2017 | Weber |
| 9,779,190 | B2 | 10/2017 | Ahmed et al. |
| 9,898,046 | B2 | 2/2018 | Chang et al. |
| 10,303,218 | B2 | 5/2019 | Jones et al. |
| 2015/0110990 | A1 | 4/2015 | Chou et al. |
| 2018/0009706 | A1 | 1/2018 | Luo et al. |
| 2018/0217639 | A1* | 8/2018 | Jones .................... H05K 1/028 |
| 2019/0022980 | A1 | 1/2019 | Chu et al. |
| 2019/0330103 | A1 | 10/2019 | Ozeki et al. |
| 2020/0292731 | A1* | 9/2020 | Park ..................... G06F 1/1641 |
| 2020/0329575 | A1* | 10/2020 | Park ........................ G02B 1/14 |
| 2022/0169563 | A1 | 6/2022 | Cannon Wilson et al. |
| 2022/0291712 | A1 | 9/2022 | Baby et al. |
| 2023/0309368 | A1 | 9/2023 | Allan et al. |

OTHER PUBLICATIONS

Tandia et al., "Atomistic understanding of the network dilation anomaly in ion-exchanged glass", J. Non-Cryst. Sol. Jan. 2012, 358(2), pp. 316-320.

* cited by examiner 281
212
215
213
2001
2003
217
218
1801
1817
201
1905
1915
1917
1903
1901
243
245
247

281
212
215
213
2101
217
218
201
243
245
247

2201
281
212
215
213
2203
217
218
2215
2205
201
245
2213
243
247

FOLDABLE SUBSTRATES AND METHODS OF MAKING

CROSS-REFERENCE TO RELATED APPLICATIONS

This application is a national stage entry of International Patent Application Serial No. PCT/US2022/042763, filed on Sep. 7, 2022, which in turn, claims the benefit of priority under 35 U.S.C. § 119 of U.S. Provisional Application Ser. No. 63/243,300 filed on Sep. 13, 2021, the contents of each of which are relied upon and incorporated herein by reference in their entireties.

FIELD

The present disclosure relates generally to foldable substrates and methods of making and, more particularly, to foldable substrates comprising a first central surface area recessed from a first major surface and methods of making foldable substrates.

BACKGROUND

Glass-based substrates are commonly used, for example, in display devices, for example, liquid crystal displays (LCDs), electrophoretic displays (EPD), organic light-emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have small minimum bend radii (e.g., about 10 millimeters (mm) or less). However, plastic displays and covers with small minimum bend radii tend to have poor impact and/or puncture resistance. Furthermore, conventional wisdom suggests that ultra-thin glass-based sheets (e.g., about 75 micrometers (μm or microns) or less thick) with small minimum bend radii tend to have poor impact and/or puncture resistance. Furthermore, thicker glass-based sheets (e.g., greater than 125 micrometers) with good impact and/or puncture resistance tend to have relatively large minimum bend radii (e.g., about 30 millimeters or more). Consequently, there is a need to develop foldable apparatus that have low minimum bend radii and good impact and puncture resistance.

SUMMARY

There are set forth herein foldable apparatus comprising foldable substrates, foldable substrates, and methods of making foldable apparatus and foldable substrates comprising foldable substrates that comprise a first portion and a second portion. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) can enable a small parallel plate distance (e.g., about 10 millimeters or less) based on the reduced thickness in the central portion.

In aspects, the foldable apparatus and/or foldable substrates can comprise a plurality of recesses, for example, a first central surface area recessed from a first major surface by a first distance and a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Moreover, providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials can be positioned in the first recess, which can improve impact resistance, puncture resistance, abrasion resistance, and/or scratch resistance of the foldable apparatus. Additionally, controlling properties of a first material positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition region attaching the central portion to the first portion and/or a second transition region attaching the central portion to the second portion. Providing transition regions with smoothly and/or monotonically decreasing (e.g., continuously decreasing) thicknesses can reduce stress concentration in the transition regions and/or avoid optical distortions. Providing a sufficient length of the transition region(s) (e.g., about 0.5 mm or more) can avoid optical distortions that may otherwise exist from a sharp change in thickness of the foldable substrate. Providing a sufficiently small length of the transition regions (e.g., about 2 mm or less) can reduce the amount of the foldable apparatus and/or foldable substrates having an intermediate thickness that may have reduced impact resistance and/or reduced puncture resistance.

Foldable substrates, foldable apparatus, and methods of aspects of the disclosure can reduce (e.g., mitigate, eliminate) the incidence of mechanical instabilities and/or apparatus failure by controlling thickness variations and/or the dimensions of the transition regions. In aspects, a central total thickness variation (TTV) can be minimized to reduce differences in chemical strengthening induced expansion strain in the central portion. In aspects, a width of the first transition region and/or the second transition region can be minimized to reduce a total chemical strengthening induced stress exerted on the central portion by the corresponding transition regions such that a strain of the first central surface area and/or the second central surface area is less than a critical buckling strain (e.g., onset of mechanical instabilities). In aspects, a slope of the first transition region and/or the second transition region can be at least a predetermined amount to reduce an amount of the corresponding transition region comprising intermediate thicknesses, for example, comprising a chemical strengthening induced strain less than a portion of the corresponding transition region closer to the first central surface area and/or the second central surface area and/or than the first central surface area and/or the second central surface area. In further aspects, minimizing the central TTV can be combined with minimizing the width of the transition regions and/or maximizing the slope of the transition regions to further reduce the incidence of mechanical instabilities.

Foldable substrates, foldable apparatus, and methods of aspects of the disclosure can reduce (e.g., mitigate, eliminate) the incidence of mechanical instabilities and/or apparatus failure by controlling a profile of chemical strengthening induced expansion strain along a length of the foldable substrate and/or foldable apparatus. For example, a chemical strengthening induced expansion strain of the first transition region and/or the second transition region can be greater than a chemical strengthening induced expansion strain on the first central surface area and/or the second central surface area (e.g., central portion) by controlling a relationship between a maximum tensile stress and/or an average concentration of one or more alkali-metal ions between these regions. In aspects, providing a maximum first transition tensile stress and/or a maximum second transition tensile stress greater than or equal to a maximum central tensile stress can reduce the incidence of mechanical instabilities (e.g., of the central portion). In aspects, providing a first transition average concentration of one or more alkali metal ions (e.g., potassium) and/or a second transition average concentration of one or more alkali metal ions (e.g., potassium) greater than a central average concentration of one or more alkali metal ions (e.g., potassium) can reduce an incidence of mechanical instabilities (e.g., of the central portion).

Methods of the disclosure can enable making foldable substrates comprising one or more of the above-mentioned benefits. Further, methods can provide one or more of the above relationships throughout the methods—not just in the final foldable substrate. For example, after the first recess and/or second recess are formed or provided, a chemical strengthening induced expansion strain of the first transition region and/or the second transition region can be greater than a chemical strengthening induced expansion strain on the first central surface area and/or the second central surface area (e.g., central portion) by controlling a relationship between a maximum tensile stress and/or an average concentration of one or more alkali-metal ions between these regions throughout the remaining steps in the methods.

In aspects, one or more of the above relationships can be maintained by reducing or reversing chemical strengthening of the central portion relative to the first portion and/or the second portion. In further aspects, a layer can be disposed over the central portion with a decreased diffusivity of one or more alkali metal ions to reduce a chemical strengthening induced expansion strain on the first central surface area and/or the second central surface area. In even further aspects, tapering a thickness of the layer over the first transition region and/or the second transition region can provide chemical strengthening induced expansion strain of the corresponding transition regions greater than chemical strengthening induced expansion strain of the first central surface area and/or the second central surface area, which can reduce the incidence of mechanical instabilities. In further aspects, an alkali-metal ion-containing paste comprising sodium and/or lithium can be disposed over the central portion (e.g., first central surface area and/or the second central surface area) to decrease (e.g., relatively or absolutely) a chemical strengthening induced expansion strain of the corresponding portion by exchanging larger alkali-metal ions in the corresponding portion for smaller alkali-metal ions in the alkali-metal ion-containing paste, which can reduce an incidence of mechanical instabilities.

In aspects, one or more of the above relationships can be maintained by increasing chemical strengthening of the first transition region and/or the second transition region relative to the central portion (e.g., first central surface area and/or the second central surface area). In further aspects, an alkali-metal ion-containing paste can be disposed over the first transition region and/or the second transition region to increase a chemical strengthening induced expansion strain of the corresponding transition regions. In even further aspects, tapering a thickness of the alkali-metal ion-containing paste over the first transition region and/or the second transition region away from a midline of the corresponding transition region can further provide the relationship between chemical strengthening induced expansion strain of the different portions of the foldable substrate discussed above. In further aspects, a diffusivity of one or more alkali metal ions can be locally increased for the first transition region and/or the second transition region, for example, by locally heating the corresponding regions during chemically strengthening the foldable substrate. Chemically strengthening the central portion to an extent can achieve greater compressive stresses without encountering mechanical deformation and/or mechanical instability, and the greater compressive stresses can further increase the impact and/or puncture resistance of the foldable substrate.

Some example aspects of the disclosure are described below with the understanding that any of the features of the various aspects may be used alone or in combination with one another.

Aspect 1. A foldable substrate comprising:

a substrate thickness in a range from about 80 micrometers to about 2 millimeters defined between a first major surface and a second major surface opposite the first major surface;

a first portion comprising the substrate thickness, a first compressive stress region extending from a first surface area of the first major surface, and a second compressive stress region extending from a second surface area of the second major surface;

a second portion comprising the substrate thickness, a third compressive stress region extending from a third surface area of the first major surface, and a fourth compressive stress region extending from a fourth surface area of the second major surface; and a central portion positioned between the first portion and the second portion, the central portion comprising:

a central thickness in a range from about 25 micrometers to about 80 micrometers defined between a first central surface area and a second central surface area opposite the first central surface area, a first central compressive stress region extending from the first central surface area, a second central compressive stress region extending from the second central surface area, and a central total thickness variation (TTV) of the central portion over the first central surface area is less than or equal to 10 micrometers;

a first transition region comprising a first transition surface area extending between the first surface area and the first central surface area, a first transition compressive stress region extending from the first transition surface area; and a second transition region comprising a third transition surface area extending between the third surface area and the first central surface area, a third transition compressive stress region extending from the third transition surface area, wherein the first central surface area is recessed from the first major surface by a first distance, a thickness of the first transition region smoothly and monotonically decreases between the substrate thickness of the first portion and the central thickness of the central portion, a thickness of the second transition region smoothly and monotonically decreases between the substrate thickness of the second portion and the central thickness of the central portion, and a first transition width of the first transition region is less than or equal to 2.2 millimeters minus a product of the central TTV in micrometers and 0.2 millimeters per micrometer.

Aspect 2. The foldable substrate of aspect 1, wherein a second transition width of the second transition region is less than or equal to 2.2 millimeters minus the product of the central TTV in micrometers and 0.2 millimeters per micrometer.

Aspect 3. The foldable substrate of any one of aspects 1-2, wherein the central TTV is about 7 micrometers or less and the first transition width is in a range from about 0.5 millimeters to about 0.8 millimeters.

Aspect 4. The foldable substrate of any one of aspects 1-2, wherein the central TTV is about 2 micrometers or less and the first transition width is in a range from about 0.5 millimeters to about 1.8 millimeters.

Aspect 5. The foldable substrate of any one of aspects 1-2, wherein the first transition surface area comprises a first average transition slope, the third transition surface area comprises a second average transition slope, and the first average transition slope in millimeters per millimeter is greater than or equal to 5 micrometers per millimeter times a quotient of a first quantity in millimeters consisting of the substrate thickness minus the central thickness and a second quantity in micrometers consisting of 11 micrometers minus the central TTV.

Aspect 6. A foldable substrate comprising:

a substrate thickness in a range from about 80 micrometers to about 2 millimeters defined between a first major surface and a second major surface opposite the first major surface;

a first portion comprising the substrate thickness, a first compressive stress region extending from a first surface area of the first major surface, and a second compressive stress region extending from a second surface area of the second major surface;

a second portion comprising the substrate thickness, a third compressive stress region extending from a third surface area of the first major surface, and a fourth compressive stress region extending from a fourth surface area of the second major surface; and a central portion positioned between the first portion and the second portion, the central portion comprising:

a central thickness in a range from about 25 micrometers to about 80 micrometers defined between a first central surface area and a second central surface area opposite the first central surface area, a first central compressive stress region extending from the first central surface area, a second central compressive stress region extending from the second central surface area, and a central total thickness variation (TTV) of the central portion over the first central surface area;

a first transition region comprising a first transition surface area extending between the first surface area and the first central surface area, a first transition compressive stress region extending from the first transition surface area; and a second transition region comprising a third transition surface area extending between the third surface area and the first central surface area, a third transition compressive stress region extending from the third transition surface area, wherein the first central surface area is recessed from the first major surface by a first distance, a thickness of the first transition region smoothly and monotonically decreases between the substrate thickness of the first portion and the central thickness of the central portion with the first transition surface area comprising a first average transition slope, a thickness of the second transition region smoothly and monotonically decreases between the substrate thickness of the second portion and the central thickness of the central portion with the third transition surface area comprising a second average transition slope, and the first average transition slope in millimeters per millimeter is greater than or equal to 5 micrometers per millimeter times a quotient of a first quantity in millimeters consisting of the substrate thickness minus the central thickness and a second quantity in micrometers consisting of 11 micrometers minus the central TTV.

Aspect 7. The foldable substrate of any one of aspects 5-6, wherein the second average transition slope is greater than or equal to 5 micrometers per millimeter times a quotient of a first quantity in millimeters consisting of the substrate thickness minus the central thickness and a second quantity in micrometers consisting of 11 micrometers minus the central TTV.

Aspect 8. The foldable substrate of any one of aspects 5-7, wherein the central TTV is about 5 micrometers or less.

Aspect 9. The foldable substrate of aspect 8, wherein the first average transition slope is about 0.058 millimeters per millimeters or more.

Aspect 10. The foldable substrate of any one of aspects 5-9, wherein the central TTV is about 2 micrometers or less.

Aspect 11. The foldable substrate of any one of aspects 1-10, further comprising:

a central average concentration of one or more alkali-metal ions associated with the first central compressive stress region and the second central compressive stress region;

a first transition average concentration of one or more alkali-metal ions associated with the first transition compressive stress region and a second transition compressive stress region; and a second transition average concentration of one or more alkali-metal ions associated with the third transition compressive stress region and a fourth transition compressive stress region, wherein the first transition average concentration of the one or more alkali-metal ions is greater than or equal to the central average concentration of the one or more alkali-metal ions.

Aspect 12. A foldable substrate comprising:

a substrate thickness in a range from about 80 micrometers to about 2 millimeters defined between a first major surface and a second major surface opposite the first major surface;

a first portion comprising the substrate thickness, a first compressive stress region extending from a first surface area of the first major surface, and a second compressive stress region extending from a second surface area of the second major surface;

a second portion comprising the substrate thickness, a third compressive stress region extending from a third surface area of the first major surface, and a fourth compressive stress region extending from a fourth surface area of the second major surface; and a central portion positioned between the first portion and the second portion, the central portion comprising:

a central thickness in a range from about 25 micrometers to about 80 micrometers defined between a first central surface area and a second central surface area opposite the first central surface area, and a central average concentration of one or more alkali-metal ions associated with a first central compressive stress region extending from the first central surface area and a second central compressive stress region extending from the second central surface area;

a first transition region comprising a first transition surface area extending between the first surface area and the first central surface area, a second transition surface area extending between the second surface area and the second central surface area, and a first transition average concentration of one or more alkali-metal ions associated with a first transition compressive stress region extending from the first transition surface area and a second transition compressive stress region extending from the second transition surface area; and a second transition region comprising a third transition surface area extending between the third surface area and the first central surface area, a fourth transition surface area extending between the fourth surface area and the second central surface area, and a second transition average concentration of one or more alkali-metal ions associated with a third transition compressive stress region extending from the third transition surface area and a fourth transition compressive stress region extending from a fourth transition surface area, wherein the first central surface area is recessed from the first major surface by a first distance, and the first transition average concentration of the one or more alkali-metal ions is greater than or equal to the central average concentration of the one or more alkali-metal ions.

Aspect 13. The foldable substrate of any one of aspects 11-12, wherein the second transition average concentration of the one or more alkali-metal ions is greater than or equal to the central average concentration of the one or more alkali-metal ions.

Aspect 14. The foldable substrate of any one of aspects 11-13, wherein the first portion comprises a first average concentration of one or more alkali-metal ions associated with the first compressive stress region and the second compressive stress region, and the first average concentration of the one or more alkali-metal ions is greater than or equal to the first transition average concentration of the one or more alkali-metal ions.

Aspect 15. The foldable substrate of any one of aspects 11-14, wherein the one or more alkali-metal ions for the central average concentration, the first transition average concentration, and the second transition average concentration is potassium.

Aspect 16. The foldable substrate of any one of aspects 11-15, wherein:

the first transition region further comprises a second transition surface area extending between the second surface area and the second central surface area;

the second transition region further comprises a fourth transition surface area extending between the fourth surface area of the second portion and the second central surface area; and the second central surface area is recessed from the second major surface by a second distance.

Aspect 17. The foldable substrate of aspect 11-16, further comprising:

a central tensile stress region comprising a maximum central tensile stress positioned between the first central compressive stress region and the second central compressive stress region;

a first transition tensile stress region comprising a maximum first transition tensile stress positioned between the first transition compressive stress region and the second transition compressive stress region; and a second transition tensile stress region comprising a maximum second transition tensile stress positioned between the third transition compressive stress region and the fourth transition compressive stress region, wherein the maximum first transition tensile stress is greater than or equal to the maximum central tensile stress.

Aspect 18. A foldable substrate comprises:

a substrate thickness in a range from about 80 micrometers to about 2 millimeters defined between a first major surface and a second major surface opposite the first major surface;

a first portion comprising the substrate thickness, a first compressive stress region extending from a first surface area of the first major surface, and a second compressive stress region extending from a second surface area of the second major surface;

a second portion comprising the substrate thickness, a third compressive stress region extending from a third surface area of the first major surface, and a fourth compressive stress region extending from a fourth surface area of the second major surface; and a central portion positioned between the first portion and the second portion, the central portion comprising:

a central thickness in a range from about 25 micrometers to about 80 micrometers defined between a first central surface area and a second central surface area opposite the first central surface area, and a central tensile stress region comprising a maximum central tensile stress positioned between a first central compressive stress region extending from the first central surface area and a second central compressive stress region extending from the second central surface area;

a first transition region comprising a first transition surface area extending between the first surface area and the first central surface area, a second transition surface area extending between the second surface area and the second central surface area, and a first transition tensile stress region comprising a maximum first transition tensile stress positioned between a first transition compressive stress region extending from the first transition surface area and a second transition compressive stress region extending from the second transition surface area; and a second transition region comprising a third transition surface area extending between the third surface area of the second portion and the first central surface area, a fourth transition surface area extending between the fourth surface area of the second portion and the second central surface area, and a second transition tensile stress region comprising a maximum second transition tensile stress positioned between a third transition compressive stress region extending from the third transition surface area and a fourth transition compressive stress region extending from the fourth transition surface area, wherein the first central surface area is recessed from the first major surface by a first distance, the second central surface area is recessed from the second major surface by a second distance, and the maximum first transition tensile stress is greater than or equal to the maximum central tensile stress.

Aspect 19. The foldable substrate of any one of aspects 17-18, wherein the maximum second transition tensile stress is greater than or equal to the maximum central tensile stress.

Aspect 20. The foldable substrate of any one of aspects 17-19, wherein the first portion comprises a first tensile stress region positioned between the first compressive stress region and the second compressive stress region, and the maximum first transition tensile stress is less than or equal to a maximum first tensile stress of the first tensile stress region.

Aspect 21. The foldable substrate of any one of aspects 16-20, wherein the second distance is from about 5% to about 20% of the substrate thickness.

Aspect 22. The foldable substrate of any one of aspects 16-21, wherein the first distance is substantially equal to the second distance.

Aspect 23. The foldable substrate of any one of aspects 1-22, wherein the first distance is about 20% to about 45% of the substrate thickness.

Aspect 24. The foldable substrate of any one of aspects 1-23, wherein the first central surface area comprises a maximum out-of-plane deviation of about 2 micrometers or less.

Aspect 25. The foldable substrate of any one of aspects 1-24, wherein the substrate thickness is in a range from about 125 micrometers to about 200 micrometers.

Aspect 26. The foldable substrate of any one of aspects 1-25, wherein the central thickness is in a range from about 25 micrometers to about 60 micrometers.

Aspect 27. The foldable substrate of any one of aspects 1-26, wherein the foldable substrate comprises a glass-based substrate.

Aspect 28. The foldable substrate of any one of aspects 1-27, wherein the foldable substrate comprises a ceramic-based substrate.

Aspect 29. The foldable substrate of any one of aspects 1-28, wherein the first compressive stress region comprises a maximum first compressive stress of about 500 MegaPascals or more, the second compressive stress region comprises a maximum second compressive stress, the third compressive stress region comprises a maximum third compressive stress of about 500 MegaPascals or more, the fourth compressive stress region comprises a maximum fourth compressive stress, the first central compressive stress region comprises a maximum first central compressive stress of about 500 MegaPascals or more.

Aspect 30. The foldable substrate of aspect 29, wherein the maximum second compressive stress is about 500 MegaPascals or more, the maximum fourth compressive stress is about 500 MegaPascals or more, and the maximum second central compressive stress is about 500 MegaPascals or more.

Aspect 31. The foldable substrate of any one of aspects 1-30, wherein the foldable substrate achieves an effective bend radius of 5 millimeters.

Aspect 32. The foldable substrate of any one of aspects 1-31, wherein the foldable substrate comprises a minimum effective bend radius in a range from about 1 millimeter to about 5 millimeters.

Aspect 33. A foldable apparatus comprising:

the foldable substrate of any one of aspects 1-32; and an adhesive comprising a first contact surface and a second contact surface opposite the first contact surface, the first contact surface facing the second central surface area, and at least a portion of the adhesive is positioned in a recess defined between the second central surface area and a second plane defined by the second major surface.

Aspect 34. A foldable apparatus comprising:

the foldable substrate of any one of aspects 1-32;

a polymer-based portion positioned in a recess defined between the second central surface area and a second plane defined by the second major surface; and an adhesive comprising a first contact surface and a second contact surface opposite the first contact surface, the first contact surface facing the second central surface area.

Aspect 35. The foldable apparatus of aspect 34, wherein the polymer-based portion comprises a strain at yield in a range from about 5% to about 10%.

Aspect 36. The foldable apparatus of any one of aspects 34-35, wherein a magnitude of a difference between an index of refraction of the foldable substrate and an index of refraction of the polymer-based portion is about 0.1 or less.

Aspect 37. The foldable apparatus of any one of aspects 33-36, wherein a magnitude of a difference between an index of refraction of the substrate and an index of refraction of the adhesive is about 0.1 or less.

Aspect 38. A consumer electronic product comprising:

a housing comprising a front surface, a back surface, and side surfaces;

electrical components at least partially within the housing, the electrical components comprising a controller, a memory, and a display, the display at or adjacent the front surface of the housing; and a cover substrate disposed over the display, wherein at least one of a portion of the housing or the cover substrate comprises the foldable substrate of any one of aspects 1-32.

Aspect 39. A method of making a foldable substrate comprising a substrate thickness and a central thickness less than the substrate thickness, a central portion of the foldable substrate comprising the central thickness between a first central surface area and a second central surface area, a first portion comprising an initial first compressive stress region extending from a first surface area and a second compressive stress region extending from a second surface area, a first transition region comprising a first transition surface area extending between the first central surface area and the first surface area, the method comprising:

- disposing a first layer over the first transition surface area and the first central surface area, a first diffusivity of one or more alkali-metal ions through the first layer is less than a central diffusivity of the one or more alkali-metal ions through the central portion;
- after disposing the first layer and the second layer, chemically strengthening the foldable substrate for a first period of time; and
- after the chemically strengthening, removing the first layer.

Aspect 40. The method of aspect 39, wherein a first central thickness of the first layer on first central surface area is greater than a first transition thickness of the first layer on the first transition surface area.

Aspect 41. The method of aspect 40, wherein the first transition thickness continuously and monotonically decreases from the first central surface area to the first surface area.

Aspect 42. The method of any one of aspects 39-41, wherein the disposing the first layer comprises disposing $SiO_2$ using physical vapor deposition.

Aspect 43. The method of any one of aspects 39-42, wherein the disposing the first layer further comprises disposing the first layer over a third transition surface area of a second transition region extending between the first central surface area and a third surface area of a second portion.

Aspect 44. The method of aspect 43, wherein the first central thickness of the first layer is greater than a third transition thickness of the first layer on the third transition surface area.

Aspect 45. The method of aspect 44, wherein the third transition thickness continuously and monotonically decreases from the first central surface area to the third surface area.

Aspect 46. The method of any one of aspects 39-45, wherein the first transition region further comprises a second transition surface area extending between the second central surface area and the second surface area, the method further comprising:

- before the chemically strengthening, disposing a second layer over the second transition surface area and the second central surface area, a second diffusivity of one or more alkali-metal ions through the second layer is less than the central diffusivity; and
- after the chemically strengthening, removing the second layer.

Aspect 47. The method of aspect 46, wherein a second central thickness of the second layer on the second central surface area is greater than a second transition thickness of the second layer on the second transition surface area.

Aspect 48. The method of aspect 47, wherein the second transition thickness continuously and monotonically decreases from the second central surface area to the second surface area.

Aspect 49. The method of any one of aspects 46-48, wherein the disposing the second layer further comprises disposing the second layer over a fourth transition surface area of a second transition region extending between the second central surface area and a fourth surface area of a second portion.

Aspect 50. The method of aspect 49, wherein the second central thickness of the second layer is greater than a fourth transition thickness of the second layer on the fourth transition surface area.

Aspect 51. The method of aspect 50, wherein the fourth transition thickness continuously and monotonically decreases from the second central surface area to the fourth surface area.

Aspect 52. A method of making a foldable substrate comprising a substrate thickness and a central thickness less than the substrate thickness, a central portion of the foldable substrate comprising the central thickness between a first central surface area and a second central surface area, a first portion comprising an initial first compressive stress region extending from a first surface area and a second compressive stress region extending from a second surface area, a first transition region comprising a first transition surface area extending between the first central surface area and the first surface area, the method comprising:

- disposing an alkali-metal ion-containing layer over the first central surface area;
- heating the foldable substrate and the alkali-metal ion-containing layer to decrease an initial central average concentration of potassium or sodium to an intermediate central average concentration of potassium or sodium;
- removing the alkali-metal ion-containing layer; and then chemically strengthening the foldable substrate.

Aspect 53. The method of aspect 52 further comprising:

- before the heating, disposing an another alkali-metal ion-containing layer over the second central surface area; and
- after the heating, the method further comprises removing the another alkali-metal ion-containing layer.

Aspect 54. The method of any one of aspects 52-53, wherein the alkali-metal ion-containing layer is substantially free of potassium.

Aspect 55. The method of any one of aspects 52-54, wherein the alkali-metal ion-containing layer comprises lithium ions and/or sodium ions.

Aspect 56. A method of making a foldable substrate comprising a substrate thickness and a central thickness less than the substrate thickness, a central portion of the foldable substrate comprising the central thickness between a first central surface area and a second central surface area, a first portion comprising an initial first compressive stress region extending from a first surface area and a second compressive stress region extending from a second surface area, a first transition region comprising a first transition surface area extending between the first central surface area and the first surface area, the method comprising:

- disposing a first alkali-metal ion-containing paste over the first transition surface area;
- heating the foldable substrate and the first alkali-metal ion-containing paste to increase an initial first transition concentration of one or more alkali-metal ions of the first transition region to an intermediate first transition concentration of the one or more alkali-metal ions of the first transition region;

after the heating, removing the first alkali-metal ion-containing paste; and then chemically strengthening the foldable substrate.

Aspect 57. The method of aspect 56, wherein a concentration of one or more alkali-metal ions of the first alkali-metal ion-containing paste decreases from a maximum first paste concentration at a midline of the first transition region towards the first surface area and/or the first central surface area.

Aspect 58. The method of aspect 57, wherein disposing the first alkali-metal ion-containing paste comprises disposing a plurality of first alkali-metal ion-containing pastes.

Aspect 59. The method of any of aspects 57-58, wherein the concentration of the one or more alkali-metal ions of the first alkali-metal ion-containing paste comprises potassium.

Aspect 60. The method of aspect 56, wherein a thickness of the first ion-containing paste decreases from a maximum first paste thickness at a midline of the first transition region towards the first surface area and the first central surface area.

Aspect 61. The method of any one of aspects 55-59, wherein the first transition region further comprises a second transition surface area extending between the second central surface area and the second surface area, the method further comprising:

before the heating, disposing a second alkali-metal ion-containing paste over the second transition surface area; and after the heating but before the chemically strengthening, removing the second alkali-metal ion-containing paste.

Aspect 62. The method of aspect 61, wherein a concentration of one or more alkali-metal ions of the second alkali-metal ion-containing paste decreases from a maximum second paste concentration at a midline of the first transition region towards the second surface area and/or the second central surface area.

Aspect 63. The method of aspect 62, wherein disposing the first alkali-metal ion-containing paste comprises disposing a plurality of first alkali-metal ion-containing pastes.

Aspect 64. The method of any of aspect 62-63, wherein the concentration of the one or more alkali-metal ions of the first alkali-metal ion-containing paste comprises potassium.

Aspect 65. The method of aspect 64, wherein a thickness of the second ion-containing paste decreases from a maximum second paste thickness at a midline of the first transition region towards the second surface area and the second central surface area.

Aspect 66. A method of making a foldable substrate comprising a substrate thickness and a central thickness less than the substrate thickness, a central portion of the foldable substrate comprising the central thickness between a first central surface area and a second central surface area, a first portion comprising an initial first compressive stress region extending from a first surface area and a second compressive stress region extending from a second surface area, a first transition region comprising a first transition surface area extending between the first central surface area and the first surface area, the method comprising:

disposing a first alkali-metal ion-containing paste over the first transition surface area;

chemically strengthening the foldable substrate by contacting at least the first central surface area with alkali-metal ion-containing liquid; and after the chemically strengthening, removing the first alkali-metal ion-containing paste, wherein an average concentration of potassium in the first alkali-metal ion-containing paste is greater than an average concentration of potassium in the alkali-metal ion-containing liquid.

Aspect 67. The method of aspect 66, wherein a concentration of one or more alkali-metal ions of the first alkali-metal ion-containing paste decreases from a maximum first paste concentration at a midline of the first transition region towards the first surface area and/or the first central surface area.

Aspect 68. The method of aspect 67, wherein disposing the first alkali-metal ion-containing paste comprises disposing a plurality of first alkali-metal ion-containing pastes.

Aspect 69. The method of any of aspects 66-68, wherein the concentration of the one or more alkali-metal ions of the first alkali-metal ion-containing paste comprises potassium.

Aspect 70. The method of aspect 67, wherein a thickness of the first ion-containing paste decreases from a maximum first paste thickness at a midline of the first transition region towards the first surface area and the first central surface area.

Aspect 71. The method of any one of aspects 56-70 further comprising:

before the chemically strengthening, disposing a second alkali-metal ion-containing paste over a second transition surface area of the first transition region extending between the second central surface area and the second surface area; and after the chemically strengthening, removing the second alkali-metal ion-containing paste, wherein an average concentration of potassium in the second alkali-metal ion-containing paste is greater than the average concentration of potassium in the alkali-metal ion-containing liquid.

Aspect 72. The method of aspect 71, wherein a concentration of one or more alkali-metal ions of the second alkali-metal ion-containing paste decreases from a maximum second paste concentration at a midline of the first transition region towards the second surface area and/or the second central surface area.

Aspect 73. The method of aspect 72, wherein disposing the first alkali-metal ion-containing paste comprises disposing a plurality of first alkali-metal ion-containing pastes.

Aspect 74. The method of any of aspects 72-73, wherein the concentration of the one or more alkali-metal ions of the first alkali-metal ion-containing paste comprises potassium.

Aspect 75. The method of aspect 74, wherein a thickness of the second ion-containing paste decreases from a maximum second paste thickness at a midline of the first transition region towards the second surface area and the second central surface area.

Aspect 76. A method of making a foldable substrate comprising a substrate thickness and a central thickness less than the substrate thickness, a central portion of the foldable substrate comprising the central thickness between a first central surface area and a second central surface area, a first portion comprising an initial first compressive stress region extending from a first surface area and a second compressive stress region extending from a second surface area, and a first transition region comprising a first transition surface area extending between the first central surface area and the first surface area. The method comprises locally heating the first transition surface area while chemically strengthening the foldable substrate.

Aspect 77. The method of aspect 76, wherein the locally heating is greatest at a midline of the first transition region and decreases towards the first surface area and the first central surface area.

Aspect 78. The method of any one of aspects 76-77, wherein the locally heating comprises impinging a laser beam on the first transition region.

Aspect 79. The method of any one of aspects 76-78, wherein the first transition region comprises a second transition surface area extending between the second central surface area and the second surface area, and the locally heating further comprises locally heating the second transition surface area while chemically strengthening the foldable substrate.

Aspect 80. The method of any one of aspects 39-79, wherein, after the chemically strengthening, the central portion comprises a first central tensile stress region positioned between a first central compressive stress region extending from the first central surface area and a second central compressive stress region extending from the second central surface area, the first central tensile stress region comprises a maximum central tensile stress, the first transition region comprising a first transition tensile stress region positioned between a first transition compressive stress region extending from the first transition surface area and a second transition compressive stress region extending from a second transition surface area of the first transition region extending between the second central surface area and the second surface area, and a maximum first transition tensile stress of the first transition tensile stress region is greater than or equal to the maximum central tensile stress.

Aspect 81. The method of aspect 80, wherein, after the chemically strengthening, the first portion comprises a first tensile stress region positioned between a first compressive stress region extending from the first surface area and a second compressive stress region extending from the second surface area, and a maximum first tensile stress of the first tensile stress region is greater than or equal to the maximum first transition tensile stress.

Aspect 82. The method of any one of aspects 39-81, wherein, after the chemically strengthening, the central portion comprises a central average concentration of one or more alkali-metal ions associated with the chemically strengthening, the first transition region comprises a first transition average concentration of the one or more alkali-metal ions associated with the chemically strengthening, and the first transition average concentration of the one or more alkali-metal ions is greater than or equal to the central average concentration of the one or more alkali-metal ions.

Aspect 83. The method of aspect 82, wherein, after the chemically strengthening, the first portion comprises a first average concentration of the one or alkali-metal ions associated with the chemically strengthening, and the first average concentration of the one or more alkali-metal ions is greater than or equal to the first transition average concentration of the one or more alkali-metal ions.

Aspect 84. The method of any one of aspects 82-83, wherein the one or more alkali-metal ions for the central average concentration, the first transition average concentration, and the second transition average concentration is potassium.

Aspect 85. The method of any one of aspects 39-84, wherein, before the chemically strengthening, the central portion is substantially unstrengthened.

Aspect 86. The method of any one of aspects 39-51, further comprising, before disposing the first layer, etching the foldable substrate to form the first transition surface area and the first central surface area, wherein the first central surface area recessed from the first surface area by a first distance.

Aspect 87. The method of any one of aspects 52-75 further comprising, further comprising, before disposing the first alkali-metal ion-containing layer, etching the foldable substrate to form the first transition surface area and the first central surface area, wherein the first central surface area recessed from the first surface area by a first distance.

Aspect 88. The method of any one of aspects 46-51, 61-65, 71-75, or 79-81 inclusive, wherein the first transition region is etched to form the second transition surface area and the second central surface area.

Aspect 89. The method of aspect 88, wherein the second central surface area is recessed from the second major surface by a second distance.

Aspect 90. The method of aspect 89, wherein the first distance is substantially equal to the second distance.

Aspect 91. The method of any one of aspects 89-90, wherein the second distance is from about 5% to about 20% of the substrate thickness.

Aspect 92. The method of any one of aspects 86-91, wherein the first distance is about 20% to about 45% of the substrate thickness.

Aspect 93. The method of any one of aspects 86-92, further comprising, before the etching, initially chemically strengthening the foldable substrate for an initial period of time to form the initial first compressive stress region extending from the first surface area.

Aspect 94. The method of aspect 93, wherein a ratio of the initial period of time to the first period of time is greater than a ratio of the substrate thickness to the central thickness.

Aspect 95. The method of any one of aspects 86-94, wherein before the etching, an existing first central surface area was substantially coplanar with the first surface area.

Aspect 96. The method of any one of aspects 86-95, wherein, after the initially chemically strengthening but before the chemically strengthening, the first portion comprises a first intermediate compressive stress region extending to a first intermediate depth of compression, and the first intermediate depth of compression divided by the substrate thickness is in a range from about 10% to about 20%.

Aspect 97. The method of any one of aspects 86-96, wherein, after the initially chemically strengthening but before the further chemically strengthening, the first portion comprises an initial first compressive stress region and an initial first depth of layer from the first major surface of one or more alkali-metal ions introduced during the chemically strengthening, and the initial first depth of layer divided by the substrate thickness is in a range from about 10% to about 20%.

Aspect 98. The method of any one of aspects 39-97, wherein a central total thickness variation (TTV) of the central portion over the first central surface area is less than or equal to 10 micrometers, and a first transition width of the first transition region is less than or equal to 2.2 millimeters minus a product of the central TTV in micrometers and 0.2 millimeters per micrometer.

Aspect 99. The method of any one of aspects 39-98, wherein the first transition region comprises a first average transition slope, and the first average transition slope in millimeters per millimeter is greater than or equal to 5 micrometers per millimeter times a quotient of a first quantity in millimeters consisting of the substrate thickness minus the central thickness and a second quantity in micrometers consisting of 11 micrometers minus a central total thickness variation (TTV) of the central portion over the first central surface area.

BRIEF DESCRIPTION OF THE DRAWINGS

The above and other features and advantages of aspects of the present disclosure are better understood when the following detailed description is read with reference to the accompanying drawings, in which.

Figure 1:
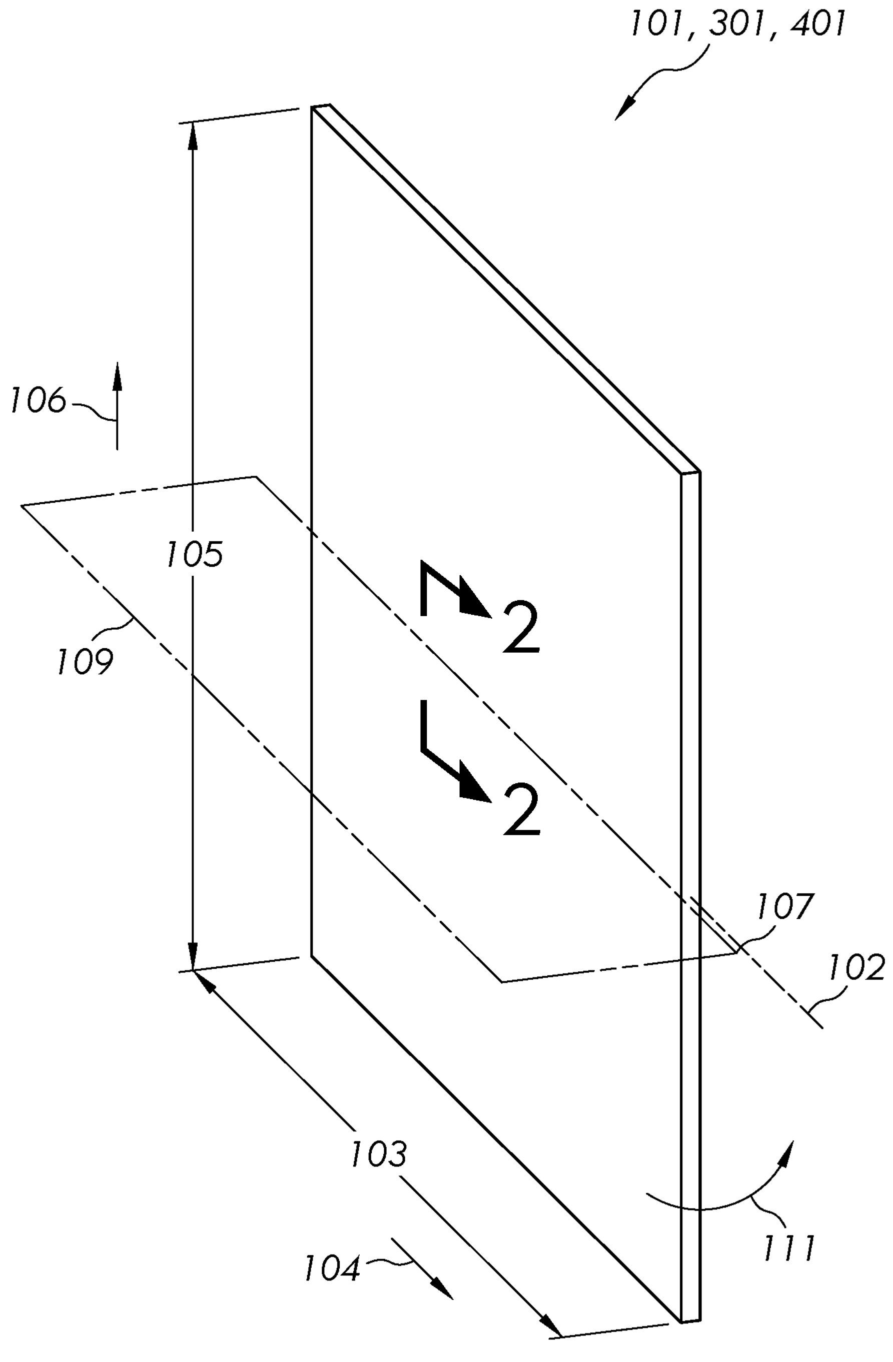
FIG. 1 is a schematic view of an example foldable apparatus in a flat configuration according to aspects, wherein a schematic view of the folded configuration may appear as shown in FIG. 5.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

FIGS. 1-4 and 6-7 illustrate views of foldable apparatus 101, 301, 401, 501, and 701 comprising a foldable substrate 201 in accordance with aspects of the disclosure. Unless otherwise noted, a discussion of features of aspects of one foldable apparatus can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Figure 2:
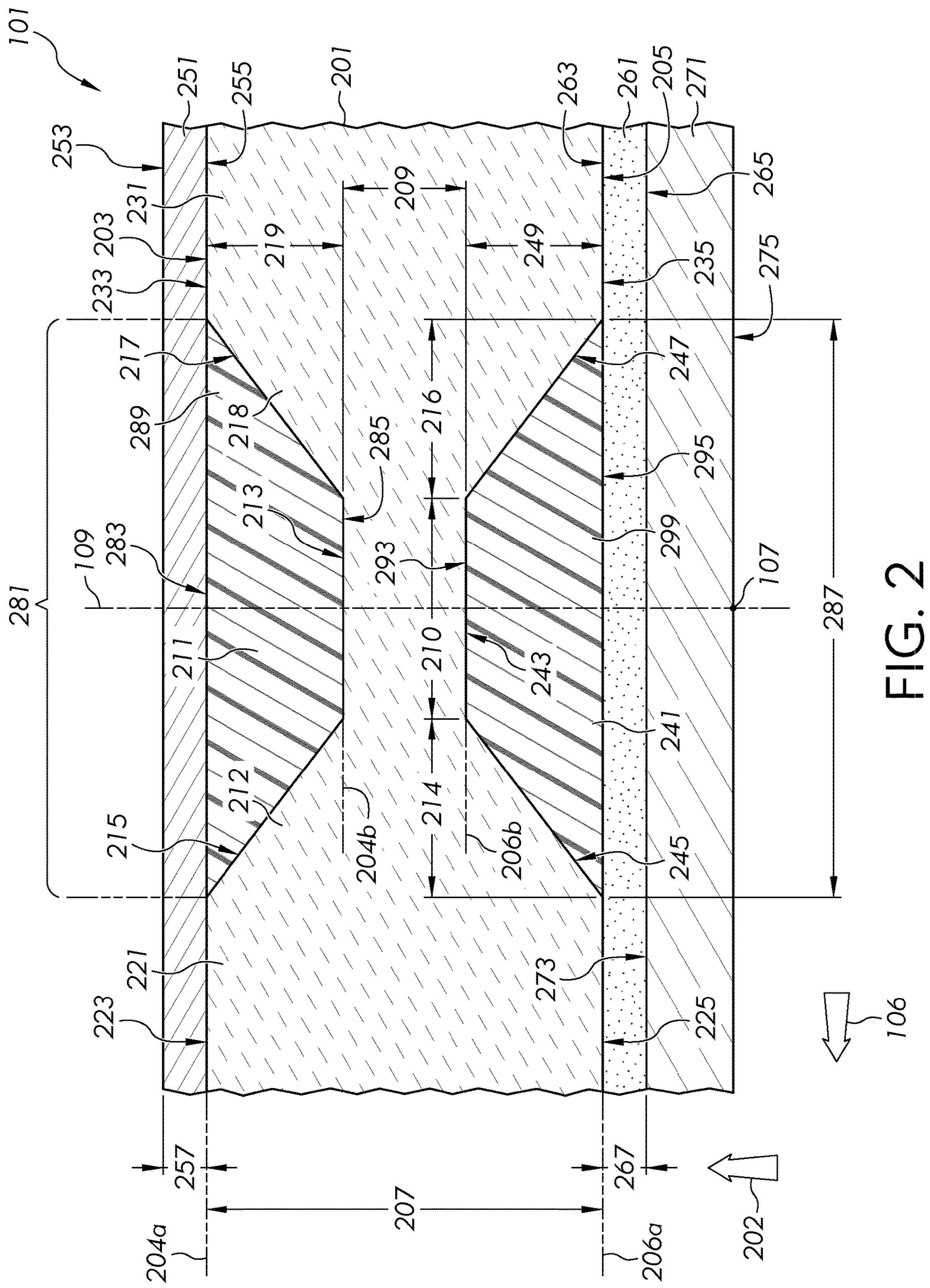
FIGS. 2-4 are cross-sectional views of the foldable apparatus along line 2-2 of FIG. 1 according to aspects.
Figure 3:
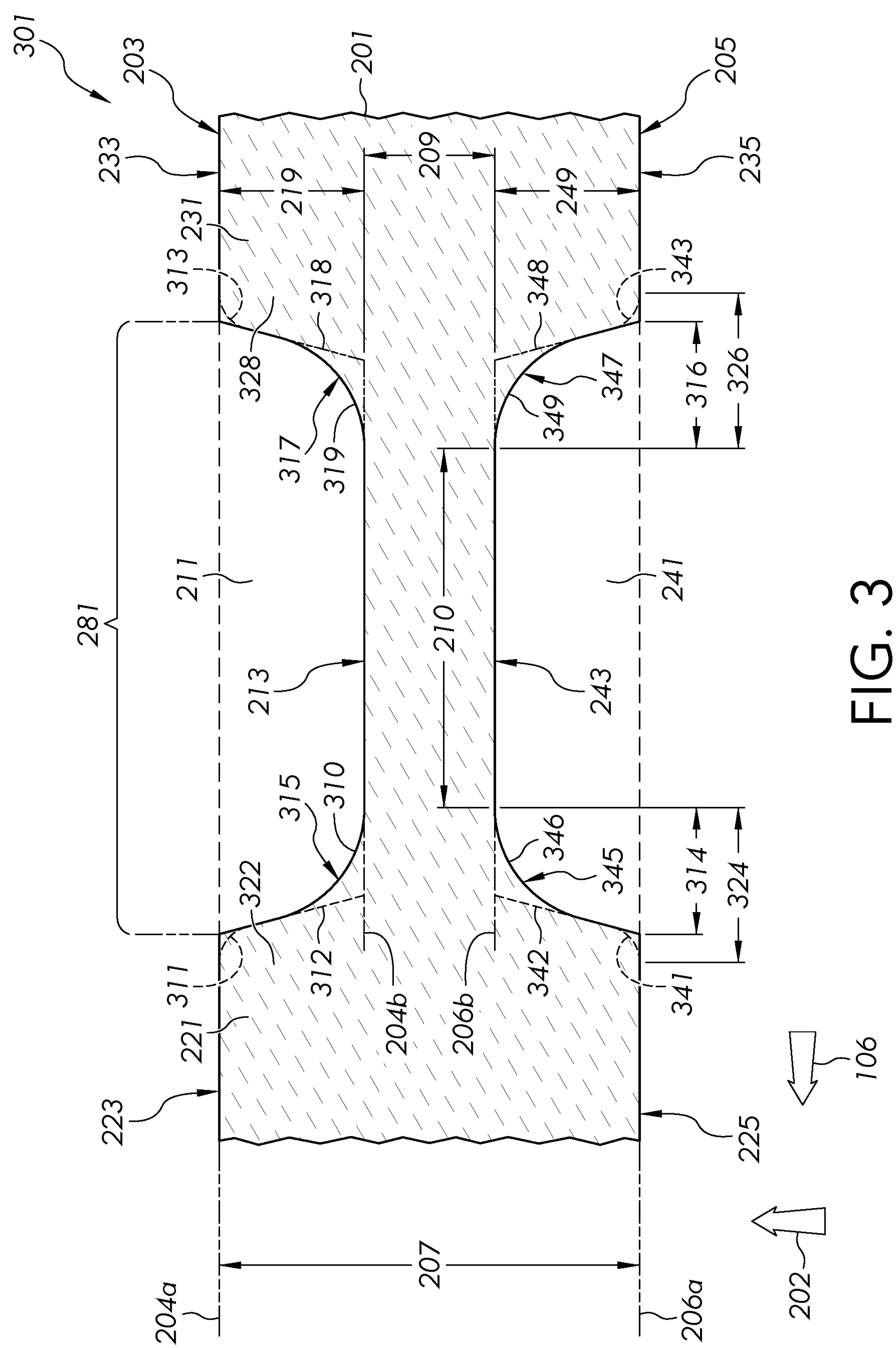
Figure 4:
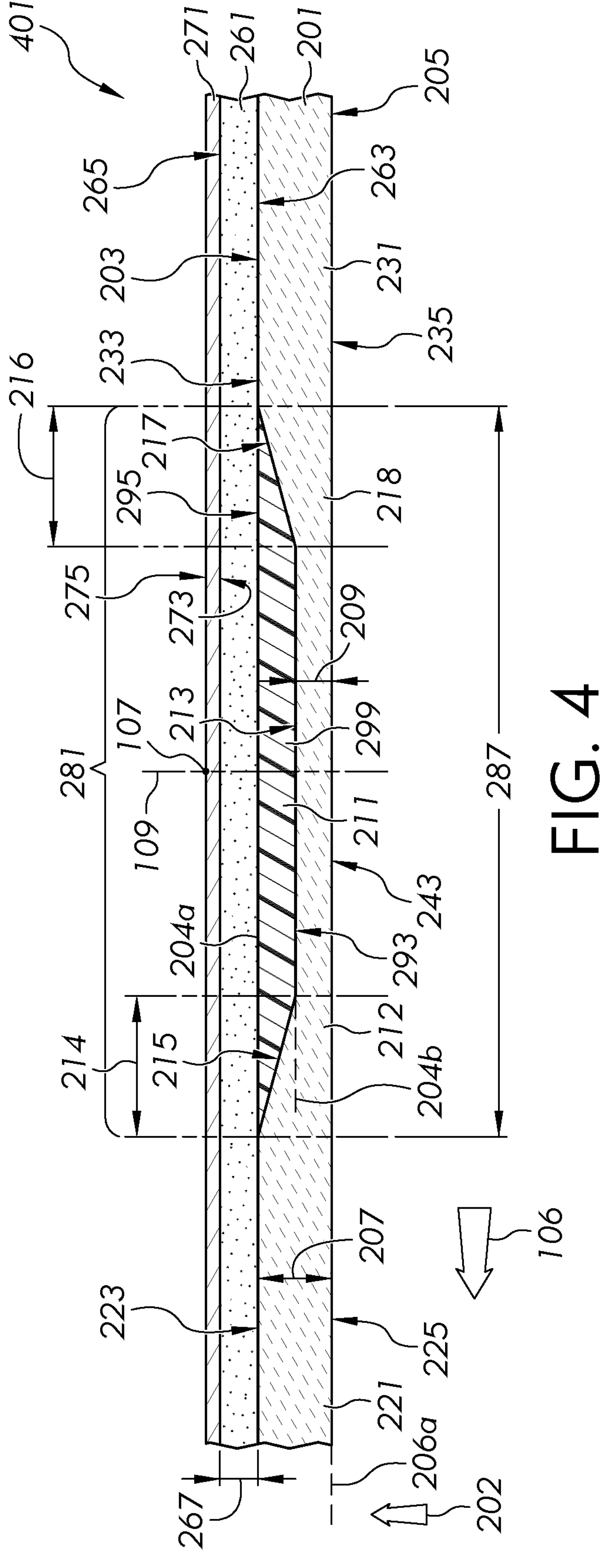
Figures 5, 6:
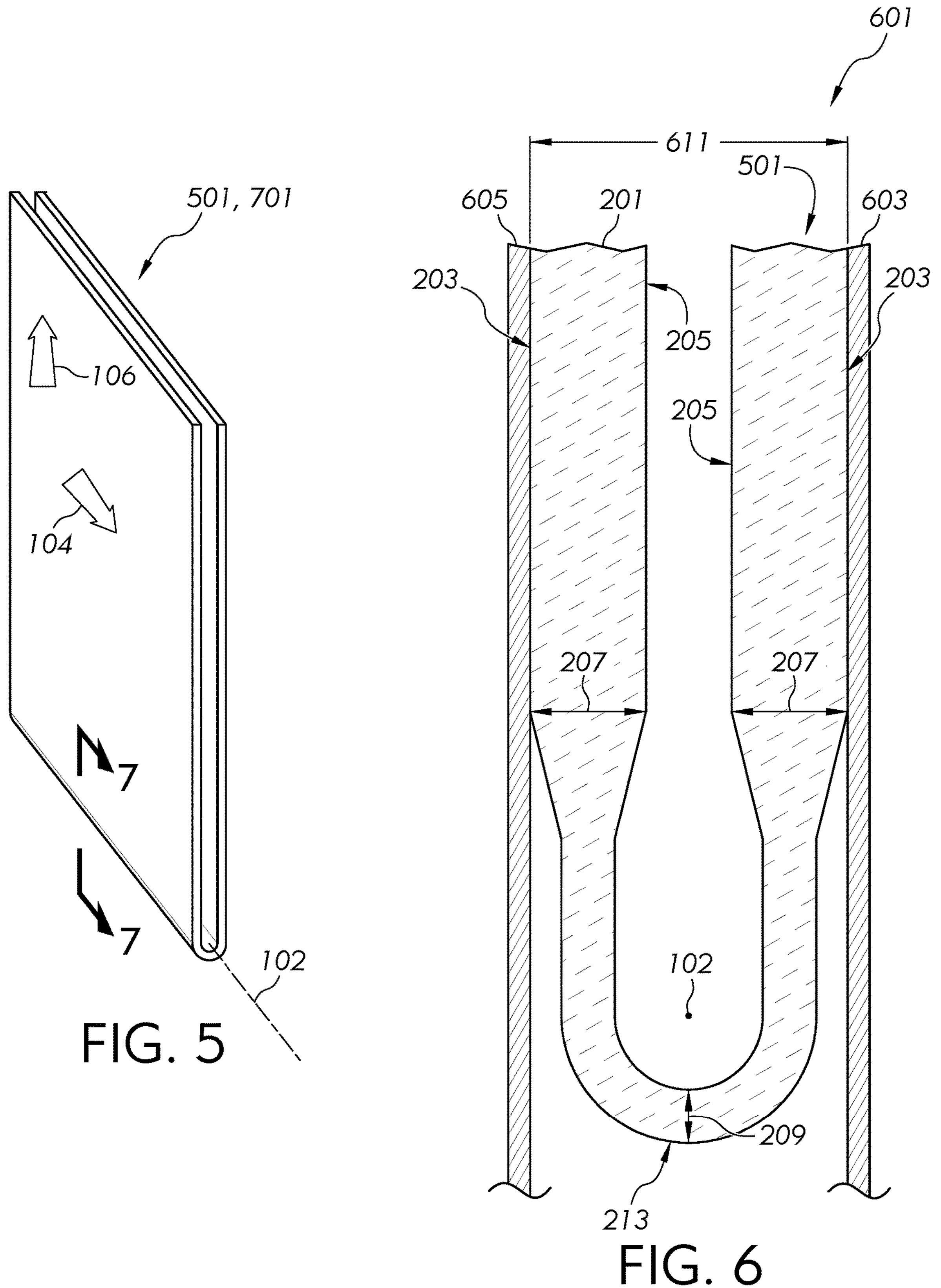
FIG. 5 is a schematic view of example foldable apparatus of aspects of the disclosure in a folded configuration wherein a schematic view of the flat configuration may appear as shown in FIG. 1.
FIG. 6 is a cross-sectional view of a testing apparatus to determine the minimum parallel plate distance of an example foldable substrate along line 7-7 of FIG. 5.
Figure 7:
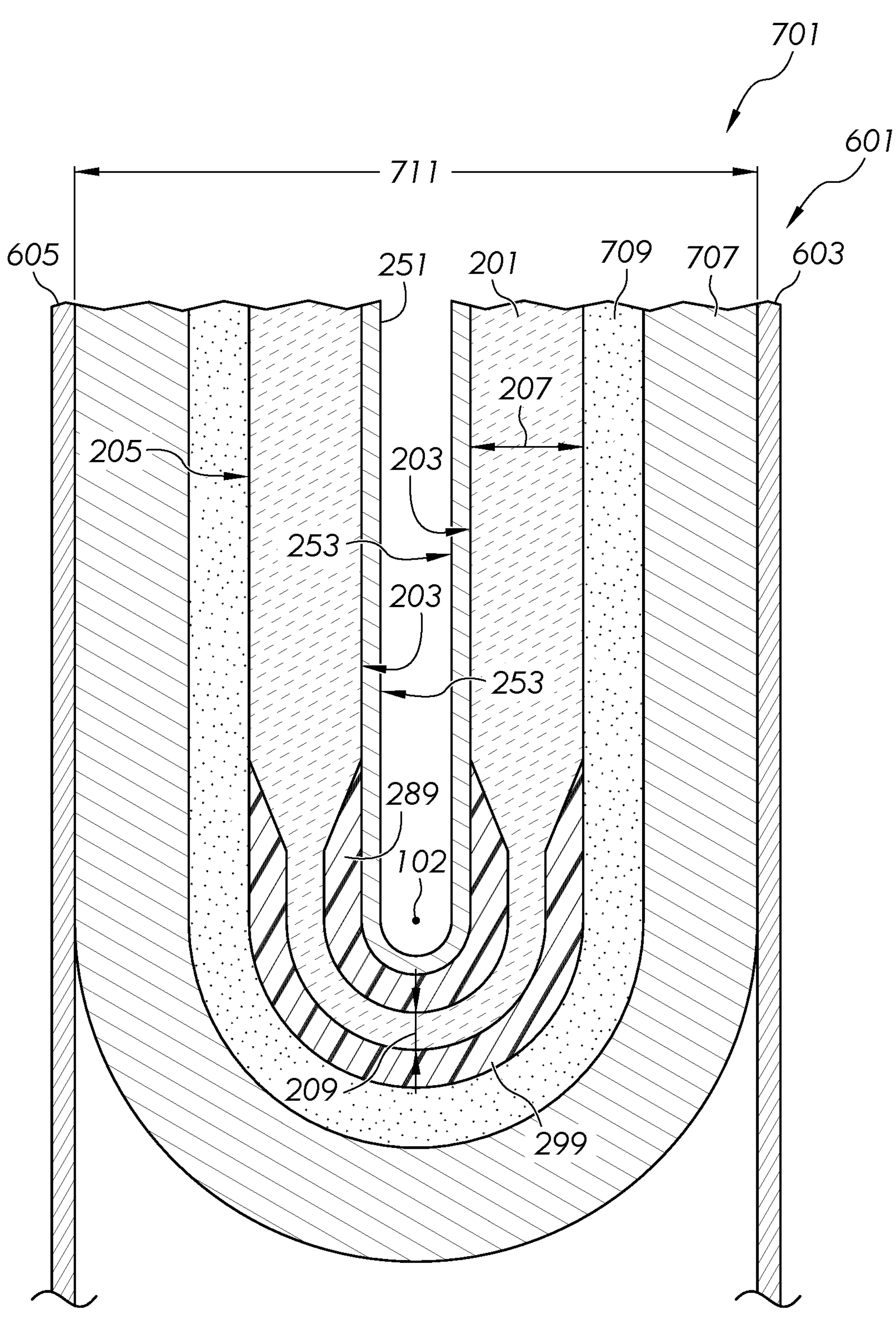
FIG. 7 is a cross-sectional views of another testing apparatus to determine the minimum parallel plate distance of an example modified foldable apparatus along line 7-7 of FIG. 5.

FIGS. 2-4 schematically illustrate example aspects of foldable apparatus 101, 301, and 401 comprising the foldable substrate 201 in accordance with aspects of the disclosure in an unfolded (e.g., flat) configuration while FIGS. 6-7 illustrates an example aspect of a foldable apparatus 501 and 701 comprising the foldable substrate 201 in accordance with aspects of the disclosure in a folded configuration.

The foldable apparatus 101, 301, and 401 comprise a first portion 221, a second portion 231, and a central portion 281 positioned between the first portion 221 and the second portion 231. In aspects, as shown in FIGS. 2 and 4, the foldable apparatus 101 can comprise a release liner 271 although other substrates (e.g., a glass-based substrate and/or a ceramic-based substrate discussed throughout the application) may be used in further aspects rather than the illustrated release liner 271. In aspects, as shown in FIGS. 2 and 7, the foldable apparatus 101 and 701 can comprise a coating 251. In aspects, as shown in FIGS. 2 and 4, the foldable apparatus 101 can comprise an adhesive layer 261. In aspects, as shown in FIGS. 2 and 7, foldable apparatus 101 and 701 can comprise a polymer-based portion 289 or 299. As shown in FIGS. 2-4, the foldable substrate 201 can comprise a first recess 211. In aspects, as shown in FIGS. 2-3, the foldable substrate 201 can further comprise a second recess 241. It is to be understood that any of the foldable apparatus of the disclosure can comprise a second substrate (e.g., a glass-based substrate and/or a ceramic-based substrate), a release liner 271, a display device, a coating 251, an adhesive layer 261, and/or a polymer-based portion 289 or 299.

Throughout the disclosure, with reference to FIG. 1, the width 103 of the foldable apparatus 101, 301, 401, 501, and/or 701 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus 101, 301, 401, 501, and/or 701 is considered the dimension of the foldable apparatus 101, 301, 401, 501, and/or 701 taken between opposed edges of the foldable apparatus 101, 301, 401, 501, and/or 701 in a direction 106 perpendicular to the fold axis 102 of the foldable apparatus 101, 301, 401, 501, and/or 701. In aspects, as shown in FIGS. 1-2, the foldable apparatus of any aspects of the disclosure can comprise a fold plane 109 that includes the fold axis 102 when the foldable apparatus is in the flat configuration (e.g., see FIG. 2). In further aspects, as shown in FIG. 2, the fold plane 109 can extend along the fold axis 102 and in a direction of the substrate thickness 207 when the foldable apparatus is in the flat configuration (e.g., see FIG. 2). The fold plane 109 may comprise a central axis 107 of the foldable apparatus. In aspects, the foldable apparatus can be folded in a direction 111 (e.g., see FIG. 1) about the fold axis 102 extending in the direction 104 of the width 103 to form a folded configuration (e.g., see FIGS. 5-7). As shown, the foldable apparatus may include a single fold axis to allow the foldable apparatus to comprise a bifold wherein, for example, the foldable apparatus may be folded in half. In further aspects, the foldable apparatus may include two or more fold axes with each fold axis including a corresponding central portion similar or identical to the central portion 281 discussed herein. For example, providing two fold axes can allow the foldable apparatus to comprise a trifold wherein, for example, the foldable apparatus may be folded with the first portion 221, the second portion 231, and a third portion similar or identical to the first portion or second portion with the central portion 281 and another central portion similar to or identical to the central portion positioned between the first portion and the second portion and between the second portion and the third portion, respectively.

The foldable substrate 201 can comprise a glass-based substrate and/or a ceramic-based substrate having a pencil hardness of 8H or more, for example, 9H or more. As used herein, pencil hardness is measured using ASTM D 3363-20 with standard lead graded pencils. Providing a glass-based foldable substrate and/or a ceramic-based foldable substrate can enhance puncture resistance and/or impact resistance.

In aspects, the foldable substrate 201 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali-metal oxide, for example, $Li_2O$, $Na_2O$, $K_2O$, $Rb_2O$, and $Cs_2O$. As used herein, RO can refer to MgO, CaO, SrO, BaO, and ZnO. In aspects, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In aspects, glass-ceramics have about 1% to about 99% crystallinity. Examples of suitable glass-ceramics may include $Li_2O—Al_2O_3—SiO_2$ system (i.e., LAS-System) glass-ceramics, $MgO—Al_2O_3—SiO_2$ system (i.e., MAS-System) glass-ceramics, ZnO x $Al_2O_3$ x $nSiO_2$ (i.e., ZAS system), and/or glass-ceramics that include a predominant crystal phase including p-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

In aspects, the foldable substrate 201 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, ceramic-based materials can comprise one or more oxides, nitrides, oxynitrides, carbides, borides, and/or silicides. Example aspects of ceramic oxides include zirconia ($ZrO_2$), zircon ($ZrSiO_4$), an alkali-metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxides, beryllium oxides, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example aspects of carbides and carbon-containing ceramics include silicon carbide (SiC), tungsten carbide (WC), an iron carbide, boron carbide ($B_4C$), alkali-metal carbides (e.g., lithium carbide ($Li_4C_3$)), alkali earth metal carbides (e.g., magnesium carbide ($Mg_2C_3$)), and graphite. Example aspects of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example aspects of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali-metal silicide (e.g., magnesium silicide ($Mg_2Si$)), hafnium disilicide ($HfSi_2$), and platinum silicide (PtSi).

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 23° C. and 50% relative humidity with a type I dogbone shaped sample. Throughout the disclosure, an elastic modulus (e.g., Young's modulus) and/or a Poisson's ratio is measured using ISO 527-1:2019. In aspects, the foldable substrate 201 can comprise an elastic modulus of about 1 GigaPascal (GPa) or more, about 3 GPa or more, about 5 GPa or more, about 10 GPa or more, about 100 GPa or less, about 80 GPa or less, about 60 GPa or less, or about 20 GPa or less. In aspects, the foldable substrate 201 can comprise an elastic modulus in a range from about 1 GPa to about 100 GPa, from about 1 GPa to about 80 GPa, from about 3 GPa to about 80 GPa, from about 3 GPa to about 60 GPa, from about 5 GPa to about 60 GPa, from about 5 GPa to about 20 GPa, from about 10 GPa to about 20 GPa, or any range or subrange therebetween. In further aspects, the foldable substrate 201 can comprise a glass-based material or a ceramic-based material comprising an elastic modulus in a range from about 10 GPa to about 100 GPa, from about 40 GPa to about 100 GPa, from about 60 GPa to about 100 GPa, from about 60 GPa to about 80 GPa, from about 80 GPa to about 100 GPa, or any range or subrange therebetween.

In aspects, the foldable substrate 201 can be optically transparent. As used herein, "optically transparent" or "optically clear" means an average transmittance of 70% or more in the wavelength range of 400 nm to 700 nm through a 1.0 mm thick piece of a material. In aspects, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

As shown in FIGS. 2-4, the foldable apparatus 101, 301, and 401 comprise the foldable substrate 201 comprising a first major surface 203 and a second major surface 205 opposite the first major surface 203. As shown in FIGS. 2-4, the first major surface 203 can extend along a first plane 204*a*. The second major surface 205 can extend along a second plane 206*a*. In aspects, as shown, the second plane 206*a* can be parallel to the first plane 204*a*. As used herein, a substrate thickness 207 can be defined between the first major surface 203 and the second major surface 205 as a distance between the first plane 204*a* and the second plane 206*a*. In aspects, the substrate thickness 207 can be about 10 micrometers (μm) or more, about 25 μm or more, about 40 μm or more, about 60 μm or more, about 80 μm or more, about 100 μm or more, about 125 μm or more, about 150 μm or more, about 2 millimeters (mm) or less, about 1 mm or less, about 800 μm or less, about 500 μm or less, about 300 μm or less, about 200 μm or less, about 180 μm or less, or about 160 μm or less. In aspects, the substrate thickness 207 can be in a range from about 10 μm to about 2 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 125 μm to about 500 μm, from about 125 μm to about 300 μm, from about 125 μm to about 200 μm, from about 150 μm to about 200 μm, from about 150 μm to about 160 μm, or any range or subrange therebetween.

As shown in FIGS. 2-4, the first portion 221 of the foldable substrate 201 can comprise a first surface area 223 and a second surface area 225 opposite the first surface area 223. The first portion 221 will now be described with reference to the foldable apparatus 101 of FIG. 2 with the understanding that such description of the first portion 221, unless otherwise stated, can also apply to any aspects of the disclosure, for example, the foldable apparatus 301, 401, 501, and/or 701 illustrated in FIGS. 3-4 and 6-7. In aspects, as shown, the first surface area 223 can comprise a planar surface, and/or the second surface area 225 of the first portion 221 can comprise a planar surface. In further aspects, as shown, the second surface area 225 can be parallel to the first surface area 223. In aspects, as shown, the first major surface 203 can comprise the first surface area 223 and the second major surface 205 can comprise the second surface area 225. In further aspects, the first surface area 223 can extend along the first plane 204*a*. In further aspects, the second surface area 225 can extend along the second plane 206*a*. In aspects, the substrate thickness 207 can correspond to the distance between the first surface area 223 of the first portion 221 and the second surface area 225 of the first portion 221. In aspects, the substrate thickness 207 can be substantially uniform across the first surface area 223. In aspects, a first thickness defined between the first surface area 223 and the second surface area 225 can be within one or more of the ranges discussed above with regards to the substrate thickness 207. In further aspects, the first thickness can comprise the substrate thickness 207. In further aspects, the first thickness of the first portion 221 may be substantially uniform between the first surface area 223 and the second surface area 225 across its corresponding length (i.e., in the direction 106 of the length 105 of the foldable apparatus) and/or its corresponding width (i.e., in the direction 104 of the width 103 of the foldable apparatus).

As shown in FIGS. 2-4, the second portion 231 of the foldable substrate 201 can comprise a third surface area 233 and a fourth surface area 235 opposite the third surface area 233. The second portion 231 will now be described with reference to the foldable apparatus 101 of FIG. 2 with the understanding that such description of the second portion 231, unless otherwise stated, can also apply to any aspects of the disclosure, for example, the foldable apparatus 301, 401, 501, and/or 701 illustrated in FIGS. 3-4 and 6-7. In aspects, as shown, the third surface area 233 of the second portion 231 can comprise a planar surface, and/or the fourth surface area 235 of the second portion 231 can comprise a planar surface. In further aspects, the third surface area 233 of the second portion 231 can be in a common plane with the first surface area 223 of the first portion 221. In further aspects, as shown, the fourth surface area 235 can be parallel to the third surface area 233. In further aspects, the fourth surface area 235 of the second portion 231 can be in a common plane with the second surface area 225 of the first portion 221. A second thickness can be defined between the third surface area 233 of the second portion 231 and the fourth surface area 235 of the second portion 231. In aspects, the second thickness can be within the range discussed above with regards to the substrate thickness 207. In further aspects, the second thickness can comprise the substrate thickness 207. In further aspects, as shown, the second thickness can be substantially equal to the substrate thickness 207 (e.g., first thickness). In aspects, the second thickness of the second portion 231 may be substantially uniform between the third surface area 233 and the fourth surface area 235.

As shown in FIGS. 2-4, the foldable substrate 201 can comprise a central portion 281 positioned between the first portion 221 and the second portion 231. In aspects, the central portion 281 can comprise a first central surface area 213 and a second central surface area 243 opposite the first central surface area 213. As shown, the first central surface area 213 of the central portion 281 can be positioned between the first surface area 223 and the third surface area 233. It is to be understood that the central portion would be wider to accommodate all of the transition surface areas if any of the transition surface areas (e.g., first transition surface area, second transition surface area, third transition surface area, fourth transition surface area) comprised one of dashed lines 311, 313, 341, and/or 343, as discussed below. In further aspects, as shown, the first central surface area 213 can extend along a third plane 204*b* when the foldable apparatus 101, 301, and/or 401 is in a flat configuration. A first recess 211 can be defined between the first central surface area 213 (e.g., third plane 204*b*) and the first plane 204*a*.

In aspects, the third plane 204*b* can be substantially parallel to the first plane 204*a* and/or the second plane 206*a*. In further aspects, as shown in FIGS. 2-3, the first central surface area 213 can be recessed from the first major surface 203 by a first distance 219. In further aspects, the first distance 219 that the first central surface area 213 is recessed from the first plane 204*a* can be about 1 μm or more, about 5 μm or more, about 10 μm or more, about 25 μm or more, about 40 μm or more, about 80 μm or more, about 100 μm or more, about 125 μm or more, about 150 μm or more, about 1 mm or less, about 800 μm or less, about 500 μm or less, about 300 μm or less, about 200 μm or less, about 180 μm or less, or about 160 μm or less. In further aspects, the first distance 219 can be in a range from about 1 μm to about 1 mm, from about 1 μm to about 800 μm, from about 5 μm to about 800 μm, from about 5 μm to about 500 μm, from about 10 μm to about 500 μm, from about 10 μm to about 300 μm, from about 25 μm to about 300 μm, from about 25 μm to about 200 μm, from about 40 μm to about 200 μm, from about 80 μm to about 200 μm, from about 80 μm to about 200 μm, from about 100 μm to about 200 μm, from about 125 μm to about 200 μm, from about 125 μm to about 180 μm, from about 125 μm to about 160 μm, from about 125 μm to about 150 μm, or any range or subrange therebetween. In further aspects, the first distance 219 that the first central surface area 213 is recessed from the first plane 204*a* as a percentage of the substrate thickness 207 can be about 1% or more, about 5% or more, about 10% or more, about 15% or more, about 20% or more, about 25% or more, about 75% or less, about 60% or less, about 50% or less, about 40% or less, about 35% or less, or about 30% or less. In further aspects, the first distance 219 as a percentage of the substrate thickness 207 can be in a range from about 1% to about 75%, from about 1% to about 60%, from about 5% to about 60%, from about 5% to about 50%, from about 10% to about 50%, from about 10% to about 45%, from about 15% to about 45%, from about 20% to about 45%, from about 20% to about 35%, from about 20% to about 30%, from about 25% to about 30%, or any range or subrange therebetween.

As shown in FIGS. 2-4, the second central surface area 243 of the central portion 281 can be positioned between the second surface area 225 and the fourth surface area 235. In further aspects, as shown in FIGS. 2-3, the second central surface area 243 can extend along a fourth plane 206*b* when the foldable apparatus 101 and/or 301 is in a flat configuration. In further aspects, as shown in FIGS. 2-3, a second recess 241 can be defined between the second central surface area 243 (e.g., fourth plane 206*b*) and the second plane 206*a*. In aspects, as shown in FIG. 4, the second central surface area 243 can extend along the second plane 206*a*.

In aspects, as shown in FIGS. 2-3, the second central surface area 243 can be recessed from the second major surface 205 by a second distance 249. In further aspects, the second distance 249 can be within one or more of the ranges discussed above for the first distance 219. In further aspects, the first distance can be greater than the second distance. In even further aspects, the second distance 249 that the second central surface area 243 is recessed from the second plane 206*a* as a percentage of the substrate thickness 207 can be about 1% or more, about 2% or more, about 5% or more, about 10% or more, about 12% or more, about 30% or less, about 25% or less, about 20% or less, about 18% or less, or about 15% or less. In even further aspects, the second distance 249 as a percentage of the substrate thickness 207 can be in a range from about 1% to about 30%, from about 1% to about 25%, from about 2% to about 25%, from about 5% to about 25%, from about 5% to about 20%, from about 10% to about 20%, from about 10% to about 18%, from about 12% to about 18%, from about 12% to about 15%, or any range or subrange therebetween. In further aspects, as shown in FIG. 2, the first distance 219 can be substantially equal to the second distance 249. Providing the first distance substantially equal to the second distance can further reduce the incidence of mechanical instabilities in the central portion, for example, because the foldable substrate is symmetric about a plane comprising a midpoint in the substrate thickness and the central thickness. In further aspects, as shown in FIG. 4, the second central surface area 243 can be coplanar with the second surface area 225 and/or the fourth surface area 235, for example, forming a planar second major surface 205 extending along the second plane 206*a*.

A central thickness 209 can be defined between the first central surface area 213 and the second central surface area 243, which can be measured as the distance between the third plane 204*b* and the fourth plane 206*b*. In aspects, the central thickness 209 can be about 1 μm or more, about 5 μm or more, about 10 μm or more, about 25 μm or more, about 40 μm or more, about 100 μm or less, about 80 μm or less, about 60 μm or less, or about 50 μm or less. In aspects, the central thickness 209 can be in a range from about 1 μm to about 100 μm, from about 5 μm to about 100 μm, from about 10 μm to about 100 μm, from about 10 μm to about 80 μm, from about 25 μm to about 80 μm, from about 25 μm to about 60 μm, from about 40 μm to about 60 μm, or any range or subrange therebetween. In aspects, the central thickness 209 as a percentage of the substrate thickness 207 can be about 0.5% or more, about 1% or more, about 2% or more, about 5% or more, about 6% or more, about 20% or less, about 13% or less, about 10% or less, or about 8% or less. In aspects, the central thickness 209 as a percentage of the substrate thickness 207 can be in a range from about 0.5% to about 20%, from about 0.5% to about 13%, from about 1% to about 13%, from about 1% to about 10%, from about 2% to about 10%, from about 2% to about 8%, from about 5% to about 8%, from about 6% to about 8%, or any range or subrange therebetween. By providing the first central surface area 213 of the central portion 281 extending along the third plane 204*b* parallel to the second central surface area 243 of the central portion 281 extending along the fourth plane 206*b*, a uniform central thickness 209 may extend across the central portion 281 that can provide enhanced folding performance at a predetermined thickness for the central thickness 209. A uniform central thickness 209 across the central portion 281 can improve folding performance by preventing stress concentrations that would occur if a portion of the central portion 281 was thinner than the rest of the central portion 281.

In aspects, the central portion can comprise a central total thickness variation (TTV) over the area of the first central surface area 213. As used herein, a central total thickness variation (TTV) over the first central surface area is the difference between a maximum thickness and a minimum thickness, wherein the thickness is measured at 50 locations evenly spaced over the first central surface area. In further aspects, the central TTV can be about 10 μm or less, about 7 μm or less, about 5 μm or less, about 3 μm or less, or about 2 μm or less. In further aspects, the central TTV can be in a range from about 0.1 μm to about 10 μm, from about 0.1 μm to 7 μm, from about 0.5 μm to about 7 μm, from about 0.5 μm to about 5 μm, from about 1 μm to about 5 μm, from about 1 μm to about 3 μm, from about 1 μm to about 2 μm, or any range or subrange therebetween. Minimizing a central total thickness variation (TTV) can be minimized to reduce differences in chemical strengthening induced expansion strain in the central portion, reducing an incidence of mechanical instabilities.

In aspects, as shown in FIGS. 2-4, the central portion 281 of the foldable substrate 201 can comprise a first transition region 212 or 322 comprising a first transition surface area 215 or 315 extending between the first surface area 223 and the first central surface area 213. In further aspects, as shown, a width (e.g., first transition width 214, 314, or 324) of the first transition region 212 or 322 can be measured as the minimum distance in a direction 106 of the length 105 (see FIG. 1) between a portion of the first central surface area 213 extending along the third plane 204*b* and a portion of the first surface area 223. In even further aspects, the first transition width 214, 314, or 324 of the first transition region 212 or 322 can be about 0.5 mm or more, about 0.6 mm or more, about 0.7 mm or more, about 0.8 mm or more, about 0.9 mm or more, about 2 mm or less, about 1.8 mm or less, about 1.5 mm or less, about 1.2 mm or less, about 1 mm or less, or about 0.8 mm or less. In even further aspects, the first transition width 214, 314, or 324 of the first transition region 212 or 322 can be in a range from about 0.5 mm to about 2 mm, from about 0.5 mm to about 1.8 mm, from about 0.6 mm to about 1.8 mm, from about 0.6 mm to about 1.5 mm, from about 0.7 mm to about 1.5 mm, from about 0.7 mm to about 1.2 mm, from about 0.8 mm to about 1.2 mm, from about 0.8 mm to about 1 mm, from about 0.9 mm to about 1 mm, or any range or subrange therebetween. In even further aspects, the first transition width 214, 314, or 324 of the first transition region 212 or 322 can be in a range from about 0.5 mm to about 1.8 mm, from about 0.5 mm to about 1.5 mm, from about 0.5 mm to about 1.2 mm, from about 0.5 mm to about 1 mm, from about 0.6 mm to about 1 mm, from about 0.7 mm to about 1 mm, or any range or subrange therebetween. In even further aspects, the first transition width 214, 314, or 324 of the first transition region 212 or 322 can be less than or equal to 2.2 millimeters minus a product of the central TTV in micrometers and 0.2 millimeters per micrometer. Reducing a width of the first transition region and/or the second transition region can reduce a total chemical strengthening induced stress exerted on the central portion by the corresponding transition regions such that a strain of the first central surface area and/or the second central surface area is less than a critical buckling strain (e.g., onset of mechanical instabilities).

In aspects, as shown in FIGS. 2-3, the first transition region 212 or 322 can comprise a second transition surface area 245 or 345 extending between the second surface area 225 and the second central surface area 243. In further aspects, a width of the second transition surface area 245 or 345 can be measured as the minimum distance in a direction 106 of the length 105 (see FIG. 1) between a portion of the second central surface area 243 extending along the fourth plane 206*b* and a portion of the second surface area 225. In even further aspects, the width of the second transition surface area 245 or 345 can be substantially equal to (e.g., equal to) the first transition width 214, 314, or 324 of the first transition region 212 or 322. In aspects, as shown in FIG. 4, the portion of the first transition region 212 extending between the second surface area 225 and the second central surface area 243 can be coplanar with one or both surface areas.

In aspects, as shown in FIGS. 2-4, a thickness of the first transition region 212 or 322 can decrease between the substrate thickness 207 of the first portion 221 and the central thickness 209 of the central portion 281. In further aspects, as shown, a thickness of the first transition region 212 or 322 can smoothly decrease, monotonically decrease, and/or smoothly and monotonically decrease between the substrate thickness 207 of the first portion 221 and the central thickness 209 of the central portion 281. As used herein, a thickness decreases smoothly if changes in the cross-sectional area are smooth (e.g., gradual) rather than abrupt (e.g., step) changes in thickness. As used herein, a thickness decreases monotonically in a direction if the thickness decreases for a portion and for the rest of the time either stays the same, decreases, or a combination thereof (i.e., the thickness decreases but never increases in the direction). Providing a smooth shape of the first transition region and/or the second transition region can reduce optical distortions. Providing a monotonically decreasing thickness of the first transition region and/or the second transition region can reduce an incidence of mechanical instabilities, for example, by enabling the relationships discussed below for a profile of the chemical strengthening induced expansion strain.

In aspects, as shown in FIGS. 2 and 4, the first transition surface area 215 can comprise a linearly inclined surface extending between the first central surface area 213 and the first surface area 223. In aspects, as shown in FIG. 3, the first transition surface area 315 can comprise a concave up shape, for example, with a local slope of the first transition surface area 315 smoothly transitioning to a slope of the first central surface area 213 while a local slope of the first transition surface area 315 is substantially different from a slope of the first surface area 223. It is to be understood that the central portion would be wider to accommodate all of the transition surface areas if any of the transition surface areas (e.g., first transition surface area, second transition surface area, third transition surface area, fourth transition surface area) comprised one of dashed lines 311, 313, 341, and/or 343. In aspects, as shown in FIG. 3 by dashed line 311, the first transition surface area can comprise a sigmoid shape. In aspects, as shown in FIG. 3 by dashed line 311 with line 310, a local slope of the first transition surface area can be greater at a midpoint of the first transition surface area than where the first transition surface area meets the first central surface area 213 and where the first transition surface area meets the first surface area 223. In aspects, as shown in FIG. 3 by dashed lines 311 and 312, the first transition surface area can comprise a convex up shape, for example, with a local slope of the first transition surface area smoothly transitioning to a slope of the first surface area 223 while a local slope of the first transition surface area is substantially different from a slope of the first central surface area 213. In aspects, the second transition surface area 345 can comprise one of the shapes or properties discussed above in this paragraph for the first transition surface area. For example, as shown in FIG. 2, the second transition surface area 245 can comprise a linearly inclined surface extending between the second central surface area 243 and the second surface area 225. As shown in FIG. 3 by dashed line 341 with line 346, a local slope of the second transition surface area can be greater at a midpoint of the second transition surface area than where the second transition surface area meets the second central surface area 243 and where the second transition surface area meets the second surface area 225. As shown in FIG. 3 by dashed lines 341 and 342, a local slope of the second transition surface area smoothly transitions to a slope of the second surface area 225 while a local slope of the second transition surface area is substantially different from a slope of the second central surface area 243.

In aspects, as shown in FIGS. 2 and 4, a thickness of the first transition region 212 can decrease at a constant rate (e.g., linearly change) from the substrate thickness 207 to the central thickness 209. In aspects, as shown in FIG. 3 with lines 310 and 346, a thickness of the first transition region 322 can decrease slower where the first transition surface area 315 meets the first central surface area 213 than at a midpoint of the first transition region 322 and/or than where the first transition surface area 315 meets the first surface area 223 (e.g., first portion 221). In aspects, as shown in FIG. 3 with dashed lines 311, 312, 341, and 342, a thickness of the first transition region 322 can decrease at the same rate or faster where the first transition surface area meets the first central surface area 213 than at a midpoint of the first transition region 322 and/or than where the first transition surface area meets the first surface area 223. Providing a non-uniform slope of the surface area of the first transition region and/or the second transition region can reduce an amount of the corresponding transition region comprising intermediate thicknesses, for example, comprising a chemical strengthening induced expansion strain less than a portion of the corresponding transition region closer to the first central surface area and/or the second central surface area and/or than the first central surface area and/or the second central surface area.

As used herein, an average transition slope of a transition region is equal to a difference between the substrate thickness and the central thickness divided by a width of the transition region. For example, a first average transition slope of the first transition region is equal to the difference between the substrate thickness 207 and the central thickness 209 divided by the first transition width 214, 314, or 324. In aspects, the first average transition slope of the first transition region 212 or 322 can be about 0.1 millimeters per millimeters (mm/mm) or less, about 0.08 mm/mm or less, about 0.07 mm/mm or less, about 0.06 mm/mm or less, about 0.058 mm/mm or less, about 0.055 mm/mm or less, about 0.01 mm/mm or more, about 0.03 mm/mm or more, about 0.04 mm/mm or more, about 0.045 mm/mm or more, about 0.048 mm/mm or more, about 0.05 mm/mm or more, or about 0.052 mm/mm or more. In aspects, the first average transition slope of the first transition region 212 or 322 can be in a range from about 0.01 mm/mm to about 0.1 mm/mm, from about 0.01 mm/mm to about 0.08 mm/mm, from about 0.03 mm/mm to about 0.08 mm/mm, from about 0.03 mm/mm to about 0.07 mm/mm, from about 0.04 mm/mm to about 0.07 mm/mm, from about 0.04 mm/mm to about 0.06 mm/mm, from about 0.045 mm/mm to about 0.058 mm/mm, from about 0.045 mm/mm to about 0.055 mm/mm, from about 0.048 mm/mm to about 0.055 mm/mm, from about 0.048 mm/mm to about 0.055 mm/mm, from about 0.05 mm/mm to about 0.055 mm/mm, from about 0.052 mm/mm to about 0.055 mm/mm, or any range or subrange therebetween. In aspects, the first average transition slope in mm/mm can be greater than or equal to 5 micrometers per millimeter times a quotient of a first quantity in millimeters consisting of the substrate thickness 207 minus the central thickness 209 and a second quantity in micrometers consisting of 11 micrometers minus the central TTV. Providing a slope greater than or equal to a predetermined amount can reduce an amount of the corresponding transition region comprising intermediate thicknesses, for example, comprising a chemical strengthening induced expansion strain less than a portion of the corresponding transition region closer to the first central surface area and/or the second central surface area and/or than the first central surface area and/or the second central surface area.

In aspects, as shown in FIGS. 2-4, the central portion 281 of the foldable substrate 201 can comprise a second transition region 218 or 328 comprising a third transition surface area 217 or 317 extending between the third surface area 233 and the first central surface area 213. In further aspects, as shown, a width (e.g., second transition width 216, 316, or 326) of the second transition region 218 or 328 can be measured as the minimum distance in a direction 106 of the length 105 (see FIG. 1) between a portion of the first central surface area 213 extending along the third plane 204*b* and a portion of the third surface area 233. In even further aspects, the second transition width 216, 316, or 326 of the second transition region 218 or 328 can be within one or more of the ranges discussed above for the first transition width 214, 314, or 324. In still further aspects, the second transition width 216, 316, or 326 of the second transition region 218 or 328 can be substantially equal to (e.g., equal to) the first transition width 214, 314, or 324. In even further aspects, the second transition width 216, 316, or 326 of the second transition region 218 or 328 can be less than or equal to 2.2 millimeters minus a product of the central TTV in micrometers and 0.2 millimeters per micrometer.

In aspects, as shown in FIGS. 2-3, the second transition region 218 or 328 can comprise a fourth transition surface area 247 or 347 extending between the fourth surface area 235 and the second central surface area 243. In further aspects, a width of the fourth transition surface area 247 or 347 can be measured as the minimum distance in a direction 106 of the length 105 (see FIG. 1) between a portion of the second central surface area 243 extending along the fourth plane 206*b* and a portion of the fourth surface area 235. In even further aspects, the width of the fourth transition surface area 247 or 347 can be substantially equal to (e.g., equal to) the second transition width 216, 316, or 326. In aspects, as shown in FIGS. 2-3, a thickness of the second transition region 218 or 328 can decrease between the substrate thickness 207 of the second portion 231 and the central thickness 209 of the central portion 281. In further aspects, as shown, a thickness of the first transition region 212 or 322 can smoothly decrease, monotonically decrease, or smoothly and monotonically decrease between the substrate thickness 207 of the second portion 231 and the central thickness 209 of the central portion 281. In aspects, as shown in FIG. 4, the portion of the second transition region 218 extending between the fourth surface area 235 and the second central surface area 243 can be coplanar with one or both surface areas.

In aspects, as shown in FIGS. 2 and 4, the third transition surface area 217 can comprise a linearly inclined surface extending between the first central surface area 213 and the third surface area 233. In aspects, as shown in FIG. 3, the third transition surface area 317 can comprise a concave up shape, for example, with a local slope of the third transition surface area 317 smoothly transitioning to a slope of the first central surface area 213 while a local slope of the third transition surface area 317 is substantially different from a slope of the third surface area 233. In aspects, as shown in FIG. 3 by dashed line 313, the third transition surface area 317 can comprise a sigmoid shape. In aspects, as shown in FIG. 3 by dashed line 313 with line 319, a local slope of the third transition surface area can be greater at a midpoint of the third transition surface area than where the third transition surface area meets the first central surface area 213 and where the third transition surface area meets the third surface area 233. In aspects, as shown in FIG. 3 by dashed lines 313 and 318, can comprise a convex up shape, for example, with a local slope of the third transition surface area smoothly transitioning to a slope of the third surface area 233 while a local slope of the third transition surface area is substantially different from a slope of the first central surface area 213. In aspects, the fourth transition surface area 347 can comprise one of the shapes or properties discussed above in this paragraph for the first transition surface area. For example, as shown in FIGS. 2 and 4, the fourth transition surface area 247 can comprise a linearly inclined surface extending between the second central surface area 243 and the fourth surface area 235. As shown in FIG. 3 by dashed line 343 with line 349, a local slope of the fourth transition surface area can be greater at a midpoint of the fourth transition surface area than where the fourth transition surface area meets the second central surface area 243 and where the fourth transition surface area meets the fourth surface area 235. As shown in FIG. 3 by dashed lines 343 and 348, a local slope of the fourth transition surface area smoothly transitions to a slope of the fourth surface area 235 while a local slope of the fourth transition surface area is substantially different from a slope of the second central surface area 243.

In aspects, as shown in FIGS. 2 and 4, a thickness of the second transition region 218 can decrease at a constant rate (e.g., linearly change) from the substrate thickness 207 to the central thickness 209. In aspects, as shown in FIG. 3 with lines 319 and 349, a thickness of the second transition region 328 can decrease slower where the third transition surface area meets the first central surface area 213 than at a midpoint of the second transition region 328 and/or than where the third transition surface area meets the third surface area 233 (e.g., first portion 221). In aspects, as shown in FIG. 3 with dashed lines 313, 318, 343, and 348, a thickness of the second transition region 328 can decrease faster where the third transition surface area meets the first central surface area 213 than where the third transition surface area meets the third surface area 233. In aspects, a second average transition slope of the second transition region 218 or 328 can be within one or more of the ranges discussed above for the first average transition slope of the first transition region 212 or 322.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

As shown in FIGS. 2 and 4, the foldable apparatus 101 can comprise an adhesive layer 261. As shown, the adhesive layer 261 can comprise a first contact surface 263 and a second contact surface 265 that can be opposite the first contact surface 263. In aspects, as shown in FIGS. 2 and 4, the second contact surface 265 of the adhesive layer 261 can comprise a planar surface. In aspects, as shown in FIGS. 2 and 4, the first contact surface 263 of the adhesive layer 261 can comprise a planar surface. An adhesive thickness 267 of the adhesive layer 261 can be defined as a minimum distance between the first contact surface 263 and the second contact surface 265. In aspects, the adhesive thickness 267 of the adhesive layer 261 can be about 1 μm or more, about 5 μm or more, about 10 μm or more, about 100 μm or less, about 60 μm or less, about 30 μm or less, or about 20 μm or less. In aspects, the adhesive thickness 267 of the adhesive layer 261 can be in a range from about 1 μm to about 100 μm, from about 5 μm to about 100 μm, from about 5 μm to about 60 μm, from about 5 μm to about 30 μm, from about 10 μm to about 30 μm, from about 10 μm to about 20 μm, or any range or subrange therebetween.

In aspects, as shown in FIGS. 2 and 4, the second contact surface 265 of the adhesive layer 261 can face and/or contact the first major surface 273 of a release liner 271 (described below). In aspects, as shown in FIG. 2, the first contact surface 263 of the adhesive layer 261 can face and/or contact the second surface area 225 of the first portion 221. In aspects, as shown in FIG. 2, the first contact surface 263 of the adhesive layer 261 can face and/or contact the fourth surface area 235 of the second portion 231. In aspects, as shown in FIG. 4, the first contact surface 263 of the adhesive layer 261 can face and/or contact the first surface area 223 of the first portion 221. In aspects, as shown in FIG. 4, the first contact surface 263 of the adhesive layer 261 can face and/or contact the third surface area 233 of the second portion 231. In aspects, as shown in FIG. 4, the first contact surface 263 of the adhesive layer 261 can face the first central surface area 213 of the central portion 281. In aspects, as shown in FIG. 2, the first contact surface 263 of the adhesive layer 261 can face the second central surface area 243 of the central portion 281. In further aspects, although not shown, the first contact surface 263 of the adhesive layer 261 can contact the second central surface area 243 of the central portion 281, for example by filling the region (e.g., second recess 241) indicated as occupied by the second polymer-based portion 299 in FIG. 2. In aspects, although not shown, the second recess may not be totally filled, for example, to leave room for electronic devices and/or mechanical devices. In aspects, although not shown, the foldable substrate 201 of FIG. 4 can be configured with the adhesive layer 261 contacting the second major surface 205 rather than the first major surface 203 while the polymer-based portion 299 or a coating 251 in place of the polymer-based portion 299 can be positioned at least partially in the first recess 211.

In aspects, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further aspects, the adhesive layer 261 can comprise an optically clear adhesive. In even further aspects, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further aspects, the optically clear adhesive can comprise, but is not limited to, acrylic adhesives, for example, 3M 8212 adhesive, or an optically transparent liquid adhesive, for example, a LOCTITE optically transparent liquid adhesive. Exemplary aspects of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

In aspects, the adhesive layer 261 can comprise an elastic modulus of about 0.001 MegaPascals (MPa) or more, about 0.01 MPa or more, about 0.1 MPa or more, about 1 MPa or less, about 0.5 MPa or less, about 0.1 MPa or less, or about 0.05 MPa or less. In aspects, the adhesive layer 261 can comprise an elastic modulus in a range from about 0.001 MPa to about 1 MPa, from about 0.01 MPa to about 1 MPa, from about 0.01 MPa to about 0.5 MPa, from about 0.05 MPa to about 0.5 MPa, from about 0.1 MPa to about 0.5 MPa, from about 0.001 MPa to about 0.5 MPa, from about 0.001 MPa to about 0.01 MPa, or any range or subrange therebetween. In aspects, the adhesive layer can comprise an elastic modulus within one or more of the ranges discussed below for the elastic modulus of the polymer-based portions 289 and/or 299.

As shown in FIGS. 2 and 4, the polymer-based portion 289 and/or 299 of the foldable apparatus 101 can be positioned between the first portion 221 and the second portion 231. In aspects, as shown, the polymer-based portion can comprise a first polymer-based portion 289 at least partially positioned in and/or filling the first recess 211. In aspects, as shown in FIG. 2, the polymer-based portion can comprise a second polymer-based portion 299 at least partially positioned in and/or filling the second recess 241. In aspects, as shown in FIG. 4, the polymer-based portion can comprise a second polymer-based portion 299 at least partially positioned in and/or filling the first recess 211. In aspects, although not shown, the second recess may not be totally filled, for example, to leave room for electronic devices and/or mechanical devices.

As shown in FIG. 2, the first polymer-based portion 289 can comprise a fourth contact surface 285 opposite the third contact surface 283. In aspects, as shown, the third contact surface 283 can comprise a planar surface, for example, substantially coplanar (e.g., extend along a common plane, first plane 204*a*) with the first surface area 223 and the third surface area 233. In aspects, as shown in FIG. 2, the fourth major surface 255 of the coating 251 can face and/or contact the third contact surface 283 of the polymer-based portion 289. In aspects, the fourth contact surface 285 can comprise a planar surface, for example, substantially coplanar (e.g., extend along a common plane, third plane 204*b*) with the first central surface area 213. In further aspects, the fourth contact surface 285 can contact the first central surface area 213, the first transition surface area 215, and/or the third transition surface area 217.

As shown in FIGS. 2 and 4, the second polymer-based portion 299 can comprise a fourth contact surface 295 opposite the third contact surface 293. In aspects, the third contact surface 293 can comprise a planar surface, for example, substantially coplanar (e.g., extend along a common plane, fourth plane 206*b*) with the second central surface area 243. In further aspects, the third contact surface 293 can contact the second central surface area 243, the second transition surface area 245, and/or the fourth transition surface area 247. In aspects, as shown, the fourth contact surface 295 can comprise a planar surface, for example, substantially coplanar (e.g., extend along a common plane, second plane 206*a*) with the second surface area 225 and the fourth surface area 235. In aspects, as shown in FIGS. 2 and 4, the first contact surface 263 of the adhesive layer 261 can face and/or contact the fourth contact surface 295 of the polymer-based portion 299.

In aspects, the polymer-based portion 289 and/or 299 comprises a polymer (e.g., optically transparent polymer). In further aspects, the polymer-based portion 289 and/or 299 can comprise one or more of an optically transparent: an acrylic (e.g., polymethylmethacrylate (PMMA)), an epoxy, a silicone, and/or a polyurethane. Examples of epoxies include bisphenol-based epoxy resins, novolac-based epoxies, cycloaliphatic-based epoxies, and glycidylamine-based epoxies. In further aspects, the polymer-based portion 289 and/or 299 comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene), for example, comprising one or more of polystyrene, polydichlorophosphazene, and poly(5-ethylidene-2-norbornene). In aspects, the polymer-based portion can comprise a sol-gel material. Example aspects of polyurethanes comprise thermoset polyurethanes, for example, Dispurez 102 available from Incorez and thermoplastic polyurethanes, for example, KrystalFlex PE505 available from Huntsman. In even further aspects, the second portion can comprise an ethylene acid copolymer. An exemplary aspect of an ethylene acid copolymer includes SURLYN available from Dow (e.g., Surlyn PC-2000, Surlyn 8940, Surlyn 8150). An additional exemplary aspect for the second portion comprises Eleglass w802-GL044 available from Axalta with from 1 wt % to 2 wt % cross-linker. In aspects, the polymer-based portion 289 and/or 299 can further comprise nanoparticles, for example, carbon black, carbon nanotubes, silica nanoparticles, or nanoparticles comprising a polymer. In aspects, the polymer-based portion can further comprise fibers to form a polymer-fiber composite.

In aspects, the polymer-based portion 289 and/or 299 can comprise a coefficient of thermal expansion (CTE). As used herein, a coefficient of thermal expansion is measured in accordance with ASTM E289-17 using a Picoscale Michelson Interferometer between −20° C. and 40° C. In aspects, the polymer-based portion 289 and/or 299 can comprise particles of one or more of copper oxide, beta-quartz, a tungstate, a vanadate, a pyrophosphate, and/or a nickel-titanium alloy. In aspects, the polymer-based portion 289 and/or 299 can comprise a CTE of about $-20\times10^{-7}$ 1/° C. or more, about $-10\times10^{-7}$ 1/° C. or more, about $-5\times10^{-7}$ 1/° C. or more, about $-2\times10^{-7}$ 1/° C. or more, about $10\times10^{-7}$ 1/° C. or less, about $5\times10^{-7}$ 1/° C. or less, about $2\times10^{-7}$ 1/° C. or less, about $1\times10^{-7}$ 1/° C. or less, or 0 1/° C. or less. In aspects, the polymer-based portion 289 and/or 299 can comprise a CTE in a range from about $-20\times10^{-7}$ 1/° C. to about $10\times10^{-7}$ 1/° C., from about $-20\times10^{-7}$ 1/° C. to about $5\times10^{-7}$ 1/° C., from about $-10\times10^{-7}$ 1/° C. to about $-5\times10^{-7}$ 1/° C., from about $-10\times10^{-7}$ 1/° C. to about $2\times10^{-7}$ 1/° C., from about $-10\times10^{-7}$ 1/° C. to 0 1/° C., from about $-5\times10^{-7}$ 1/° C. to 0 1/° C., from about $-2\times10^{-7}$ 1/° C. to about 0 1/° C., or any range or subrange therebetween. By providing a polymer-based portion comprising a low (e.g., negative) coefficient of thermal expansion, warp caused by volume changes during curing of the polymer-based portion can be mitigated.

In aspects, the polymer-based portion 289 and/or 299 can comprise an elastic modulus of about 0.001 MegaPascals (MPa) or more, about 0.001 MP or more, about 1 MPa or more, about 10 MPa or more, about 20 MPa or more, about 100 MPa or more, about 200 MPa or more, about 1,000 MPa or more, about 5,000 MPa or less, about 3,000 MPa or less, about 1,000 MPa or less, about 500 MPa or less, or about 200 MPa or less. In aspects, the polymer-based portion 289 and/or 299 can comprise an elastic modulus in a range from about 0.001 MPa to about 5,000 MPa, from about 0.01 MPa to about 3,000 MPa, from about 0.01 MPa to about 1,000 MPa, from about 0.01 MPa to about 500 MPa, from about 0.01 MPa to about 200 MPa, from about 1 MPa to about 200 MPa, from about 10 MPa to about 200 MPa, from about 100 MPa to about 200 MPa, or any range or subrange therebetween. In aspects, the polymer-based portion 289 and/or 299 can comprise an elastic modulus in a range from about 1 MPa to about 5,000 MPa, from about 10 MPa to about 5,000 MPa, from about 10 MPa to about 1,000 MPa, from about 20 MPa to about 1,000 MPa, from about 20 MPa to about 200 MPa, or any range or subrange therebetween. In aspects, the elastic modulus of the polymer-based portion 289 and/or 299 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. By providing a polymer-based portion 289 and/or 299 with an elastic modulus in a range from about 0.001 MPa to about 5,000 MPa (e.g., in a range from about 10 MPa to about 3 GPa), folding of the foldable apparatus without failure can be facilitated. In aspects, the adhesive layer 261 comprises an elastic modulus greater than the elastic modulus of the polymer-based portion 289 and/or 299, which arrangement provides improved performance in puncture resistance. In aspects, the elastic modulus of the polymer-based portion 289 and/or 299 can be less than the elastic modulus of the foldable substrate 201. In aspects, the adhesive layer 261 may comprise an elastic modulus within the ranges listed above in this paragraph. In further aspects, the adhesive layer 261 may comprise substantially the same elastic modulus as the elastic modulus of the polymer-based portion 289 and/or 299. In further aspects, the elastic modulus of the adhesive layer 261 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. In aspects, the elastic modulus of the polymer-based portion 289 and/or 299 can be less than the elastic modulus of the foldable substrate 201.

In aspects, as shown in FIG. 2, a coating 251 can be disposed over the first major surface 203 of the foldable substrate 201. In further aspects, the coating 251 can be disposed over the first portion 221, the second portion 231, and the central portion 281. In aspects, the coating 251 can comprise a third major surface 253 and a fourth major surface 255 opposite the third major surface 253. In further aspects, the coating 251 (e.g., fourth major surface 255) can contact the foldable substrate 201 (e.g., first major surface 203). In further aspects, at least a part of the coating 251 can be positioned in the first recess 211. In even further aspects, the coating 251 can fill the first recess 211. In further aspects, the coating 251 can comprise a coating thickness 257 defined between the third major surface 253 and the fourth major surface 255. In further aspects, the coating thickness 257 can be about 0.1 μm or more, about 1 μm or more, about 5 μm or more, about 10 μm or more, about 15 μm or more, about 20 μm or more, about 25 μm or more, about 40 μm or more, about 50 μm or more, about 60 μm or more, about 70 μm or more, about 80 μm or more, about 90 μm or more, about 200 μm or less, about 100 μm or less, or about 50 μm or less, about 30 μm or less, about 25 μm or less, about 20 μm or less, about 20 μm or less, about 15 μm or less, or about 10 μm or less. In aspects, the coating thickness 257 can be in a range from about 0.1 μm to about 200 μm, from about 1 μm to about 200 μm, from about 10 μm to about 200 μm, from about 50 μm to about 200 μm, from about 0.1 μm to about 100 μm, from about 1 μm to about 100 μm, from about 10 μm to about 100 μm, from about 20 μm to about 100 μm, from about 30 μm to about 100 μm, from about 40 μm to about 100 μm, from about 50 μm to about 100 μm, from about 60 μm to about 100 μm, from about 70 μm to about 100 μm, from about 80 μm to about 100 μm, from about 90 μm to about 100 μm, from about 0.1 μm to about 50 μm, from about 1 μm to about 50 μm, from about 10 μm to about 50 μm, or any range or subrange therebetween. In further aspects, the coating thickness 257 can be in a range from about 0.1 μm to about 50 μm, from about 0.1 μm to about 30 μm, from about 0.1 μm to about 25 μm, from about 0.1 μm to about 20 μm, from about 0.1 μm to about 15 μm, from about 0.1 μm to about 10 μm, from about 1 μm to about 30 μm, from about 1 μm to about 25 μm, from about 1 μm to about 20 μm, from about 1 μm to about 15 μm, from about 1 μm to about 10 μm, from about 5 μm to about 30 μm, from about 5 μm to about 25 μm, from about 5 μm to about 20 μm, from about 5 μm to about 15 μm, from about 5 μm to about 10 μm, from about 10 μm to about 30 μm, from about 10 μm to about 25 μm, from about 10 μm to about 20 μm, from about 10 μm to about 15 μm, from about 15 μm to about 30 μm, from about 15 μm to about 25 μm, from about 15 μm to about 20 μm, from about 20 μm to about 30 μm, from about 20 μm to about 25 μm, or any range or subrange therebetween.

In aspects, the coating 251 can comprise a polymeric hard coating. In further aspects, the polymeric hard coating can comprise one or more of an ethylene-acid copolymer, a polyurethane-based polymer, an acrylate resin, and a mercapto-ester resin. Example aspects of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example aspects of polyurethane-based polymers include aqueous modified polyurethane dispersions (e.g., Eleglas®, manufactured by Axalta). Example aspects of acrylate resins that can be UV curable include acrylate resins (e.g., Uvekol® resin, manufactured by Allinex), cyanoacrylate adhesives (e.g., Permabond® UV620, manufactured by Krayden), and UV radical acrylic resins (e.g., Ultrabond windshield repair resin, for example, Ultrabond (45CPS)). Example aspects of mercapto-ester resins include mercapto-ester triallyl isocyanurates (e.g., Norland optical adhesive NOA 61). In further aspects, the polymeric hard coating can comprise ethylene-acrylic acid copolymers and ethylene-methacrylic acid copolymers, which may be ionomerized to form ionomer resins through neutralization of the carboxylic acid residue with typically alkali-metal ions, for example, sodium and potassium, and also zinc. Such ethylene-acrylic acid and ethylene-methacrylic acid ionomers may be dispersed in water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low energy fracture.

In aspects, the coating can comprise a polymeric hard coating comprising an optically transparent polymeric hard-coat layer. Suitable materials for an optically transparent polymeric hard-coat layer include but are not limited to a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In aspects, an optically transparent polymeric hard-coat layer may consist essentially of one or more of these materials. In aspects, an optically transparent polymeric hard-coat layer may consist of one or more of these materials. As used herein, “inorganic-organic hybrid polymeric material” means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In aspects, an OTP hard-coat layer may consist essentially of an organic polymer material, an inorganic-organic hybrid polymeric material, or aliphatic or aromatic hexafunctional urethane acrylate. In aspects, an OTP hard-coat layer may consist of a polyimide, an organic polymer material, an inorganic-organic hybrid polymeric material, or aliphatic or aromatic hexafunctional urethane acrylate. In aspects, an OTP hard-coat layer may include a nanocomposite material. In aspects, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, “organic polymer material” means a polymeric material comprising monomers with only organic components. In aspects, an OTP hard-coat layer may comprise an organic polymer material manufactured by Gunze Limited and having a hardness of 9H, for example Gunze’s “Highly Durable Transparent Film.” As used herein, “inorganic-organic hybrid polymeric material” means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In aspects, the inorganic-organic hybrid polymeric material may include polymerized monomers comprising an inorganic silicon-based group, for example, a silsesquioxane polymer. A silsesquioxane polymer may be, for example, an alkyl-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In aspects, an OTP hard-coat layer may comprise a silsesquioxane polymer combined with an organic matrix, for example, SILPLUS manufactured by Nippon Steel Chemical Co., Ltd. In aspects, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In aspects, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. In aspects, an OTP hard-coat layer may be an aliphatic or aromatic hexafunctional urethane acrylate material layer having a thickness within one or more of the thickness ranges discussed above in this paragraph.

In aspects, the coating 251, if provided, may also comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

Providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials (e.g., coating 251, first polymer-based portion 289) can be positioned in the first recess, which can improve impact resistance, puncture resistance, abrasion resistance, and/or scratch resistance of the foldable apparatus. Additionally, controlling properties of a first material (e.g., coating 251, first polymer-based portion 289) positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure. Providing a first recess opposite a second recess can reduce the strain encountered by the polymer-based portion or other material (e.g., adhesive layer) in the recess (e.g., from 0% to 50% reduction). Consequently, requirements for a strain at yield of the polymer-based portion can be relaxed. In aspects, a strain at yield of the polymer-based portion and/or adhesive layer can be about 3% or more, about 4% or more, about 5% or more, about 6% or more, about 7% or more, about 500% or less, about 100% or less, about 50% or less, about 20% or less, about 15% or less, about 10% or less, about 9% or less, or about 8% or less. In aspects, the strain at yield of the polymer-based portion and/or adhesive layer can be in a range from about 1% to about 500%, from about 1% to about 100%, from about 2% to about 100%, from about 2% to about 50%, from about 3% to about 50%, from about 3% to about 20%, from about 4% to about 20%, from about 4% to about 15%, from about 5% to about 15%, from about 5% to about 10%, from about 5% to about 9%, from about 6% to about 9%, from about 6% to about 8%, from about 7% to about 8% or any range or subrange therebetween.

In aspects, as shown in FIGS. 2 and 4, the foldable apparatus 101 can comprise the release liner 271 although other substrates (e.g., glass-based substrate and/or ceramic-based substrate discussed throughout the application) may be used in further aspects rather than the illustrated release liner 271. In further aspects, as shown, the release liner 271, or another substrate, can be disposed over the adhesive layer 261. In even further aspects, as shown, the release liner 271, or another substrate, can directly contact the second contact surface 265 of the adhesive layer 261. The release liner 271, or another substrate, can comprise a first major surface 273 and a second major surface 275 opposite the first major surface 273. As shown, the release liner 271, or another substrate, can be disposed on the adhesive layer 261 by attaching the second contact surface 265 of the adhesive layer 261 to the first major surface 273 of the release liner 271, or another substrate. In aspects, as shown, the first major surface 273 of the release liner 271, or another substrate, can comprise a planar surface. In aspects, as shown, the second major surface 275 of the release liner 271, or another substrate, can comprise a planar surface. A substrate comprising the release liner 271 can comprise a paper and/or a polymer. Exemplary aspects of paper comprise kraft paper, machine-finished paper, poly-coated paper (e.g., polymer-coated, glassine paper, siliconized paper), or clay-coated paper. Exemplary aspects of polymers comprise polyesters (e.g., polyethylene terephthalate (PET)) and polyolefins (e.g., low-density polyethylene (LDPE), high-density polyethylene (HDPE), polypropylene (PP)).

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The display can comprise liquid crystal display (LCD), an electrophoretic display (EPD), an organic light-emitting diode (OLED) display, or a plasma display panel (PDP). The consumer electronic product can comprise a cover substrate disposed over the display. In aspects, at least one of a portion of the housing or the cover substrate comprises the foldable apparatus discussed throughout the disclosure. The consumer electronic product can comprise a portable electronic device, for example, a smartphone, a tablet, a wearable device, or a laptop.

Figure 8:
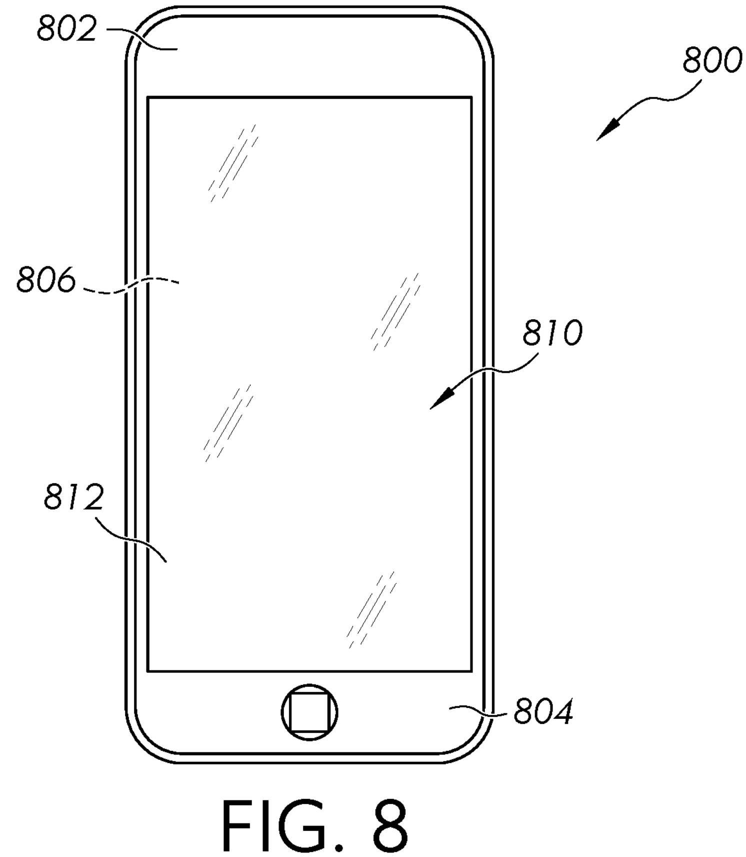
FIG. 8 is a schematic plan view of an example consumer electronic device according to aspects.
Figure 9:
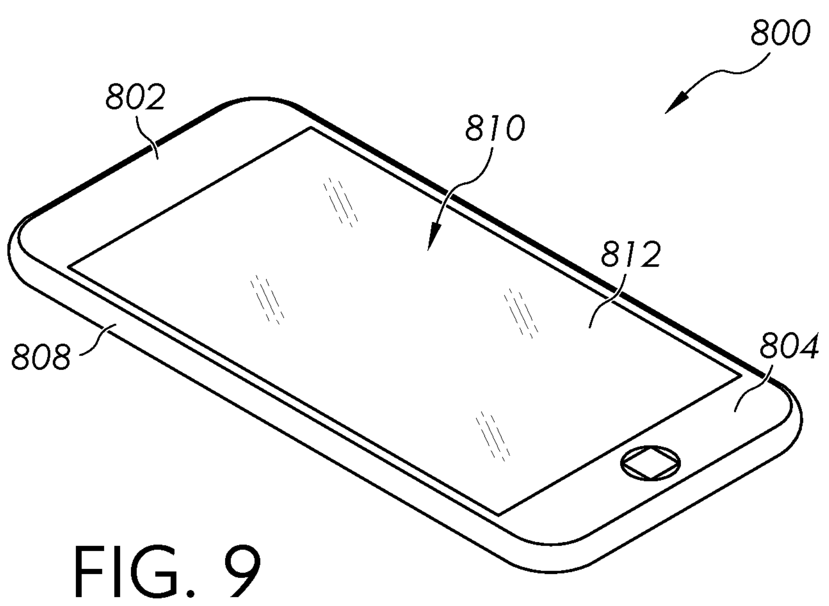
FIG. 9 is a schematic perspective view of the example consumer electronic device of FIG. 8.

The foldable apparatus disclosed herein may be incorporated into another article, for example, an article with a display (or display articles) (e.g., consumer electronics, including mobile phones, tablets, computers, navigation systems, wearable devices (e.g., watches), and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 8-9. Specifically, FIGS. 8-9 show a consumer electronic device 800 including a housing 802 having front 804, back 806, and side surfaces 808. Although not shown, the consumer electronic device can comprise electrical components that are at least partially inside or entirely within the housing. For example, electrical components include at least a controller, a memory, and a display. As shown in FIGS. 8-9, the display 810 can be at or adjacent to the front surface of the housing 802. The consumer electronic device can comprise a cover substrate 812 at or over the front surface of the housing 802 such that it is over the display 810. In aspects, at least one of the cover substrate 812 or a portion of housing 802 may include any of the foldable apparatus disclosed herein, for example, the foldable substrate.

In aspects, the foldable substrate 201 can comprise a glass-based substrate and/or a ceramic-based substrate, and the first portion 221, the second portion 231, and/or the central portion 281 can comprise one or more compressive stress regions. In aspects, a compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the first portion 221, the second portion 231, and/or the central portion 281 can enable good impact and/or puncture resistance (e.g., resists failure for a pen drop height of about 15 centimeters (cm) or more, about 20 cm or more, about 50 cm or more). Without wishing to be bound by theory, chemically strengthening the first portion 221, the second portion 231, and/or the central portion 281 can enable small (e.g., smaller than about 10 mm or less) bend radii because the compressive stress from the chemical strengthening can counteract the bend-induced tensile stress on the outermost surface of the substrate. A compressive stress region may extend into a portion of the first portion and/or the second portion for a depth called the depth of compression. As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure a depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 μm, SCALP is used to measure the depth of compression and central tension (CT). Where the stress in the substrate and/or portion is generated by exchanging both potassium and sodium ions into the substrate and/or portion, and the article being measured is thicker than about 400 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate and/or portion (e.g., sodium, potassium). Through the disclosure, when the maximum central tension cannot be measured directly by SCALP (as when the article being measured is thinner than about 400 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the first portion 221 comprising the glass-based portion and/or ceramic-based portion may comprise a first compressive stress region at the first surface area 223 that can extend to a first depth of compression from the first surface area 223. In aspects, the first portion 221 comprising a first glass-based and/or ceramic-based portion may comprise a second compressive stress region at the second surface area 225 that can extend to a second depth of compression from the second surface area 225. In aspects, the first depth of compression and/or the second depth of compression as a percentage of the substrate thickness 207 can be about 1% or more, about 5% or more, about 10% or more, about 30% or less, about 25% or less, or about 20% or less. In aspects, the first depth of compression and/or the second depth of compression as a percentage of the substrate thickness 207 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of compression and/or the second depth of compression as a percentage of the substrate thickness 207 can be about 10% or less, for example, from about 1% to about 10%, from about 1% to about 8%, from about 3% to about 8%, from about 5% to about 8%, or any range or subrange therebetween. In further aspects, the first depth of compression can be substantially equal to the second depth of compression. In aspects, the first depth of compression and/or the second depth of compression can be about 1 μm or more, about 10 μm or more, about 30 μm or more, about 50 μm or more, about 200 μm or less, about 150 μm or less, about 100 μm or less, or about 60 μm or less. In aspects, the first depth of compression and/or the second depth of compression can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween. By providing a first portion comprising a first glass-based and/or ceramic-based portion comprising a first depth of compression and/or a second depth of compression in a range from about 1% to about 30% of the first thickness, good impact and/or puncture resistance can be enabled.

In aspects, the first compressive stress region can comprise a maximum first compressive stress. In aspects, the second compressive stress region can comprise a maximum second compressive stress. In further aspects, the maximum first compressive stress and/or the maximum second compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the maximum first compressive stress and/or the maximum second compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, from about 500 MPa to about 800 MPa, or any range or subrange therebetween. By providing a maximum first compressive stress and/or a maximum second compressive stress in a range from about 100 MPa to about 1,500 MPa, good impact and/or puncture resistance can be enabled.

In aspects, the first portion 221 can comprise a first depth of layer of one or more alkali-metal ions associated with the first compressive stress region. In aspects, the first portion 221 can comprise a second depth of layer of one or more alkali-metal ions associated with the second compressive stress region and the second depth of compression. As used herein, the one or more alkali-metal ions of a depth of layer of one or more alkali-metal ions can include sodium, potassium, rubidium, cesium, and/or francium. In aspects, the one or more alkali ions of the first depth of layer of the one or more alkali ions and/or the second depth of layer of the one or more alkali ions comprises potassium. In aspects, the first depth of layer and/or the second depth of layer as a percentage of the substrate thickness 207 can be about 1% or more, about 5% or more, about 10% or more, about 40% or less, about 35% or less, about 30% or less, about 25% or less, or about 20% or less. In aspects, the first depth of layer and/or the second depth of layer as a percentage of the substrate thickness 207 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of layer of the one or more alkali-metal ions and/or the second depth of layer of the one or more alkali-metal ions as a percentage of the substrate thickness 207 can be about 10% or less, for example, from about 1% to about 10%, from about 1% to about 8%, from about 3% to about 8%, from about 5% to about 8%, or any range or subrange therebetween. In aspects, the first depth of layer of the one or more alkali-metal ions and/or the second depth of layer of the one or more alkali-metal ions can be about 1 μm or more, about 10 μm or more, about 30 μm or more, about 50 μm or more, about 200 μm or less, about 150 μm or less, about 100 μm or less, or about 60 μm or less. In aspects, the first depth of layer of the one or more alkali-metal ions and/or the second depth of layer of the one or more alkali-metal ions can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween.

In aspects, the first portion 221 may comprise a first tensile stress region. In aspects, the first tensile stress region can be positioned between the first compressive stress region and the second compressive stress region. In aspects, the first tensile stress region can comprise a maximum first tensile stress. In further aspects, the maximum first tensile stress can be about 10 MPa or more, about 20 MPa or more, about 30 MPa or more, about 100 MPa or less, about 80 MPa or less, or about 60 MPa or less. In further aspects, the maximum first tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a maximum first tensile stress in a range from about 10 MPa to about 100 MPa can enable good impact and/or puncture resistance while providing low energy fractures, as discussed below.

In aspects, the first portion 221 can comprise a first average concentration of potassium on an oxide basis. As used herein, "on an oxide basis" means the component is measured as if the non-oxygen components in the compound were converted into a specified oxide form or a fully oxidized oxide if a specific oxide form is not specified. For example, sodium (Na) on an oxide basis refers to amounts in terms of sodium oxide ($Na_2O$) while potassium on an oxide basis refers to amounts in terms of potassium oxide ($K_2O$). As such, a component need not actually be in the specified oxide form or in the fully oxidized oxide form in order for the component to count in measures on "an oxide basis." As such, a measurement "an oxide basis" for a specific component comprises conceptually converting materials comprising the non-oxygen element of the specific component into the specified oxide form or the fully oxidized oxide if a specific oxide form is not specified before calculating the concentration on an oxide basis. In aspects, the first average concentration of potassium on an oxide basis can be about 10 parts per million (ppm) or more, about 50 ppm or more, about 200 ppm or more, about 500 ppm or more, about 1,000 ppm or more, about 2,000 ppm or more, about 300,000 or less, about 100,000 ppm or less, about 50,000 ppm or less, about 20,000 ppm or less, about 10,000 ppm or less, or about 5,000 ppm or less. In aspects, the first average concentration of potassium on an oxide basis can be in a range from about 10 ppm to about 300,000 ppm, from about 50 ppm to about 300,000, from about 50 ppm to about 100,000, from about 200 ppm to about 100,000, from about 200 ppm to about 50,000 ppm, from about 500 ppm to about 50,000, from about 500 ppm to about 20,000 ppm, from about 1,000 ppm to about 20,000 ppm, from about 2,000 ppm to about 10,000 ppm, from about 2,000 ppm to about 5,000 ppm, or any range or subrange therebetween. Without wishing to be bound by theory, the average concentration of potassium comprises potassium introduce through chemically strengthening and potassium in the as-formed foldable substrate.

In aspects, the second portion 231 comprising a second glass-based and/or ceramic-based portion may comprise a third compressive stress region at the third surface area 233 that can extend to a third depth of compression from the third surface area 233. In aspects, the second portion 231 comprising a second glass-based and/or ceramic-based portion may comprise a fourth compressive stress region at the fourth surface area 235 that can extend to a fourth depth of compression from the fourth surface area 235. In aspects, the third depth of compression and/or the fourth depth of compression as a percentage of the substrate thickness 207 can be about 1% or more, about 5% or more, about 10% or more, about 30% or less, about 25% or less, or about 20% or less. In aspects, the third depth of compression and/or the fourth depth of compression as a percentage of the substrate thickness 207 can be within one or more of the ranges discussed above for the first depth of compression and/or the second depth of compression as a percentage of the substrate thickness 207. In further aspects, the third depth of compression can be substantially equal to the fourth depth of compression. In aspects, the third depth of compression and/or the fourth depth of compression can be within one or more of the ranges discussed above for the first depth of compression and/or the second depth of compression. By providing a second portion comprising a glass-based and/or ceramic-based portion comprising a third depth of compression and/or a fourth depth of compression in a range from about 1% to about 30% of the substrate thickness, good impact and/or puncture resistance can be enabled.

In aspects, the third compressive stress region can comprise a maximum third compressive stress. In aspects, the fourth compressive stress region can comprise a maximum fourth compressive stress. In further aspects, the maximum third compressive stress and/or the maximum fourth compressive stress can be within one or more of the ranges discussed above for the maximum first compressive stress and/or the maximum second compressive stress. By providing a maximum third compressive stress and/or a maximum fourth compressive stress in a range from about 100 MPa to about 1,500 MPa, good impact and/or puncture resistance can be enabled.

In aspects, the second portion 231 can comprise a third depth of layer of one or more alkali-metal ions associated with the third compressive stress region and the third depth of compression. In aspects, the second portion 231 can comprise a fourth depth of layer of one or more alkali-metal ions associated with the fourth compressive stress region and the fourth depth of compression. In aspects, the one or more alkali ions of the third depth of layer of the one or more alkali ions and/or the fourth depth of layer of the one or more alkali ions comprises potassium. In aspects, the third depth of layer and/or the fourth depth of layer as a percentage of the substrate thickness 207 can be within one or more of the ranges discussed above for the first depth of layer and/or the second depth of layer as a percentage of the substrate thickness 207. In aspects, the third depth of layer of the one or more alkali-metal ions and/or the fourth depth of layer of the one or more alkali-metal ions can be the first depth of layer and/or the second depth of layer.

In aspects, the second portion 231 may comprise a second tensile stress region. In aspects, the second tensile stress region can be positioned between the third compressive stress region and the fourth compressive stress region. In aspects, the second tensile stress region can comprise a maximum second tensile stress. In further aspects, the maximum second tensile stress can be within one or more of the ranges discussed above for the maximum first tensile stress. In aspects, the maximum first tensile stress can be substantially equal to the maximum second tensile stress. Providing a maximum second tensile stress in a range from about 10 MPa to about 100 MPa can enable good impact and/or puncture resistance while providing low energy fractures, as discussed below.

In aspects, the second portion 231 can comprise a second average concentration of potassium on an oxide basis. In aspects, the second average concentration of potassium on an oxide basis can be within one or more of the ranges discussed above for the first average concentration of potassium on an oxide basis. In aspects, the first average concentration of potassium on an oxide basis can be substantially equal to the second average concentration of potassium on an oxide basis.

In aspects, the first depth of compression can be substantially equal to the third depth of compression. In aspects, the second depth of compression can be substantially equal to the fourth depth of compression. In aspects, the maximum first compressive stress can be substantially equal to the maximum third compressive stress. In aspects, the maximum second compressive stress can be substantially equal to the maximum fourth compressive stress. In aspects, the first depth of layer of one or more alkali-metal ions can be substantially equal to the third depth of layer of one or more alkali-metal ions. In aspects, the second depth of layer of one or more alkali-metal ions can be substantially equal to the fourth depth of layer of one or more alkali-metal ions. In aspects, the first average concentration of potassium can be substantially equal to the second average concentration of potassium.

In aspects, the central portion 281 can comprise a first central compressive stress region at the first central surface area 213 that can extend to a first central depth of compression from the first central surface area 213. In aspects, the central portion 281 can comprise a second central compressive stress region at the second central surface area 243 that can extend to a second central depth of compression from the second central surface area 243. In further aspects, the first central depth of compression and/or the second central depth of compression as a percentage of the central thickness 209 can be within one or more of the ranges discussed above for the first depth of compression and/or the second depth of compression as a percentage of the substrate thickness 207. In further aspects, the first central depth of compression and/or the second central depth of compression as a percentage of the central thickness 209 can be about 10% or more, for example, from about 10% to about 30%, from about 10% to about 25%, from about 15% to about 25%, from about 15% to about 20%, or any range or subrange therebetween. In further aspects, the first central depth of compression can be substantially equal to the second central depth of compression. In aspects, the first central depth of compression and/or the second central depth of compression can be within one or more of the ranges discussed above for the first depth of compression and/or the second depth of compression. By providing a central portion comprising a glass-based and/or ceramic-based portion comprising a first central depth of compression and/or a second central depth of compression in a range from about 1% to about 30% of the central thickness, good impact and/or puncture resistance can be enabled.

In aspects, the first central compressive stress region can comprise a maximum first central compressive stress. In aspects, the second central compressive stress region can comprise a maximum second central compressive stress. In further aspects, the maximum first central compressive stress and/or the maximum second central compressive stress can be within one or more of the ranges discussed above for the maximum first compressive stress and/or the maximum second compressive stress. By providing a maximum first central compressive stress and/or a maximum second central compressive stress in a range from about 100 MPa to about 1,500 MPa, good impact and/or puncture resistance can be enabled.

In aspects, the central portion 281 can comprise a first central depth of layer of one or more alkali-metal ions associated with the first central compressive stress region and the first central depth of compression. In aspects, the central portion 281 can comprise a second central depth of layer of one or more alkali-metal ions associated with the second central compressive stress region and the second central depth of compression. In aspects, the one or more alkali ions of the first central depth of layer of the one or more alkali ions and/or the second central depth of layer of the one or more alkali ions comprises potassium. In aspects, the first central depth of layer and/or the second central depth of layer as a percentage of the central thickness 209 can be within one or more of the ranges discussed above for the first depth of layer and/or the second depth of layer as a percentage of the substrate thickness 207. In aspects, the first central depth of layer of the one or more alkali-metal ions and/or the second central depth of layer of the one or more alkali-metal ions can be within one or more of the ranges discussed above for the first depth of layer and/or the second depth of layer. In aspects, the first depth of compression and/or the third depth of compression can be greater than the first central depth of compression. In aspects, the second depth of compression and/or the fourth depth of compression can be greater than the second central depth of compression. In aspects, the first depth of layer and/or the third depth of layer can be greater than the first central depth of layer. In aspects, the second depth of layer and/or the fourth depth of layer can be greater than the second central depth of layer.

In aspects, the central portion 281 may comprise a central tensile stress region. In aspects, the central tensile stress region can be positioned between the first central compressive stress region and the second central compressive stress region. In aspects, the central tensile stress region can comprise a maximum central tensile stress. In further aspects, the maximum central tensile stress can be about 125 MPa or more, about 150 MPa or more, about 200 MPa or more, about 375 MPa or less, about 300 MPa or less, or about 250 MPa or less. In further aspects, the maximum central tensile stress can be in a range from about 125 MPa to about 375 MPa, from about 125 MPa to about 300 MPa, from about 125 MPa to about 250 MPa, from about 150 MPa to about 375 MPa, from about 150 MPa to about 300 MPa, from about 150 MPa to about 250 MPa, from about 200 MPa to about 375 MPa, from about 200 MPa to about 300 MPa, from about 200 MPa to about 250 MPa, or any range or subrange therebetween. Providing a maximum central tensile stress in a range from about 125 MPa to about 375 MPa can enable low minimum bend radii.

In aspects, the central portion 281 can comprise a central average concentration of potassium on an oxide basis. In aspects, the central average concentration of potassium on an oxide basis can be within one or more of the ranges discussed above for the first average concentration of potassium on an oxide basis.

In aspects, the first transition region 212 or 322 can comprise a first transition compressive stress region at the first transition surface area 215 that can extend to a first transition depth of compression from the first transition surface area 215. In aspects, the first transition region 212 or 322 can comprise a second transition compressive stress region at the second transition surface area 245 that can extend to a second transition depth of compression from the second transition surface area 245. In further aspects, the first transition depth of compression can be substantially equal to the second transition depth of compression. In aspects, the first transition depth of compression and/or the second transition depth of compression can be within one or more of the ranges discussed above for the first depth of compression and/or the second depth of compression. In aspects, the first transition compressive stress region can comprise a maximum first transition compressive stress. In aspects, the second transition compressive stress region can comprise a maximum second transition compressive stress. In further aspects, the maximum first transition compressive stress and/or the maximum second transition compressive stress can be within one or more of the ranges discussed above for the maximum first compressive stress and/or the maximum second compressive stress.

In aspects, the first transition region 212 or 322 can comprise a first transition depth of layer of one or more alkali-metal ions associated with the first transition compressive stress region and the first depth of compression. In aspects, the first transition region 212 or 322 can comprise a second transition depth of layer of one or more alkali-metal ions associated with the second transition compressive stress region and the second depth of compression. In aspects, the one or more alkali ions of the first transition depth of layer of the one or more alkali ions and/or the second transition depth of layer of the one or more alkali ions comprises potassium. In aspects, the first transition depth of layer of the one or more alkali-metal ions and/or the second transition depth of layer of the one or more alkali-metal ions can be within one or more of the ranges discussed above for the first depth of layer and/or the second depth of layer. In aspects, the first transition region 212 or 322 may comprise a first transition tensile stress region. In aspects, the first transition tensile stress region can be positioned between the first transition compressive stress region and the second transition compressive stress region. In aspects, the first transition tensile stress region can comprise a maximum first transition tensile stress. In further aspects, the maximum first transition tensile stress can be within one or more of the ranges discussed above for the maximum central tensile stress.

In aspects, the first transition region 212 or 322 can comprise a first transition average concentration of potassium on an oxide basis. In aspects, the first transition average concentration of potassium on an oxide basis can be within one or more of the ranges discussed above for the first average concentration of potassium on an oxide basis.

In aspects, the second transition region 218 or 328 can comprise a third transition compressive stress region at the third transition surface area 217 that can extend to a third transition depth of compression from the third transition surface area 217. In aspects, the second transition region 218 or 328 can comprise a fourth transition compressive stress region at the fourth transition surface area 247 that can extend to a fourth transition depth of compression from the fourth transition surface area 247. In further aspects, the third transition depth of compression can be substantially equal to the fourth transition depth of compression. In aspects, the third transition depth of compression and/or the fourth transition depth of compression can be within one or more of the ranges discussed above for the first depth of compression and/or the second depth of compression.

In aspects, the third transition compressive stress region can comprise a maximum third transition compressive stress. In aspects, the fourth transition compressive stress region can comprise a maximum fourth transition compressive stress. In further aspects, the maximum third transition compressive stress and/or the maximum fourth transition compressive stress can be within one or more of the ranges discussed above for the maximum first compressive stress and/or the maximum second compressive stress.

In aspects, the second transition region 218 or 328 can comprise a third transition depth of layer of one or more alkali-metal ions associated with the third transition compressive stress region and the third depth of compression. In aspects, the second transition region 218 or 328 can comprise a fourth transition depth of layer of one or more alkali-metal ions associated with the fourth transition compressive stress region and the fourth depth of compression. In aspects, the one or more alkali ions of the third transition depth of layer of the one or more alkali ions and/or the fourth transition depth of layer of the one or more alkali ions comprises potassium. In aspects, the third transition depth of layer of the one or more alkali-metal ions and/or the fourth transition depth of layer of the one or more alkali-metal ions can be within one or more of the ranges discussed above for the first depth of layer and/or the second depth of layer.

In aspects, the second transition region 218 or 328 may comprise a second transition tensile stress region. In aspects, the second transition tensile stress region can be positioned between the third transition compressive stress region and the fourth transition compressive stress region. In aspects, the third transition tensile stress region can comprise a maximum second transition tensile stress. In further aspects, the maximum second transition tensile stress can be within one or more of the ranges discussed above for the maximum central tensile stress.

In aspects, the second transition region 218 or 328 can comprise a second transition average concentration of potassium on an oxide basis. In aspects, the second transition average concentration of potassium on an oxide basis can be within one or more of the ranges discussed above for the first average concentration of potassium on an oxide basis.

Foldable substrates (e.g., foldable substrate 201) can be subject to a variety of types of mechanical instabilities. Throughout the disclosure, mechanical instabilities include localized mechanical instabilities as well as systemic mechanical instabilities. As used herein, a localized mechanical instability manifests as a deviation (e.g., a plurality of deviations) from a plane of a surface (e.g., first central surface area) without distorting the surface as a whole, for example, buckling and/or wrinkling. As used herein, a systemic mechanical instability manifests as a distortion of an entire surface from a plane, for example, warpage. An onset of mechanical instability (e.g., localized mechanical instability) may occur when a critical strain (e.g., critical buckling strain) of a portion (e.g., central portion) of the foldable substrate is exceeded. For example, a critical buckling strain of a central portion resembling the foldable substrate 201 of FIG. 2 comprising a width of the central portion 281 of 20 mm can be approximated by $10^6$ times the central thickness squared minus 23 times the central thickness plus 0.0006. For example, without wishing to be bound by theory, a critical buckling strain of a central portion resembling the foldable substrate 201 of FIG. 2 comprising a central thickness 209 of 30 μm can be approximated by $3\times10^{-7}$ divided by a square of the width of the central portion 281.

Chemical strengthening induced expansion strain of the central portion of the foldable substrate resulting from chemically strengthening the foldable substrate is proportional to a product of the network dilation coefficient (B), a concentration difference (C), and a difference between a depth of layer of the central portion divided by the central thickness and a depth of layer of the first portion (or second portion) divided by the substrate thickness. As used herein, a network dilation coefficient refers to how much a volume of a foldable substrate (e.g., first portion, second portion, central portion) expands as a result of an increase in the concentration of one or more alkali ions exchanged into the substrate (e.g., as a result of chemical strengthening). In aspects, a network dilation constant of the first portion and/or a network dilation constant of the second portion can be substantially equal to a network dilation constant of the central portion, for example, if the first portion and/or the second portion and the central portion all comprise the same material prior to the chemically strengthening. Without wishing to be bound by theory, it has been observed that mechanical instabilities in the central portion occur when the chemical strengthening induced expansion strain of the central portion is not greater than that in the first transition region and/or the second transition region.

Figure 32:
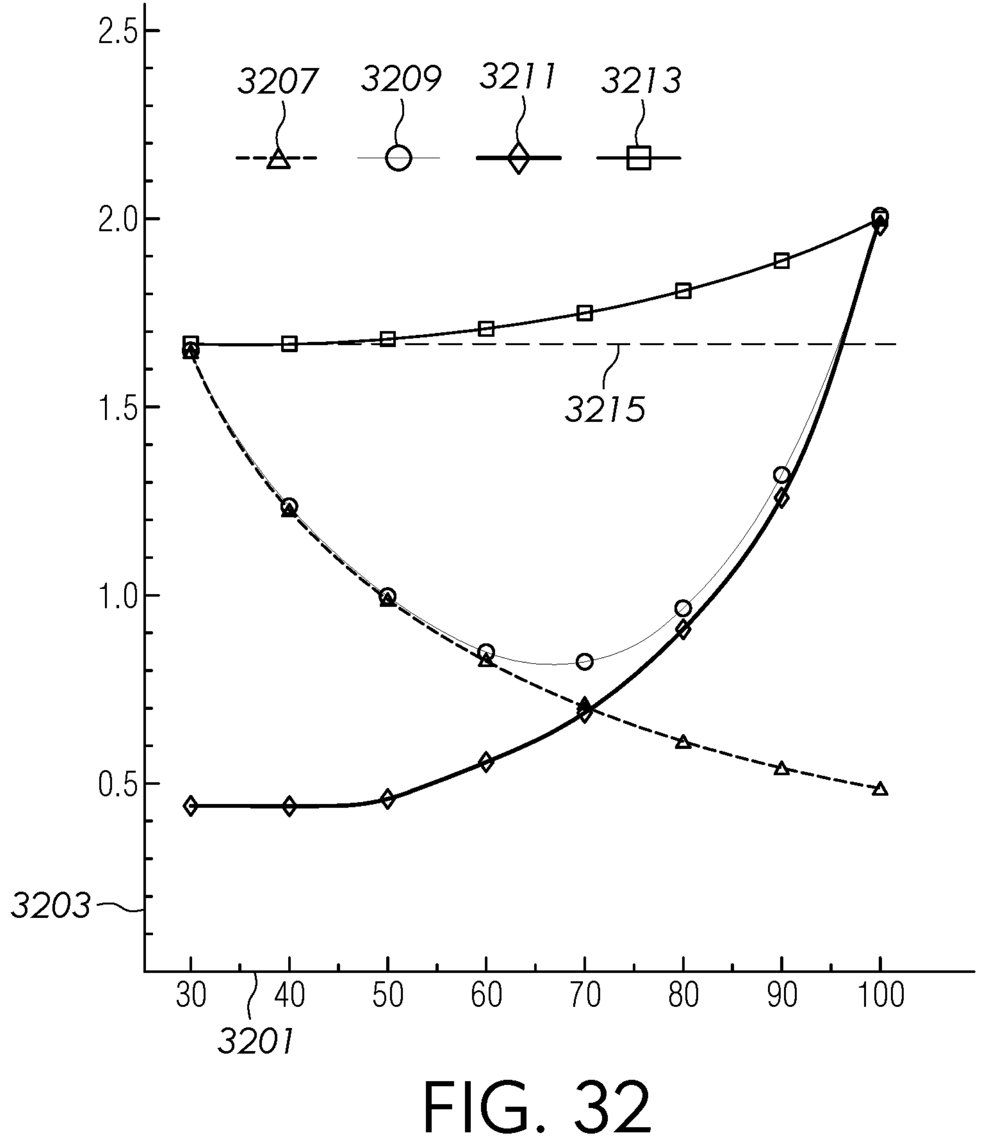
FIG. 32 shows strain as a function of thickness for foldable substrates processed in accordance with aspects of the disclosure.

In FIG. 32, the horizontal axis 3201 corresponds to a local thickness in micrometers, and the vertical axis 3203 corresponds to chemical strengthening induced expansion strain. The local thickness of the foldable substrate 201 varies from a minimum corresponding to the central thickness 209 and a maximum corresponding to the substrate thickness 207. For curves 3207, 3209, 3211, and 3213, the central thickness is 30 μm and the substrate thickness is 100 μm. Curve 3207, shown in triangles, corresponds to a single chemical strengthening step. For curve 3207, the chemical strengthening induced expansion strain decreases as thickness increases, which makes the corresponding foldable substrate susceptible to mechanical instabilities since the chemical strengthening induced expansion strain of the central portion will be greater than for the first transition region and/or the second transition region. Curve 3209, shown in circles, corresponds to a two-step chemical strengthening process where etching the central portion removes an initial compressive stress region formed by the first step before the second chemical strengthening step. For curve 3209, the chemical strengthening induced expansion strain decreases from 30 μm to about 70 μm. Like for curve 3207, the foldable substrate corresponding to curve 3209 is susceptible to mechanical instabilities in the central portion because a chemical strengthening induced expansion strain of the central portion will be greater than for the first transition region and/or the second transition region, even though the chemical strengthening induced expansion strain increases for thickness greater than 70 μm. Curves 3211 and 3213, shown in diamonds and squares, respectively, correspond to foldable substrates of aspects of the disclosure formed using one of the methods discussed below. For curves 3211 and 3213, the chemical strengthening induced expansion strain monotonically and continuously decreases as thickness decreases. For example, curve 3213 stays above line 3215 corresponding to the chemical strengthening induced expansion strain at 30 μm. Consequently, the foldable substrates corresponding to curves 3211 and 3213 are not susceptible to mechanical instabilities.

Mechanical instabilities can be avoided by producing chemical strengthening induced expansion strain profiles resembling curves 3211 or 3213. In aspects, the maximum tensile stress of the central portion can be less than or equal to the maximum tensile stress of the first transition region and/or the second transition region. In aspects, an average concentration of alkali-metal ions in the central portion can be less than or equal to an average concentration of alkali-metal ions in the first transition region and/or the second transition region. In aspects, a depth of layer of the central portion as a percentage of the central thickness can be less than or equal to a depth of layer of the first transition region and/or the second transition region as a percentage of a local thickness where the measurement was taken. In aspects, a depth of layer of the central portion as a percentage of the central thickness can be less than or equal to a depth of compression of the first transition region and/or the second transition region as a percentage of a local thickness where the measurement was taken. Further, a difference in chemical strengthening induced expansion strain can be sufficiently low to enable a low out-of-plane deviation of the first central surface area and/or the second central surface area. In aspects, an out-of-plane deviation (e.g., warp) of the first central surface area and/or the second central surface area can be about 5 μm or less, about 3 μm or less, about 2 μm or less, or about 1 μm or less.

In aspects, the maximum first transition tensile stress can be greater than or equal to the maximum central tensile stress. In further aspects, the maximum first transition tensile stress can be less than or equal to the maximum first tensile stress of the first tensile stress region. In further aspects, the maximum first tensile stress of the first tensile stress region can be greater than or equal to the maximum central tensile stress. In aspects, the maximum second transition tensile stress can be greater than or equal to the maximum central tensile stress. In further aspects, the maximum second transition tensile stress can be less than or equal to the maximum second tensile stress of the second tensile stress region. In further aspects, the maximum second tensile stress of the second tensile stress region can be greater than or equal to the maximum central tensile stress. Providing a maximum first transition tensile stress and/or a maximum second transition tensile stress greater than or equal to a maximum central tensile stress can reduce the incidence of mechanical instabilities (e.g., of the central portion).

In aspects, the first transition average concentration of the one or more alkali-metal ions can be greater than or equal to the central average concentration of the one or more alkali-metal ions. In further aspects, the first average concentration of the one or more alkali-metal ions can be greater than or equal to the first transition average concentration of the one or more alkali metal ions. In aspects, the second transition average concentration of the one or more alkali-metal ions can be greater than or equal to the central average concentration of the one or more alkali-metal ions. In further aspects, the second average concentration of the one or more alkali-metal ions can be greater than or equal to the second transition average concentration of the one or more alkali-metal ions. providing a first transition average concentration of one or more alkali metal ions (e.g., potassium) and/or a second transition average concentration of one or more alkali metal ions (e.g., potassium) greater than a central average concentration of one or more alkali metal ions (e.g., potassium) can reduce an incidence of mechanical instabilities (e.g., of the central portion).

As used herein, a concentration difference of a portion refers to a difference between a concentration at a surface of the portion and a concentration in a bulk of the portion. Unless indicated otherwise, the concentration and concentration difference refer to concentrations of one or more alkali-metal ions associated with chemically strengthening and/or a compressive stress region. In aspects, the concentration and/or concentration difference can refer to a concentration of potassium on an oxide basis. In aspects, a concentration in a bulk of the first portion and/or a concentration of in a bulk of the second portion can be substantially equal to a concentration in a bulk of the central portion, for example, if the first portion and/or the second portion and the central portion comprise the same material prior to the chemically strengthening and/or if a depth of layer of a portion is less than about 45% of the thickness of the corresponding portion.

In aspects, the first depth of compression as a percentage of the substrate thickness can be greater than or equal to the first central depth of compression as a percentage of the central thickness. In even further aspects, the third depth of compression as a percentage of the substrate thickness can be greater than or equal to the first central depth of compression as a percentage of the central thickness. In aspects, the second depth of compression as a percentage of the substrate thickness can be greater than or equal to the second central depth of compression as a percentage of the central thickness. In further aspects, the fourth depth of compression as a percentage of the substrate thickness can be greater than or equal to the second central depth of compression as a percentage of the central thickness.

In aspects, the first depth of layer as a percentage of the substrate thickness can be greater than or equal to the first central depth of layer as a percentage of the central thickness. In even further aspects, the third depth of layer as a percentage of the substrate thickness can be greater than or equal to the first central depth of layer as a percentage of the central thickness. In aspects, the second depth of layer as a percentage of the substrate thickness can be greater than or equal to the second central depth of layer as a percentage of the central thickness. In further aspects, the fourth depth of layer as a percentage of the substrate thickness can be greater than or equal to the second central depth of layer as a percentage of the central thickness.

Also, mechanical instabilities of the central portion can occur as a result of thickness variation of the central portion. For example, a smaller thickness at an edge of the central portion than the central thickness (e.g., at a center of the central portion) can mean that chemical strengthening induced expansion strain is greater for the smaller thickness than for the central thickness, which can lead to mechanical instabilities, for example, at the edges. An incidence of mechanical instabilities can be reduced by decreasing the central TTV (e.g., to about 10 μm or less, about 7 μm or less, about 5 μm or less, or about 2 μm or less).

Figure 33:
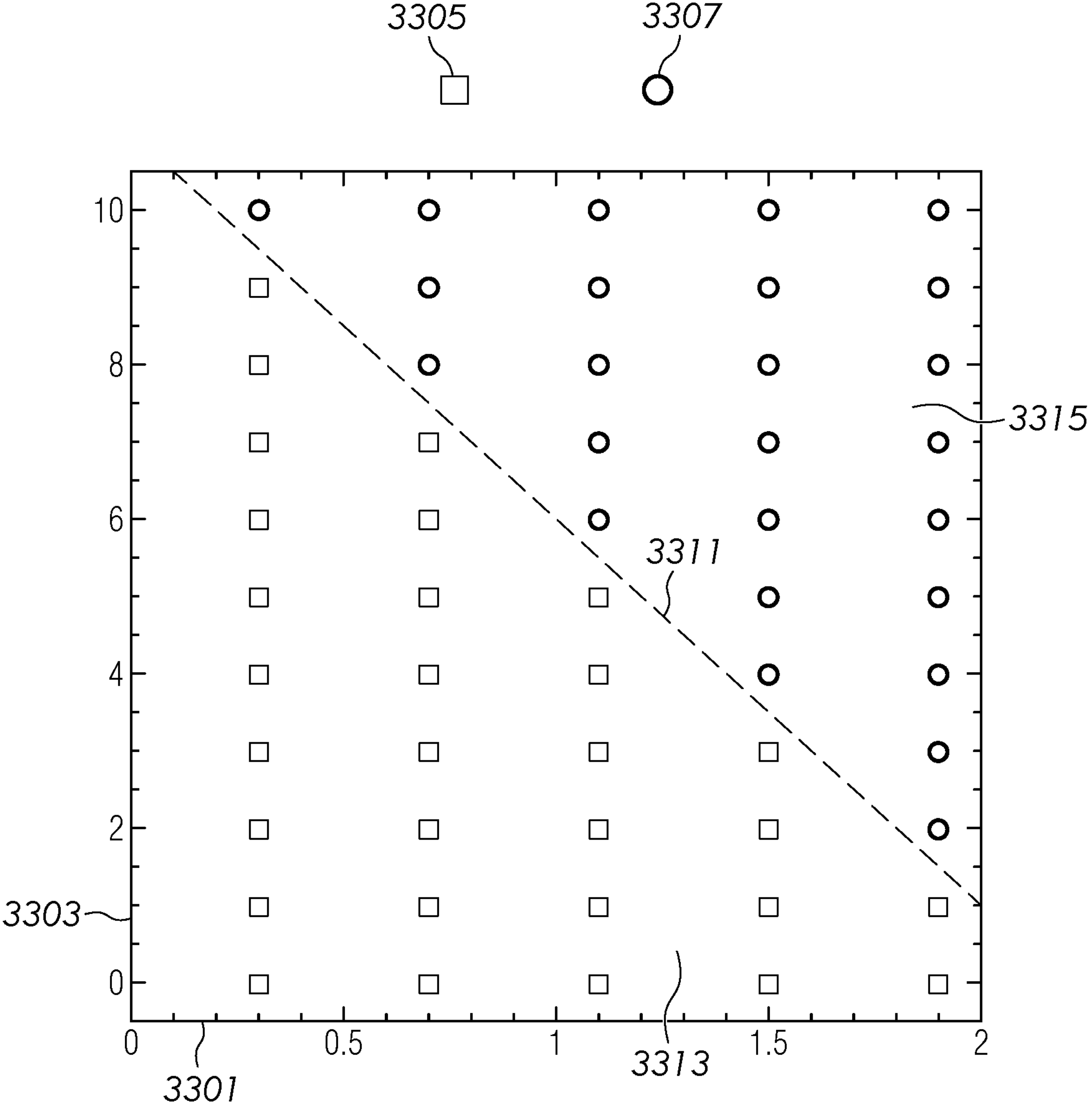
FIG. 33 shows types of mechanical instabilities observed for foldable substrates as a function of a width of a transition region and total thickness variation (TTV) of the first central surface area.

An incidence of mechanical instabilities can also be reduced by reducing a total difference in strain, for example, an integral of the difference in chemical strengthening induced expansion strain between the central portion and a transition region over the corresponding transition region. For example, reducing a width of a transition region and/or increasing a slope of the corresponding transition region can minimize the total strain difference because the strain at thicknesses intermediate (e.g., about 70 μm in FIG. 32) between the central thickness and the substrate thickness is over a smaller width. FIG. 33 shows whether or not samples of foldable substrates buckled for different combinations of central TTV and width of a transition region. In FIG. 33, the horizontal axis 3301 corresponds to the width of the transition region in millimeters, and the vertical axis 3303 corresponds to a central TTV in micrometers. In FIG. 33, circles 3307 correspond to samples that exhibited a mechanical instability (e.g., buckling) while squares 3305 correspond to samples that did not exhibit a mechanical instability. Line 3311 cleanly separates samples with mechanical instabilities from those that did not with the region 3315 above the line 3311 comprising mechanical instabilities and the region 3313 below the line 3311 comprising no mechanical instabilities. The equation for line 3311 is 11 micrometers minus a product of the transition width in micrometers and 5 micrometers per millimeter. This can be rearranged to indicate that the transition width can be less than or equal to 2.2 millimeters minus a product of the central TTV in micrometers and 0.2 millimeters per micrometer to reduce mechanical instabilities. Further rearrangement indicates that the average transition slope in mm/mm can be greater than or equal to 5 micrometers per millimeter times a quotient of a first quantity in millimeters consisting of the substrate thickness minus the central thickness and a second quantity in micrometers consisting of 11 micrometers minus the central TTV to reduce mechanical instabilities.

In aspects, the polymer-based portion 289 and/or 299 can be optically clear. The polymer-based portion 289 and/or 299 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a direction normal to a surface of the optically clear adhesive. As used herein, the refractive index is measured in accordance with ASTM E1967-19, where the first wavelength comprises 589 nm. In aspects, the first refractive index of the polymer-based portion 289 and/or 299 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the first refractive index of the polymer-based portion 289 and/or 299 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween.

In aspects, the foldable substrate 201 can comprise a second index of refraction. In aspects, the second refractive index of the foldable substrate 201 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the second refractive index of the foldable substrate 201 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween. In aspects, a differential equal to the absolute value of the difference between the second index of refraction of the foldable substrate 201 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the second index of refraction of the foldable substrate 201 may be greater than the first index of refraction of the polymer-based portion 289 and/or 299. In aspects, the second index of refraction of the foldable substrate 201 may be less than the first index of refraction of the polymer-based portion 289 and/or 299.

In aspects, the adhesive layer 261 can comprise a third index of refraction. In aspects, the third index of refraction of the adhesive layer 261 can be within one or more of the ranges discussed above with regards to the first index of refraction of the polymer-based portion 289 and/or 299. In aspects, a differential equal to the absolute value of the difference between the third index of refraction of the adhesive layer 261 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the first index of refraction of the polymer-based portion 289 and/or 299. In aspects, the third index of refraction of the adhesive layer 261 may be less than the first index of refraction of the polymer-based portion 289 and/or 299.

In aspects, a differential equal to the absolute value of the difference between the third index of refraction of the adhesive layer 261 and the second index of refraction of the foldable substrate 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the second index of refraction of the foldable substrate 201. In aspects, the third index of refraction of the adhesive layer 261 may be less than the second index of refraction of the foldable substrate 201.

In aspects, the coating 251 can comprise a fourth index of refraction. In aspects, the fourth index of refraction of the coating 251 can be within one or more of the ranges discussed above with regards to the first index of refraction of the polymer-based portion 289 and/or 299. In aspects, a differential equal to the absolute value of the difference between the fourth index of refraction of the coating 251 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the first index of refraction of the polymer-based portion 289 and/or 299. In aspects, the fourth index of refraction of the coating 251 may be less than the first index of refraction of the polymer-based portion 289 and/or 299.

In aspects, a differential equal to the absolute value of the difference between the fourth index of refraction of the coating 251 and the second index of refraction of the foldable substrate 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the second index of refraction of the foldable substrate 201. In aspects, the fourth index of refraction of the coating 251 may be less than the second index of refraction of the foldable substrate 201.

In aspects, a differential equal to the absolute value of the difference between the fourth index of refraction of the coating 251 and the third index of refraction of the adhesive layer 261 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the third index of refraction of the adhesive layer 261. In aspects, the fourth index of refraction of the coating 251 may be less than the third index of refraction of the adhesive layer 261.

FIGS. 6-7 schematically illustrate aspects of a foldable apparatus 501 and/or 701 in accordance with aspects of the disclosure in a folded configuration. As shown in FIG. 6, the foldable apparatus 501 is folded such that the second major surface 205 of the foldable substrate 201 is on the inside of the folded foldable apparatus 501. In this case, for example, a display would be located on the side of the second major surface 205, and a viewer would view the display from the side of the first major surface 203. As shown in FIG. 7, the foldable apparatus 101 shown in FIG. 1 is folded to form folded foldable apparatus 701 such that the second major surface 205 of the foldable substrate 201 is on the inside of the folded foldable apparatus 701. In FIG. 7, a user would view a display device in place of the PET sheet 707 through the foldable substrate 201 and, thus, would be positioned on the side of the first major surface 203. In aspects, as shown in FIG. 7, the foldable apparatus 701 can comprise a coating 251 disposed over the foldable apparatus 701 (e.g., second major surface 205). In further aspects, a user would view a display device in place of the PET sheet 707 through the coating 251. In aspects, as shown in FIG. 7, the polymer-based portion 289 and/or 299 can be disposed over the foldable substrate 201. In further aspects, although not shown, an additional substrate (e.g., glass-based substrate and/or ceramic-based substrate in place of release liner 271 or PET sheet 707), and the additional substrate can be disposed over a display device.

As used herein, "foldable" includes complete folding, partial folding, bending, flexing, or multiple capabilities. As used herein, the terms "fail," "failure" and the like refer to breakage, destruction, delamination, or crack propagation. Likewise, a foldable apparatus achieves a parallel plate distance of "X," or has a parallel plate distance of "X," or comprises a parallel plate distance of "X" if it resists failure when the foldable apparatus is held at a parallel plate distance of "X" for 24 hours at about 85° C. and about 85% relative humidity.

As used herein, the "parallel plate distance" of a foldable apparatus and/or foldable substrate is measured with the following test configuration and process using a parallel plate apparatus 601 (see FIGS. 6-7) that comprises a pair of parallel rigid stainless-steel plates 603, 605 comprising a first rigid stainless-steel plate 603 and a second rigid stainless-steel plate 605. When measuring the "parallel plate distance" for the foldable substrate 201 (e.g., the foldable apparatus 301 shown in FIG. 3 consisting of foldable substrate 201), the foldable substrate 201 is placed between the pair of plates 603 and 605 such that the first major surface 203 is in contact with the pair of plates 603 and 605, as shown in FIG. 6. When measuring the "parallel plate distance" for a foldable apparatus resembling the foldable apparatus 101 shown in FIG. 2, the adhesive layer 261 is removed and is replaced by a test adhesive layer 709 comprises a thickness of 50 μm. Further, the test is conducted with a 100 μm thick sheet 707 of polyethylene terephthalate (PET) rather than the release liner 271 of FIG. 2. Thus, during the test to determine the "parallel plate distance" of a configuration of a foldable apparatus, the foldable apparatus 701 is produced by using the 100 μm thick sheet 707 of polyethylene terephthalate (PET) rather than the release liner 271 of FIG. 2.

When preparing the foldable apparatus 701, the 100 μm thick sheet 707 of polyethylene terephthalate (PET) is attached to the test adhesive layer 709 in an identical manner that the release liner 271 is attached to the second contact surface 265 of the adhesive layer 261 as shown in FIG. 2. To test the foldable apparatus 701 of FIG. 7, the test adhesive layer 709 and the PET sheet 707 can likewise be installed as shown in the configuration of FIG. 7 to conduct the test on the foldable apparatus 701. The foldable apparatus 701 is placed between the pair of parallel rigid stainless-steel plates 603 and 605 such that the foldable substrate 201 will be on the inside of the bend, similar to the configuration shown in FIG. 7. Similarly, foldable apparatus 401 shown in FIG. 4 would be prepared for testing by replacing the adhesive layer 261 and the release liner 271 with the test adhesive layer 709 and the 100 μm thick sheet 707 of PET. For determining a "parallel plate distance", the distance between the parallel plates is reduced at a rate of 50 μm/second until the parallel plate distance 611 or 711 is equal to the "parallel plate distance" to be tested. Then, the parallel plates are held at the "parallel plate distance" to be tested for 24 hours at about 85° C. and about 85% relative humidity. As used herein, the "minimum parallel plate distance" is the smallest parallel plate distance that the foldable apparatus can withstand without failure under the conditions and configuration described above.

In aspects, the foldable apparatus 101, 301, 401, 501, and/or 701 and/or foldable substrate 201 can achieve a parallel plate distance of 100 mm or less, 50 mm or less, 20 mm or less, 10 mm or less, 5 mm or less, or 3 mm or less. In further aspects, the foldable apparatus 101, 301, 401, 501, and/or 701 and/or foldable substrate 201 can achieve a parallel plate distance of 50 millimeters (mm), or 20 mm, or 10 mm, of 5 mm, or 3 mm. In aspects, the foldable apparatus 101, 301, 401, 501, and/or 701 and/or foldable substrate 201 can comprise a minimum parallel plate distance of about 40 mm or less, about 20 mm or less, about 10 mm or less, about 5 mm or less, about 3 mm or less, about 1 mm or less, about 1 mm or more, about 3 mm or more, about 5 mm or more, or about 10 mm or more. In aspects, the foldable apparatus 101, 301, 401, 501, and/or 701 and/or foldable substrate 201 can comprise a minimum parallel plate distance in a range from about 1 mm to about 40 mm, from about 1 mm to about 20 mm, from about 1 mm to about 10 mm, from about 1 mm to about 5 mm, from about 1 mm to about 3 mm. In aspects, the foldable apparatus 101, 301, 401, 501, and/or 701 and/or foldable substrate 201 can achieve a minimum parallel plate distance in a range from about 2 mm to about 40 mm, from about 2 mm to about 20 mm, from about 2 mm to about 10 mm, from about 3 mm to about 10 mm, from about 3 mm to about 5 mm, from about 5 mm to about 10 mm, or any range or subrange therebetween.

A width 287 of the central portion 281 of the foldable substrate 201 is defined between the first portion 221 and the second portion 231 in the direction 106 of the length 105. In aspects, the width 287 of the central portion 281 of the foldable substrate 201 can extend from the first portion 221 to the second portion 231. A width 210 of the first central surface area 213 and the second central surface area 243 of the foldable substrate 201 is defined between the first transition region 212 or 322 and the second transition region 218 or 328, for example, as the portion comprising the central thickness 209, in the direction 106 of the length 105. In aspects, the width 287 of the central portion 281 of the foldable substrate 201 and/or the width 210 of the first central surface area 213 of the foldable substrate 201 can be about 1.4 times or more, about 1.6 times or more, about 2 times or more, about 2.2 times or more, about 3 times or less, or about 2.5 times or less the minimum parallel plate distance. In aspects, the width 287 of the central portion 281 of the foldable substrate 201 and/or the width 210 of the first central surface area 213 of the foldable substrate 201 as a multiple of the minimum parallel plate distance can be in a range from about 1.4 times to about 3 times, from about 1.6 times to about 3 times, from about 1.6 times to about 2.5 times, from about 2 times to about 2.5 times, from about 2.2 times to about 2.5 times, from about 2.2 times to about 3 times, or any range or subrange therebetween. Without wishing to be bound by theory, the length of a bent portion in a circular configuration between parallel plates can be about 1.6 times the parallel plate distance 611 or 711. Without wishing to be bound by theory, the length of a bend portion in an elliptical configuration between parallel plates can be about 2.2 times the parallel plate distance 611 or 711. In aspects, the width 287 of the central portion 281 of the foldable substrate 201 and/or the width 210 of the first central surface area 213 of the foldable substrate 201 can be about 1 mm or more, about 3 mm or more, about 5 mm or more, about 8 mm or more, about 10 mm or more, about 15 mm or more, about 20 mm or more, about 100 mm or less, about 60 mm or less, about 50 mm or less, about 40 mm or less, about 35 mm or less, about 30 mm or less, or about 25 mm or less. In aspects, the width 287 of the central portion 281 of the foldable substrate 201 and/or the width 210 of the first central surface area 213 of the foldable substrate 201 can be in a range from about 1 mm to about 100 mm, from about 3 mm to about 100 mm, from about 3 mm to about 60 mm, from about 5 mm to about 60 mm, from about 5 mm to about 50 mm, from about 8 mm to about 50 mm, from about 8 mm to about 40 mm, from about 10 mm to about 40 mm, from about 10 mm to about 35 mm, from about 15 mm to about 35 mm, from about 15 mm to about 30 mm, from about 20 mm to about 30 mm, from about 20 mm to about 25 mm, or any range of subrange therebetween. In aspects, the width 287 of the central portion 281 of the foldable substrate 201 and/or the width 210 of the first central surface area 213 of the foldable substrate 201 can be about 2.8 mm or more, about 6 mm or more, about 9 mm or more, about 60 mm or less, about 40 mm, or less, or about 24 mm or less. In aspects, the width 287 of the central portion 281 of the foldable substrate 201 and/or the width 210 of the first central surface area 213 of the foldable substrate 201 can be in a range from about 2.8 mm to about 60 mm, from about 2.8 mm to about 40 mm, from about 2.8 mm to about 24 mm, from about 6 mm to about 60 mm, from about 6 mm to about 40 mm, from about 6 mm to about 24 mm, from about 9 mm to about 60 mm, from about 9 mm to about 40 mm, from about 9 mm to about 24 mm, or any range of subrange therebetween. By providing a width within the above-noted ranges for the central portion (e.g., between the first portion and the second portion), folding of the foldable apparatus without failure can be facilitated.

The foldable apparatus 101, 301, 401, 501, and/or 701 may have an impact resistance defined by the capability of a region of the foldable apparatus (e.g., a region comprising the first portion 221, a region comprising the second portion 231, a region comprising the polymer-based portion 289 and/or 299 and/or central portion 281) to avoid failure at a pen drop height (e.g., 5 centimeters (cm) or more, 10 centimeters or more, 20 cm or more), when measured according to the "Pen Drop Test." As used herein, the "Pen Drop Test" is conducted such that samples of foldable apparatus are tested with the load (i.e., from a pen dropped from a certain height) imparted to an outer major surface (e.g., first major surface 203 of the foldable substrate 201) for foldable apparatus 101 or 301 shown in FIGS. 2-3, second major surface 205 of the foldable substrate 201 for foldable apparatus 301 or 401 shown in FIGS. 3-4) with the foldable apparatus configured as in the parallel plate test with 100 μm thick sheet 707 of PET attached to the test adhesive layer 709 having a thickness of 50 μm instead of the release liner 271 shown in FIG. 2. As such, the PET layer in the Pen Drop Test is meant to simulate a foldable electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

A tube is used for the Pen Drop Test to guide a pen to an outer surface of the foldable apparatus. For the foldable apparatus 101, 301, 401, 501, and/or 701 in FIGS. 2-4 and 6-7, the pen is guided to the outer major surface (e.g., first major surface 203 of the foldable substrate 201 for foldable apparatus 101 or 301 shown in FIGS. 2-3, second major surface 205 of the foldable substrate 201 for foldable apparatus 301 or 401 shown in FIGS. 3-4), and the tube is placed in contact with the second major surface 205 of the foldable substrate 201 so that the longitudinal axis of the tube is substantially perpendicular to the outer major surface with the longitudinal axis of the tube extending in the direction of gravity. The tube has an outside diameter of 1 inch (2.54 cm), an inside diameter of nine-sixteenths of an inch (1.4 cm), and a length of 90 cm. An acrylonitrile butadiene (ABS) shim is employed to hold the pen at a predetermined height for each test. After each drop, the tube is relocated relative to the sample to guide the pen to a different impact location on the sample. The pen employed in Pen Drop Test is a BIC Easy Glide Pen, Fine, having a tungsten carbide ballpoint tip of 0.7 mm (0.68 mm) diameter, and a weight of 5.73 grams (g) including the cap (4.68 g without the cap).

For the Pen Drop Test, the pen is dropped with the cap attached to the top end (i.e., the end opposite the tip) so that the ballpoint can interact with the test sample. In a drop sequence according to the Pen Drop Test, one pen drop is conducted at an initial height of 1 cm, followed by successive drops in 0.5 cm increments up to 20 cm, and then after 20 cm, 2 cm increments until failure of the test sample. After each drop is conducted, the presence of any observable fracture, failure, or other evidence of damage to the sample is recorded along with the particular pen drop height. Using the Pen Drop Test, multiple samples can be tested according to the same drop sequence to generate a population with improved statistical accuracy. For the Pen Drop Test, the pen is to be changed to a new pen after every 5 drops, and for each new sample tested. In addition, all pen drops are conducted at random locations on the sample at or near the center of the sample, with no pen drops near or on the edge of the samples.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the foldable substrate 201 and/or coating. A visible mechanical defect has a minimum dimension of 0.2 mm or more.

In aspects, the foldable apparatus can resist failure for a pen drop in a region comprising the first portion 221 or the second portion 231 at a pen drop height of 10 centimeters (cm), 12 cm, 14 cm, 16 cm, or 20 cm. In aspects, a maximum pen drop height that the foldable apparatus can withstand without failure over a region comprising the first portion 221 or the second portion 231 may be about 10 cm or more, about 12 cm or more, about 14 cm or more, about 16 cm or more, about 40 cm or less, or about 30 cm or less, about 20 cm or less, about 18 cm or less. In aspects, a maximum pen drop height that the foldable apparatus can withstand without failure over a region comprising the first portion 221 or the second portion 231 can be in a range from about 10 cm to about 40 cm, from about 12 cm to about 40 cm, from about 12 cm to about 30 cm, from about 14 cm to about 30 cm, from about 14 cm to about 20 cm, from about 16 cm to about 20 cm, from about 18 cm to about 20 cm, or any range or subrange therebetween.

In aspects, the foldable apparatus can resist failure for a pen drop in a region (e.g., central portion 281) comprising the polymer-based portion 289 and/or 299 between the first portion 221 and the second portion 231 at a pen drop height of 1 cm, 2 cm, 3 cm, 4 cm, 5 cm, or more. In aspects, a maximum pen drop height that the foldable apparatus can withstand without failure over a region comprising the polymer-based portion 289 and/or 299 between the first portion 221 and the second portion 231 may be about 1 cm or more, about 2 cm or more, about 3 cm or more, about 4 cm or more, about 20 cm or less, about 10 cm or less, about 8 cm or less, or about 6 cm or less. In aspects, a maximum pen drop height that the foldable apparatus can withstand without failure over a region comprising the polymer-based portion 289 and/or 299 between the first portion 221 and the second portion 231 can be in a range from about 1 cm to about 20 cm, from about 2 cm to about 20 cm, from about 2 cm to about 10 cm, from about 3 cm to about 10 cm, from about 3 cm to about 8 cm, from about 4 cm to about 8 cm, from about 4 cm to about 6 cm, or any range or subrange therebetween. In aspects, a maximum pen drop height that the foldable apparatus can withstand without failure of a region comprising the polymer-based portion 289 and/or 299 between the first portion 221 and the second portion 231 can be in a range from about 1 cm to about 10 cm, from about 1 cm to about 8 cm, from about 1 cm to about 5 cm, from about 2 cm to about 5 cm, from about 3 cm to about 5 cm, from about 4 cm to about 5 cm, or any range or subrange therebetween.

Aspects of methods of making the foldable apparatus and/or foldable substrate in accordance with aspects of the disclosure will be discussed with reference to the flow charts in FIGS. 10-11 and example method steps illustrated in FIGS. 12-31.

Figure 12:
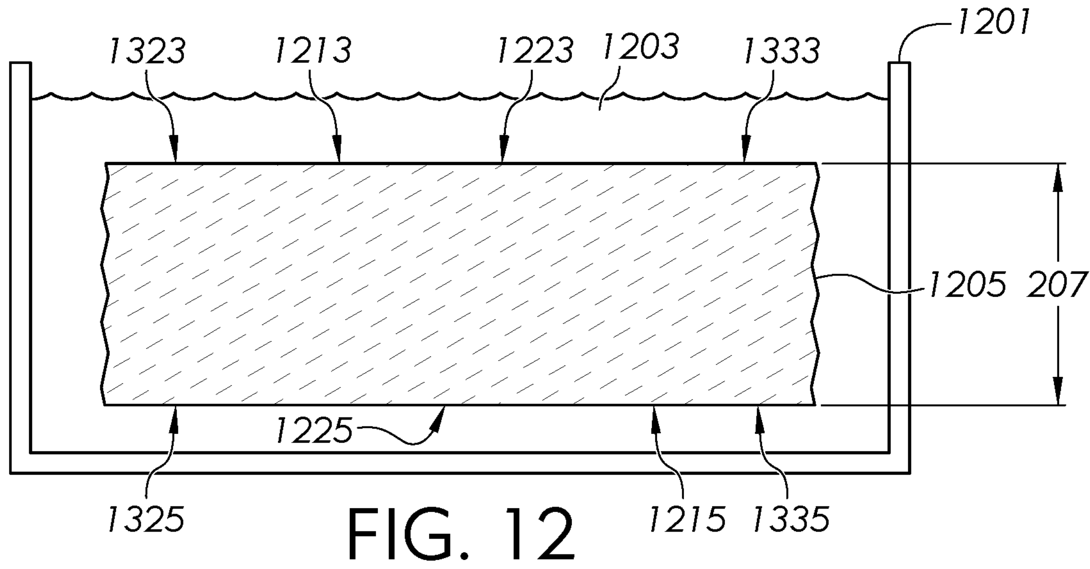
FIGS. 12-31 schematically illustrate steps in methods of making a foldable substrate and/or foldable apparatus.
Figure 13:
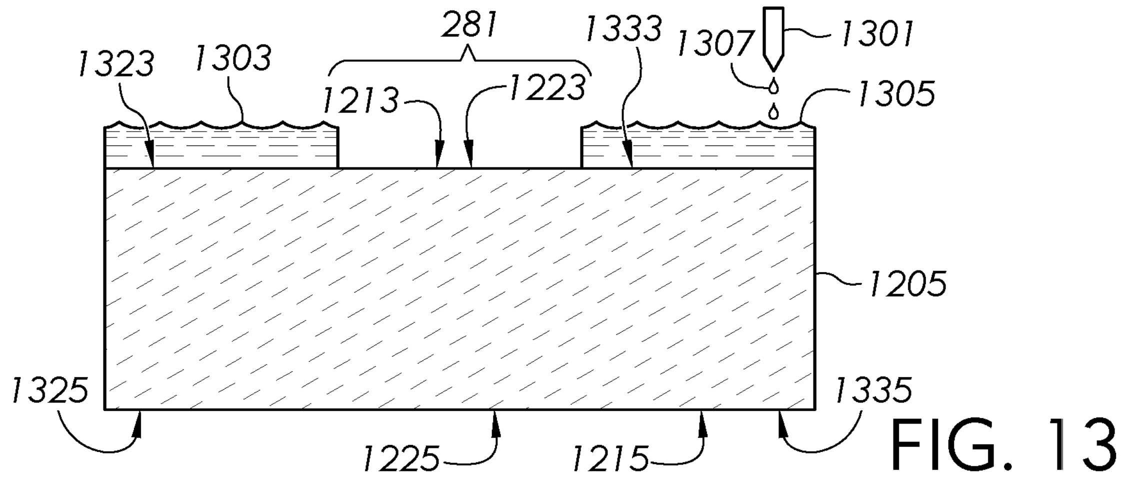

Example aspects of making the foldable apparatus 101, 301, 401, 501, and/or 701 and/or foldable substrate 201 illustrated in FIGS. 2-4 and 6-7 will now be discussed with reference to FIGS. 12-23, 29-31, and 34-35 and the flow chart in FIG. 10. In a first step 1001 of methods of the disclosure, methods can start with providing a foldable substrate 201 and/or 1205 (see FIGS. 12-13). In aspects, the foldable substrate 201 and/or 1205 may be provided by purchase or otherwise obtaining a substrate or by forming the foldable substrate. In aspects, the foldable substrate 201 and/or 1205 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The foldable substrate 201 and/or 1205 may comprise a second major surface 205 or 1215 (see FIG. 28) that can extend along a plane. The second major surface 205 or 1215 can be opposite a first major surface 203 or 1213. In aspects, as shown in FIGS. 12-13, in step 1001, the foldable substrate 1205 can comprise an existing first central surface area 1223 that is coplanar with a first surface area 1323 and/or a third surface area 1333, for example, the initial first major surface 1213 can comprise the existing first central surface area 1223, the first surface area 1323, and the third surface area 1333. In aspects, as shown in FIGS. 12-13, in step 1001, the foldable substrate 1205 can comprise an existing second central surface area 1225 that is coplanar with a second surface area 1325 and/or a fourth surface area 1335, for example, the initial second major surface 1215 can comprise the existing second central surface area 1225, the second surface area 1325, and the fourth surface area 1335.

In aspects, in step 1001, the foldable substrate 201 can be provided with a first recess 211 in the first major surface 203 of the foldable substrate 201 that exposes a first central surface area 213 of the foldable substrate 201 in the central portion 281. In aspects, in step 1001, the foldable substrate 201 can be provided with a second recess 241 in the second major surface 205 of the foldable substrate 201 that exposes a second central surface area 243 of the foldable substrate 201 in the central portion 281. In further aspects, the first central surface area 213 and/or the second central surface area 243 can comprise a first transition region 212 or 322 and/or a second transition region 218 or 328. In further aspects, the recess(es) (e.g., first recess 211, second recess 241) may be formed by etching, laser ablation or mechanically working the first major surface 203. For example, mechanically working the foldable substrate 201 and/or 1205 may resemble step 1005 and FIG. 16, as discussed below. In aspects, in step 1001, the foldable substrate 201 can be provided with one or more initial compressive stress regions, for example, with one or more of the properties discussed below with reference to step 1005.

After step 1001, as shown in FIG. 12, methods can proceed to step 1003 comprising initially chemically strengthening the foldable substrate 201 and/or 1205. In aspects, as shown, chemically strengthening the foldable substrate 201 and/or 1205 can comprise contacting at least a portion of a foldable substrate 1205 comprising lithium cations and/or sodium cations with a salt bath 1201 comprising salt solution 1203. Chemically strengthening a foldable substrate 201 and/or 1205 (e.g., glass-based substrate, ceramic-based substrate) by ion exchange can occur when a first cation within a depth of a surface of a foldable substrate 201 and/or 1205 is exchanged with a second cation within a molten salt or salt solution 1203 that has a larger radius than the first cation. For example, a lithium cation within the depth of the surface of the foldable substrate 201 and/or 1205 can be exchanged with a sodium cation or potassium cation within a salt solution 1203. Consequently, the surface of the foldable substrate 201 and/or 1205 is placed in compression and thereby chemically strengthened by the ion exchange process since the lithium cation has a smaller radius than the radius of the exchanged sodium cation or potassium cation within the salt solution 1203. Chemically strengthening the foldable substrate 201 and/or 1205 can comprise contacting at least a portion of a foldable substrate 201 and/or 1205 comprising lithium cations and/or sodium cations with a salt bath 1201 comprising salt solution 1203 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the foldable substrate 201 and/or 1205 to the salt solution 1203 contained in the salt bath 1201. In aspects, the temperature of the salt solution 1203 can be about 300° C. or more, about 360° C. or more, about 400° C. or more, about 500° C. or less, about 460° C. or less, or about 420° C. or less. In aspects, the temperature of the salt solution 1203 can be in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 400° C. to about 420° C., from about 300° C. to about 400° C., from about 360° C. to about 420° C., or any range or subrange therebetween. In aspects, the foldable substrate 201 and/or 1205 can be in contact with the salt solution 1203 for about 5 minutes or more, about 30 minutes or more, about 1 hour or more, about 3 hours or more, about 48 hours or less, about 24 hours or less, or about 8 hours or less. In aspects, the foldable substrate 201 and/or 1205 can be in contact with the salt solution 1203 for a time in a range from about 5 minutes to about 48 hours, from about 30 minutes to about 48 hours, from about 30 minutes to about 24 hours, from about 1 hour to about 24 hours, from about 3 hours to about 24 hours, from about 3 hours to about 8 hours, or any range or subrange therebetween. In aspects, the foldable substrate 201 and/or 1205 can be in contact with the salt solution 1203 for a time in a range from about 5 minutes to about 8 hours, from about 30 minutes to about 8 hours, from about 1 hour to about 8 hours, or any range or subrange therebetween.

In aspects, chemically strengthening the foldable substrate 201 and/or 1205 in step 1003 can comprise chemically strengthening the initial first major surface 1213 to form an initial first compressive stress region extending to an initial first depth of compression from the initial first major surface 1213. In aspects, chemically strengthening the foldable substrate 201 and/or 1205 in step 1003 can comprise chemically strengthening the initial second major surface 1215 to form an initial second compressive stress region extending to an initial second depth of compression from the initial second major surface 1215. The initial first compressive stress region and/or the initial second compressive stress region can extend across portions of the foldable substrate 1205 corresponding to the first portion, the second portion, and the central portion. For example, the first initial compressive stress region can extend from a first surface area 1323 and/or a third surface area 1333, and/or the second initial compressive stress region can extend from a second surface area 1325 and/or a fourth surface area 1335. In aspects, the initial first depth of compression and/or the initial second depth of compression, as a percentage of the substrate thickness 207 (see FIG. 12), can be about 5% or more, 10% or more, about 12% or more, about 14% or more, about 25% or less, about 20% or less, about 18% or less, or about 16% or less. In aspects, the initial first depth of compression and/or the initial second depth of compression, as a percentage of the substrate thickness 207 (see FIG. 12), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 12), can be about 5% or more, 10% or more, about 12% or more, about 14% or more, about 25% or less, about 20% or less, about 18% or less, or about 16% or less. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 12), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, before step 1003, the foldable substrate 201 and/or 1205 can be substantially unstrengthened (e.g., unstressed, not chemically strengthened, not thermally strengthened). As used herein, substantially unstrengthened refers to a substrate comprising either no depth of layer or a depth of layer in a range from 0% to about 5% of the substrate thickness.

Figure 14:
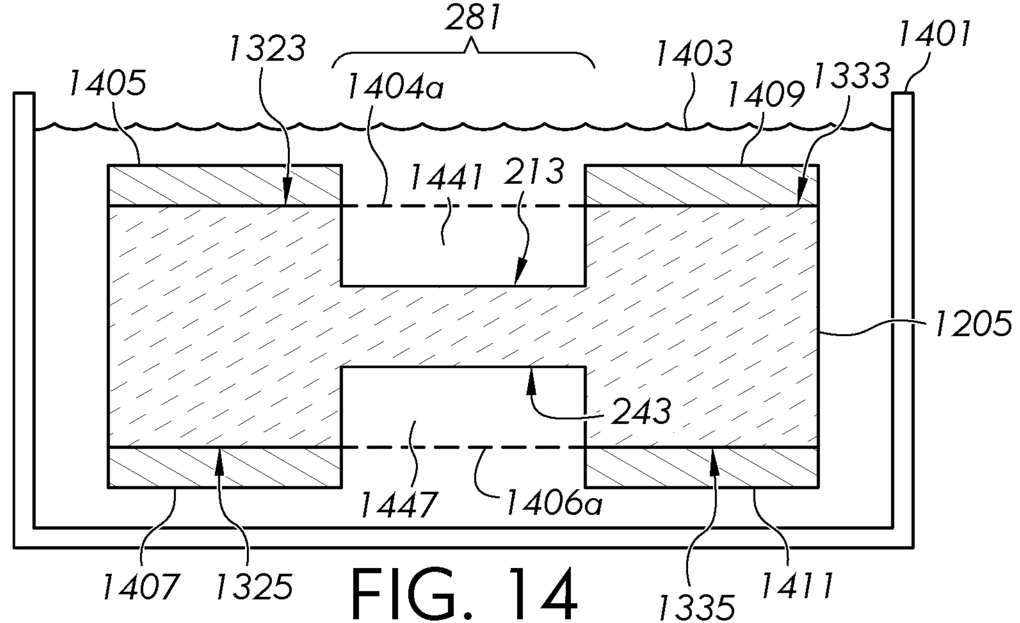
Figure 15:
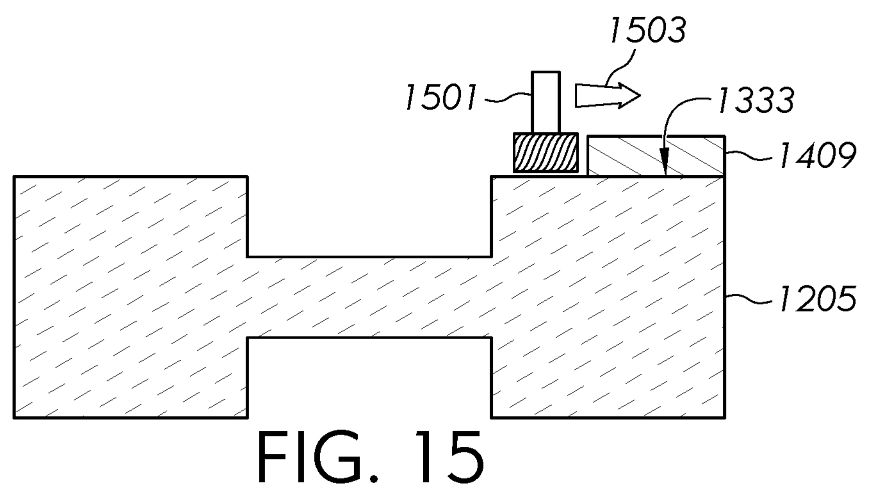

After step 1001 or 1003, methods can proceed to step 1005 comprising forming the central portion comprising the first transition region, the second transition region, a first central surface area recessed from the first major surface, and a second central surface area recessed from the second major surface. In aspects, as shown in FIG. 13-15, step 1005 can comprise etching the foldable substrate, for example, where a mask is deposited over the first portion and the second portion before contacting the central portion with an etchant. In further aspects, as shown in FIG. 13, step 1005 can comprise disposing a first liquid 1307 over one or more portions of the foldable substrate 1205, for example by dispensing the first liquid 1307 from a container 1301 (e.g., conduit, flexible tube, micropipette, or syringe). In even further aspects, as shown, the first liquid 1307 can be disposed over the first surface area 1323 as a first liquid deposit 1303 and over the third surface area 1333 as a second liquid deposit 1305. Although not shown, it is to be understood that similar liquid deposits can be formed over the second surface area and/or the fourth surface area. In further aspects, the liquid deposits (e.g., first liquid deposit 1303 and second liquid deposit 1305 shown in FIG. 13) can be cured to form masks (e.g., first mask 1405 and third mask 1409 shown in FIG. 14). Curing the first liquid can comprise heating the first liquid 1307, irradiating the first liquid 1307 with ultraviolet (UV) radiation, and/or waiting a predetermined amount of time (e.g., from about 30 minutes to 24 hours, from about 1 hour to about 8 hours). In aspects, another method (e.g., chemical vapor deposition (CVD) (e.g., low-pressure CVD, plasma-enhanced CVD), physical vapor deposition (PVD) (e.g., evaporation, molecular beam epitaxy, ion plating), atomic layer deposition (ALD), sputtering, spray pyrolysis, chemical bath deposition, sol-gel deposition) may be used to form the mask(s) (e.g., masks 1405, 1407, 1409, and 1411). As shown in FIG. 14, the result of disposing the mask (e.g., disposing a liquid and curing the liquid) can comprise a first mask 1405 disposed over the first surface area 1323, a second mask 1407 disposed over a second surface area 1325, a third mask 1409 disposed over a third surface area 1333, and/or a fourth mask 1411 disposed over a fourth surface area 1335. In aspects, a material of the mask can comprise titanium dioxide ($TiO_2$), zirconia ($ZrO_2$), tin oxide ($SnO_2$), alumina ($Al_2O_3$), silica ($SiO_2$), silicon nitride ($Si_3N_4$), and/or combinations thereof, although other materials for masks can be used in other aspects.

In aspects, as shown in FIG. 14, step 1005 can comprise etching the foldable substrate 1205. In aspects, as shown, etching can comprise exposing the foldable substrate 1205 to an etchant 1403. In further aspects, as shown, the etchant 1403 can be a liquid etchant contained in an etchant bath 1401. In even further aspects, the etching solution can comprise one or more mineral acids (e.g., HCl, HF, $H_2SO_4$, $HNO_3$). In aspects, as shown, etching can comprise etching the central portion 281 of the initial first major surface 1213 to form a first central surface area 213. In further aspects, as shown, the etching can form the first recess 1441 or 211 between the first plane 1404*a* or 204*a* and the first central surface area 213. In aspects, as shown, etching can comprise etching the central portion 281 of the initial second major surface 1215 to form a second central surface area 243. In further aspects, as shown, the etching can form the second recess 1447 or 241 between the second plane 1406*a* or 206*a* and the second central surface area 243. In aspects, as shown in FIG. 15, step 1005 can further comprise removing the mask(s). In aspects, as shown, removing the mask(s) (e.g., masks 1405, 1407, 1409, and 1411) can comprise moving a grinding tool 1501 in a direction 1503 across the surface (e.g., third surface area 1333 or 233). In even further aspects, using the tool may comprise sweeping, scraping, grinding, pushing, etc. In further aspects, the mask(s) (e.g., masks 1405, 1407, 1409, and 1411) can be removed by washing the surface (e.g., first surface area 1323 or 223, second surface area 1325 or 225, third surface area 1333 or 233, fourth surface area 1335 or 235) with a solvent. In aspects, removing the mask(s) can comprise removing the masks 1405, 1407, 1409, and 1411 from the first surface area 1323 or 223, the second surface area 1325 or 225, the third surface area 1333 or 233, and the fourth surface area 1335 or 235, respectively.

Figure 16:
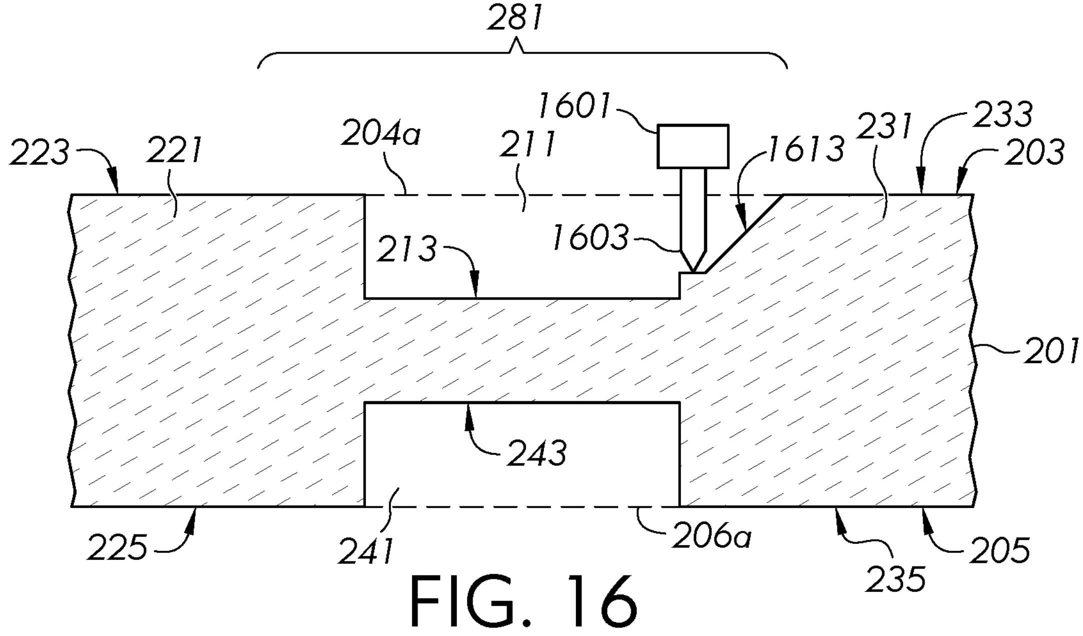

In aspects, as shown in FIG. 16, step 1005 can further comprise forming the first transition region 212 and/or the second transition region 218. In further aspects, the foldable substrate 201 or 1205 can be mechanically worked to form the first transition region 212 and/or the second transition region 218. In even further aspects, diamond engraving can be used, for example, a diamond-tip probe 1603 can be controlled using a computer numerical control (CNC) machine 1601. Materials other than diamond can be used for engraving with a CNC machine. For example, as shown in FIG. 16, the diamond-tip probe 1603 is shown forming an intermediate transition surface 1613 as material is removed from the foldable substrate 201 or 1205, and the intermediate transition surface 1613 can be further developed into the third transition surface area 217 (see FIG. 2). In aspects, although not shown, a similar process may be used to form the fourth transition surface area, the first transition surface area, and/or the second transition surface area. It is to be understood that other methods of forming the recess(es) can be used, for example, lithography and laser ablation.

In aspects, step 1005 can comprise forming the central portion 281 by mechanically working the foldable substrate 201 or 1205, for example, instead of etching the foldable substrate 1205. In further aspects, diamond engraving can be used, for example, a diamond-tip probe 1603 can be controlled using a computer numerical control (CNC) machine 1601. Materials other than diamond can be used for engraving with a CNC machine. In even further aspects, the first central surface area 213 and/or the second central surface area 243 can be formed as a result of step 1005. In aspects, although not shown, a similar process may be used to form the fourth transition surface area, the first transition surface area, and/or the second transition surface area.

Figure 34:
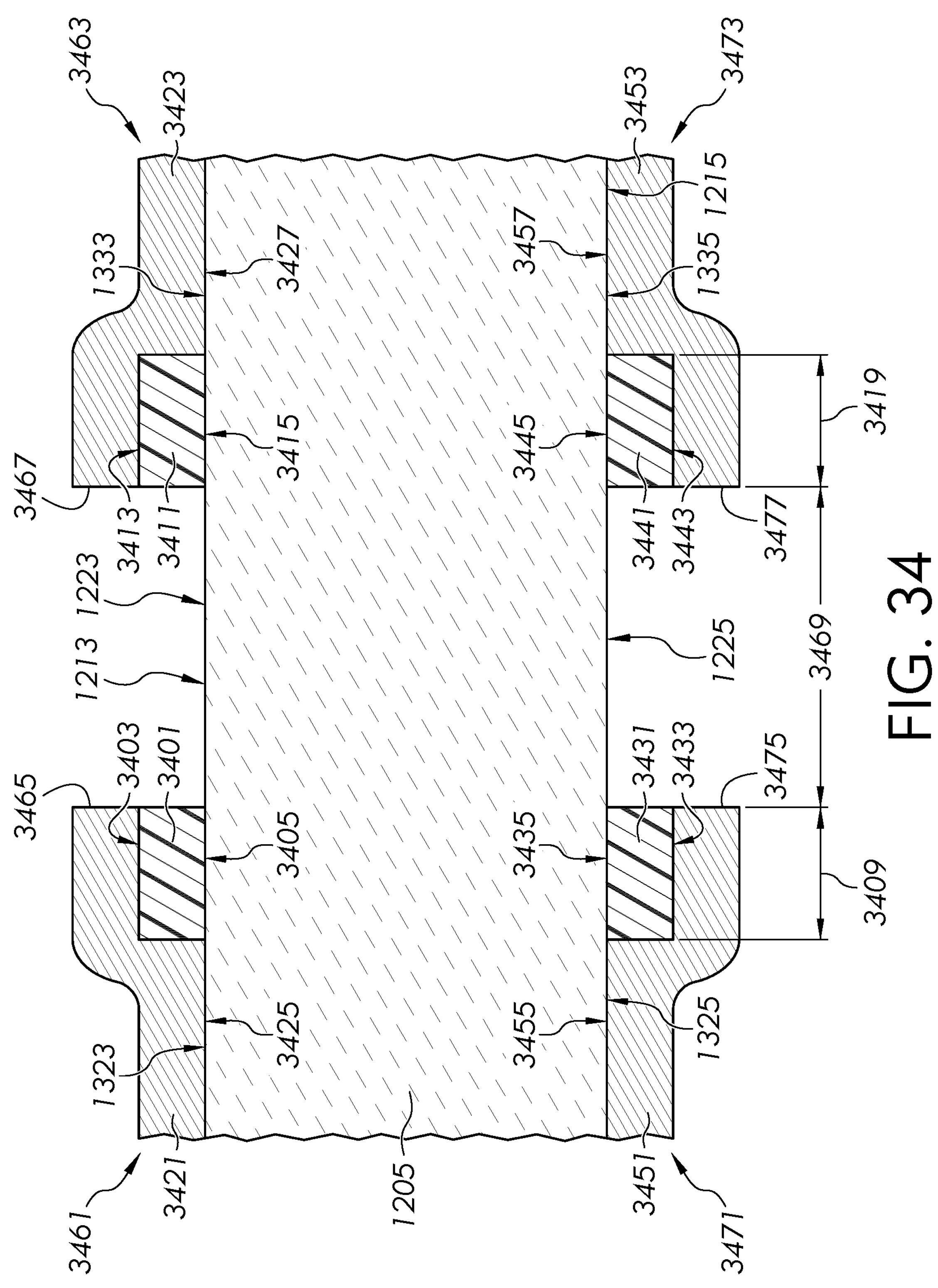
FIGS. 34-35 schematically illustrate steps in methods of making a foldable substrate and/or foldable apparatus.
Figure 35:
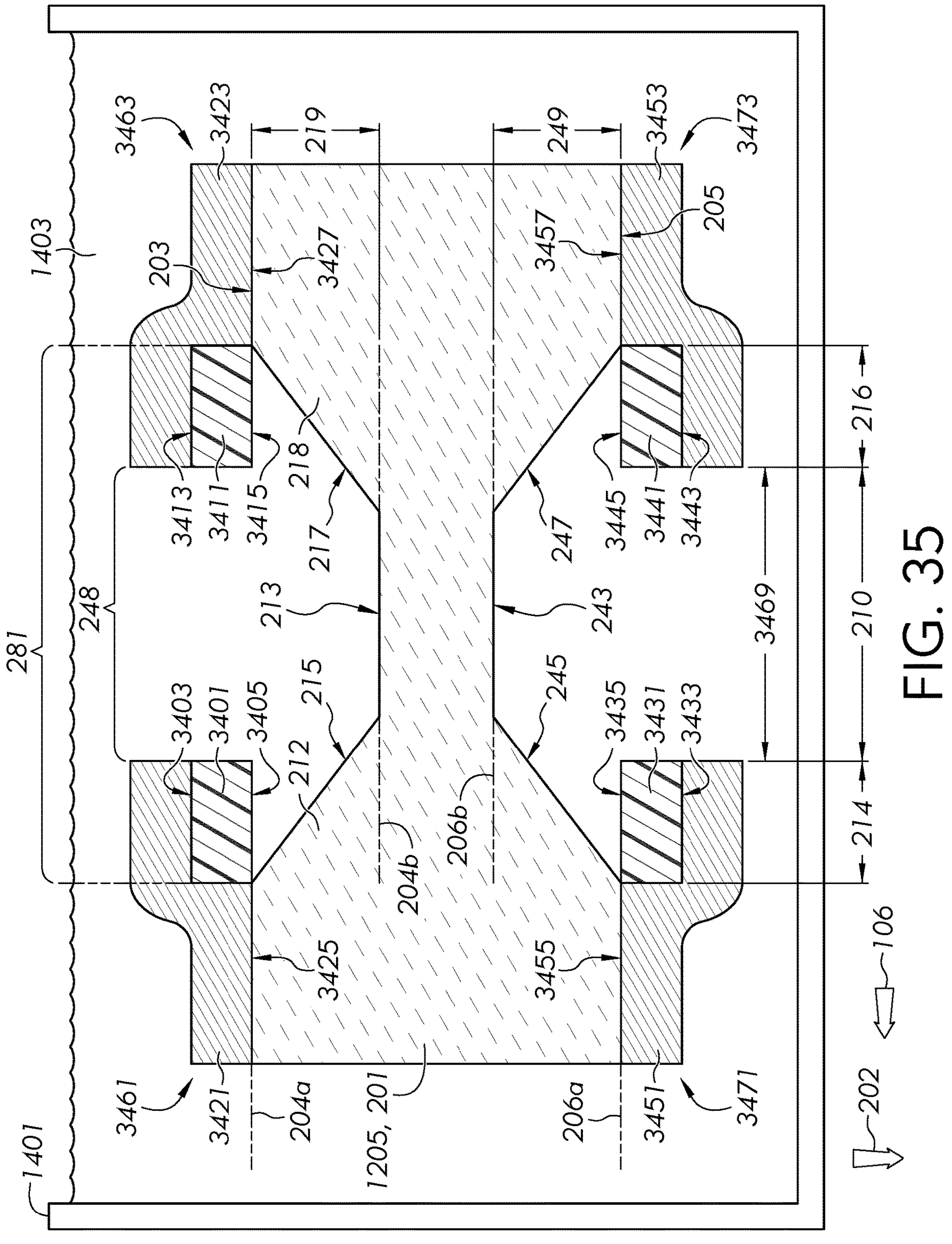

Alternatively, as shown in FIGS. 34-35, step 1005 can comprise disposing an etch mask and etching the foldable substrate 201 or 1205. In further aspects, the etch mask can comprise a first portion 3461 disposed on the first major surface 1213 and/or a second portion 3463 disposed on the first major surface 1213. In even further aspects, a minimum distance 3469 between a first peripheral portion 3465 of the first portion 3461 and a second peripheral portion 3467 of the second portion 3463 can be substantially equal to the width 210 of the first central surface area 213 of the resulting foldable substrate 201 (see FIGS. 2-4). In further aspects, as shown, the first portion 3461 can comprise a first barrier layer 3421 and a first polymer layer 3401. In even further aspects, as shown, a first surface area 3425 of the first barrier layer 3421 can contact and be adhered to at least a portion of the first surface area 1323 of the foldable substrate 1205. In even further aspects, as shown, the first polymer layer 3401 can be positioned between the first surface area 3425 of the first barrier layer 3421 and the first major surface 1213 of the foldable substrate 1205. In even further aspects, as shown, a first contact surface 3403 of the first polymer layer 3401 can contact and be adhered to at least a portion of the first surface area 3425 of the first barrier layer 3421. In even further aspects, as shown, a second contact surface 3405 of the first polymer layer 3401 can contact the first major surface 1213 of the foldable substrate 1205. In still further aspects, the first polymer layer 3401 can be positioned at the first peripheral portion 3465 of the first portion 3461. In still further aspects, the first polymer layer 3401 can comprise a first width 3409. In yet further aspects, the first width 3409 can be about 100 μm or more, about 150 μm more, about 200 μm or more, about 300 μm or more, about 400 μm or more, about 700 μm or more, about 900 μm or more, about 1 mm or more, about 3 mm or less, about 2 mm or less, about 1.5 mm or less, about 1 mm or less, about 700 μm or less, about 600 μm or less, about 500 μm or less, or about 450 μm or less. In yet further aspects, the first width 3409 can be in a range from about 100 μm to about 3 mm, from about 100 μm to about 2 mm, from about 100 μm to about 1 mm, from about 150 μm to about 1 mm, from about 150 μm to about 700 μm, from about 200 μm to about 700 μm, from about 200 μm to about 600 μm, from about 300 μm to about 600 μm, from about 300 μm to about 500 μm, from about 400 μm to about 500 μm, or any range or subrange therebetween. In yet further aspects, the first width 3409 can be in a range from about 100 to about 700 μm, from about 100 μm to about 600 μm, from about 100 μm to about 500 μm, from about 150 μm to about 500 μm, from about 200 μm to about 500 μm, from about 300 μm to about 500 μm, or any range or subrange therebetween. In yet further aspects, the first width 3409 can be in a range from about 200 μm to about 3 mm, from about 300 μm to about 3 mm, from about 300 μm to about 2 mm, from about 700 μm or more to about 2 mm, from about 700 μm to about 1.5 mm, from about 700 μm to about 1 mm, from about 900 μm to about 1 mm, or any range or subrange therebetween.

In further aspects, as shown in FIG. 34, the second portion 3463 can comprise a second barrier layer 3423 and a second polymer layer 3411. In even further aspects, as shown, a second surface area 3427 of the second barrier layer 3423 can contact and be adhered to at least a portion of the third surface area 1333 of the foldable substrate 1205. In even further aspects, as shown, the second polymer layer 3411 can be positioned between the second surface area 3427 of the second barrier layer 3423 and the first major surface 1213 of the foldable substrate 1205. In even further aspects, as shown, a third contact surface 3413 of the second polymer layer 3411 can contact and be adhered to at least a portion of the second surface area 3427 of the second barrier layer 3423. In even further aspects, as shown, a fourth contact surface 3415 of the second polymer layer 3411 can contact the first major surface 1213 of the foldable substrate 1205.

In still further aspects, the second polymer layer 3411 can be positioned at the second peripheral portion 3467 of the second portion 3463. In still further aspects, the second polymer layer 3411 can comprise a second width 3419 that can be within one or more of the ranges discussed above for the first width 3409. In yet further aspects, the second width 3419 can be substantially equal to the first width 3409.

In aspects, as shown in FIG. 34, the etch mask can comprise a third portion 3471 disposed on the second major surface 1215 and/or a fourth portion 3473 disposed on the second major surface 1215. In even further aspects, a minimum distance between a third peripheral portion 3475 of the third portion 3471 and a fourth peripheral portion 3477 of the fourth portion 3473 can be substantially equal to the minimum distance 3469 and/or the width 210 of the first central surface area 213 of the resulting foldable substrate 201 (see FIGS. 2-4). In further aspects, as shown, the third portion 3471 can comprise a third barrier layer 3451 and a third polymer layer 3431. In even further aspects, as shown, a third surface area 3455 of the third barrier layer 3451 can contact and be adhered to at least a portion of the second surface area 1325 of the foldable substrate 1205. In even further aspects, as shown, the third polymer layer 3431 can be positioned between the third surface area 3455 of the third barrier layer 3451 and the second major surface 1215 of the foldable substrate 1205. In even further aspects, as shown, a fifth contact surface 3433 of the third polymer layer 3431 can contact and be adhered to at least a portion of the third surface area 3455 of the third barrier layer 3451. In even further aspects, as shown, a sixth contact surface 3435 of the third polymer layer 3431 can contact the second major surface 1215 of the foldable substrate 1205. In still further aspects, the third polymer layer 3431 can be positioned at the third peripheral portion 3475 of the third portion 3471. In still further aspects, the third polymer layer 3431 can comprise a third width that can be within one or more of the ranges discussed above for the first width 3409. In yet further aspects, the third width can be substantially equal to the first width 3409.

In further aspects, as shown in FIG. 34, the fourth portion 3473 can comprise a fourth barrier layer 3453 and a fourth polymer layer 3441. In even further aspects, as shown, a fourth surface area 3457 of the fourth barrier layer 3453 can contact and be adhered to at least a portion of the fourth surface area 1335 of the foldable substrate 1205. In even further aspects, as shown, the fourth polymer layer 3441 can be positioned between the fourth surface area 3457 of the fourth barrier layer 3453 and the second major surface 1215 of the foldable substrate 1205. In even further aspects, as shown, a seventh contact surface 3443 of the fourth polymer layer 3441 can contact and be adhered to at least a portion of the fourth surface area 3457 of the fourth barrier layer 3453. In even further aspects, as shown, an eighth contact surface 3445 of the fourth polymer layer 3441 can contact the second major surface 1215 of the foldable substrate 1205. In still further aspects, the fourth polymer layer 3441 can be positioned at the fourth peripheral portion 3477 of the fourth portion 3473. In still further aspects, the fourth polymer layer 3441 can comprise a fourth width that can be within one or more of the ranges discussed above for the first width 3409. In yet further aspects, the fourth width can be substantially equal to the first width 3409, the second width 3419, and/or the third width.

In aspects, the first polymer layer 3401, the second polymer layer 3411, the third polymer layer 3431, and/or the fourth polymer layer 3441 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). An exemplary aspect of a polymer for first polymer layer 3401, the second polymer layer 3411, the third polymer layer 3431, and/or the fourth polymer layer 3441 is poly(ethylene terephthalate). In aspects, there may not be an adhesive layer of the first polymer layer 3401 and/or the second polymer layer 3411 contacting the first major surface 1213 of the foldable substrate 1205. In aspects, there may not be an adhesive layer of the third polymer layer 3431 and/or the fourth polymer layer 3441 contacting the second major surface 1215.

In aspects, the first barrier layer 3421, the second barrier layer 3423, the third barrier layer 3451, and/or the fourth barrier layer 3453 can comprise a polymeric tape, for example, comprising a polymeric film and an adhesive film. In further aspects, the polymeric film can comprise one or more of the materials discussed above for the first polymer layer 3401. An exemplary aspect of the polymeric film is polyimide. In further aspects, the adhesive film can comprise a pressure-sensitive adhesive. In further aspects, the adhesive film can comprise a silicone-based polymer, an acrylate-based polymer, an epoxy-based polymer, a polyimide-based material, or a polyurethane. In even further aspects, the adhesive film can comprise an ethylene acid copolymer. An exemplary aspect of an ethylene acid copolymer includes SURLYN available from Dow (e.g., Surlyn PC-2000, Surlyn 8940, Surlyn 8150). Examples of epoxies include bisphenol-based epoxy resins, novolac-based epoxies, cycloaliphatic-based epoxies, and glycidylamine-based epoxies. An exemplary aspect of the adhesive film is a silicone-based polymer (e.g., silicone). Consequently, an exemplary aspect of the first barrier layer 3421, the second barrier layer 3423, the third barrier layer 3451, and/or the fourth barrier layer 3453 is a polymeric tape comprising a polymeric film comprising a polyimide and an adhesive film comprises a silicone. The first barrier layer 3421, the second barrier layer 3423, the third barrier layer 3451, and/or the fourth barrier layer 3453 is resistant to an etchant (e.g., acid) that can be used to etch the foldable substrate. In aspects, although not shown, the barrier layers (e.g., the first barrier layer 3421, the second barrier layer 3423, the third barrier layer 3451, the fourth barrier layer 3453) can be adhered to the foldable substrate 1205 (e.g., the first major surface 1213, the second major surface 1215) through an adhesive layer of the corresponding barrier layer. In aspects, although not shown, the barrier layers (e.g., the first barrier layer 3421, the second barrier layer 3423, the third barrier layer 3451, the fourth barrier layer 3453) can be adhered to the corresponding polymer layer by an adhesive layer of the corresponding barrier layer and/or an adhesive layer of the corresponding polymer layer, for example, Maxi 689BL-003 (Maxi Adhesive Products, Inc.) or JVCC EGPF-01 (J.V. Converting Company, Inc.).

In aspects, as shown in FIG. 35, step 1005 can further comprise etching the foldable substrate 1205 by contacting a portion of the central portion 281 of the foldable substrate 1205 that is between the first portion 3461 of the etch mask and the second portion 3463 of the etch mask to form the foldable substrate 201. As used herein, a surface is positioned between two portions if the surface is laterally positioned between the two portions, which allows for a displacement of the surface perpendicular to the direction of a minimum distance between the two portions. For example, as shown in FIG. 35, a portion (e.g., central region 248) of the central portion 281 of the foldable substrate 201 is positioned between the first portion 3461 of the etch mask and the second portion 3463 of the etch mask even though the central portion 281 is displaced from the first portion 3461 of the etch mask and the second portion 3463 of the etch mask in the direction 202 of the thickness because the direction 202 of the thickness is perpendicular to a direction (e.g., direction 106) of the minimum distance 3469 between the first portion 3461 of the etch mask and the second portion 3463 of the etch mask, and a portion (e.g., central region 248) of the central portion 281 is laterally positioned (e.g., in the direction 106) between the first portion 3461 of the etch mask and the second portion 3463 of the etch mask. In aspects, the etching can remove a portion of the foldable substrate to form the first central surface area 213 that is recessed from the first major surface 203 (e.g., first plane 204*a*) by the first distance 219. In further aspects, the etching can remove a portion of the foldable substrate to form the first transition surface area 215 of the first transition region 212. In further aspects, the etching can remove a portion of the foldable substrate to form the third transition surface area 217 of the second transition region 218. In aspects, the first transition width 214 of the first transition region 212 can be greater than or equal to the first width 3409 of the first polymer layer 3401. In aspects, the second transition width 216 of the second transition region 218 can be greater than or equal to the second width 3419 of the second polymer layer 3411.

In aspects, as shown in FIG. 35, etching the foldable substrate 1205 can comprise contacting the central portion 281 of the foldable substrate 1205 that is between the third portion 3471 of the etch mask and the fourth portion 3473 of the etch mask to form the foldable substrate 201. In aspects, the etching can remove a portion of the foldable substrate to form the second central surface area 243 that is recessed from the second major surface 205 (e.g., second plane 206*a*) by the second distance 249. In further aspects, the etching can remove a portion of the foldable substrate to form the second transition surface area 245 of the first transition region 212. In further aspects, the etching can remove a portion of the foldable substrate to form the fourth transition surface area 247 of the second transition region 218.

In aspects, as shown in FIG. 35, etching the foldable substrate can comprise contacting the central portion 281 (of the foldable substrate 1205) with an etchant 1403 to form the foldable substrate 201. In further aspects, as shown, the etchant 1403 can be a liquid etchant contained in an etchant bath 1401. Without wishing to be bound by theory, the polymer layer can be deflected away from the foldable substrate during etching to enable the etchant access to an additional portion of the foldable substrate that the polymer layer could otherwise be in contact with. While the etchant can contact the additional portion of the foldable substrate by deflection of the polymer layer, diffusion of the etchant to the additional portion is limited, which limits the extent of etching of the additional portion, producing a transition region with the illustrated sloped profile.

As a result of forming the first central surface area 213 in step 1005, the first central surface area 213 can be recessed from the first plane 204*a* (e.g., first surface area 223, third surface area 233) (see FIGS. 2-4 and 16) or the first plane 1404*a* (e.g., first surface area 1323, third surface area 1333) (see FIG. 14) by a first distance, which can be within one or more of the ranges discussed above for the first distance 219 shown in FIGS. 2-3). As a result of forming the second central surface area 243 in step 1005, the second central surface area 243 can be recessed from the second plane 206*a* (e.g., second surface area 225, fourth surface area 235) (see FIGS. 2-3 and 16) or the second plane 1406*a* (e.g., second surface area 1325, fourth surface area 1335) (see FIG. 14) by a second distance, which can be within one or more of the ranges discussed above for the second distance 249 shown in FIGS. 2-3). In aspects, the first distance can be substantially equal to the second distance. In aspects, the first distance can be greater than the second distance.

Figures 20, 21, 22:
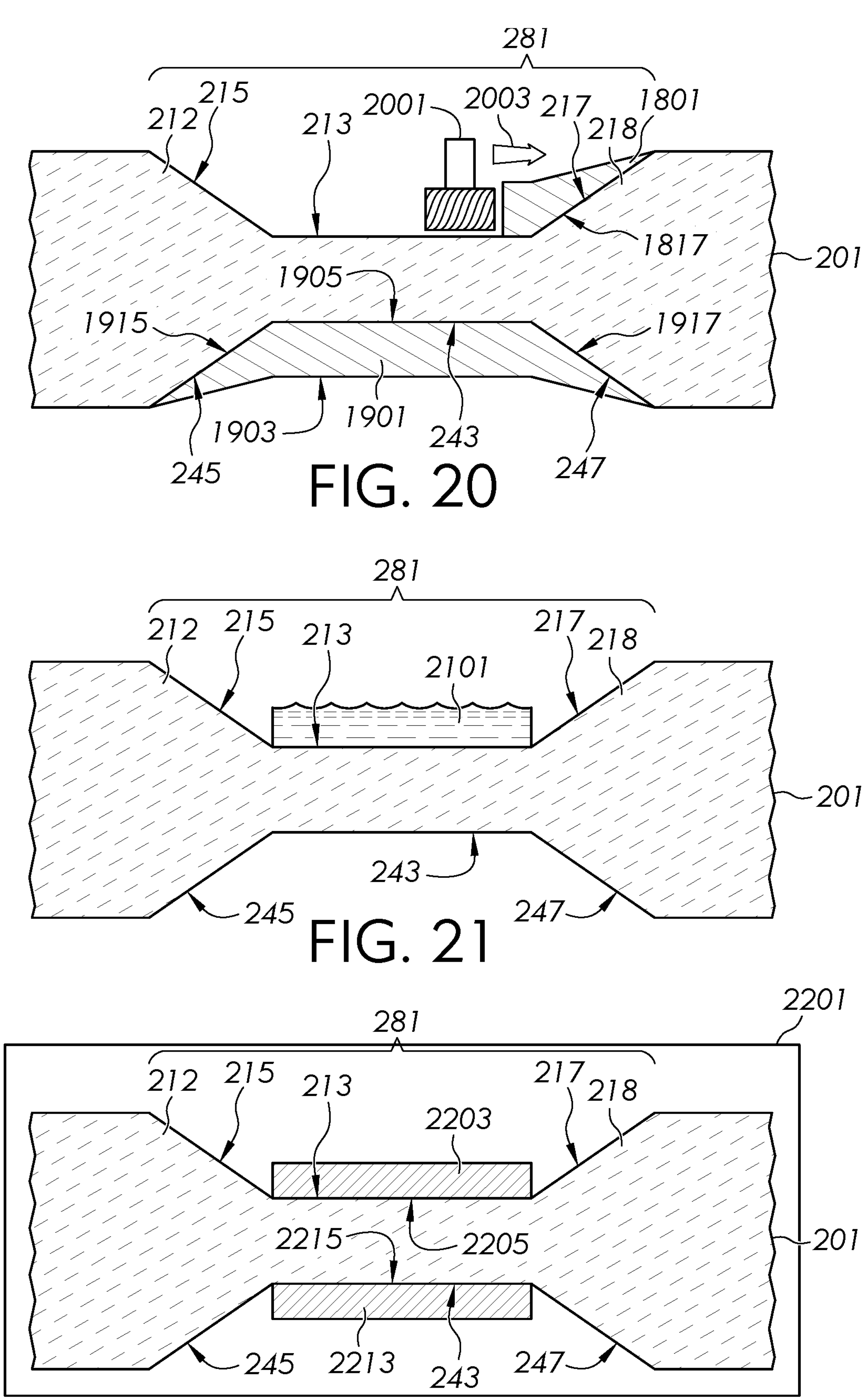

After step 1001 or 1005, as shown in FIGS. 21-22, methods can proceed to step 1007 comprising disposing an alkali-metal ion-containing layer 2203 or 2213 over the central portion 281. In aspects, as shown in FIG. 21, step 1007 can comprise disposing a first salt paste 2101 over the first central surface area 213, which can be cured to form the first alkali-metal ion-containing layer 2203 with a first contact surface area 2205 contacting the first central surface area 213, as shown in FIG. 22. In further aspects, although not shown, a second salt paste can be disposed over the second central surface area 243, which can be cured to form the second alkali-metal ion-containing layer 2213 with a second contact surface area 2215 contacting the second central surface area 243, as shown in FIG. 22. In further aspects, although not shown, the first alkali-metal ion-containing layer and/or the second alkali-metal ion-containing layer may be disposed on the foldable substrate without disposing salt pastes.

In aspects, the first salt paste 2101 and/or the second salt paste can comprise an organic binder or a solvent. The organic binder can comprise one or more of cellulose, a cellulose derivative, a hydrophobically modified ethylene oxide urethane modifier (HUER), and an ethylene acrylic acid. Examples of a cellulose derivate comprise ethyl cellulose, methyl cellulose, and AQUAZOL (poly 2 ethyl-2 oxazine). The solvent can comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene). In aspects, the first salt paste can be cured to form the first alkali-metal ion-containing layer 2203 by removing the solvent and/or the organic binder, if present. Likewise, the second salt paste can be cured to form the second alkali-metal ion-containing layer 2213 by removing the solvent and/or the organic binder, if present. In further aspects, the solvent and/or organic binder can be removed by drying the first salt paste 2101 and/or the second salt paste at room temperature (e.g., from about 20° C. to about 30° C.) for eight hours or more. In further aspects, the solvent and/or organic binder can be removed by drying the first salt paste 2101 and/or the second salt paste at a temperature in a range from about 100° C. to about 140° C. or from about 100° C. to about 120° C. for a time period in a range from about 8 minutes to about 30 minutes, or from about 8 minutes to about 20 minutes, or from about 8 minutes to about 15 minutes.

In aspects, the alkali-metal ion-containing layers (e.g., first alkali-metal ion-containing layer 2203 and/or second alkali-metal ion-containing layer 2213) can be substantially free (e.g., free) of potassium. In aspects, the alkali-metal ion-containing layers (e.g., first alkali-metal ion-containing layer 2203 and/or second alkali-metal ion-containing layer 2213) can comprise one or more of the lithium-containing compounds and/or sodium-containing compounds. In aspects, the first alkali-metal ion-containing layer 2203 and/or the second alkali-metal ion-containing layer 2213 can comprise one or more of one or more of lithium nitrate, lithium phosphate, lithium chloride, lithium sulfate, sodium chloride, sodium sulfate, sodium nitrate, and/or sodium phosphate. In further aspects, the first alkali-metal ion-containing layer 2203 and/or the second alkali-metal ion-containing layer 2213 can comprise a concentration of potassium on an oxide basis less than an existing average concentration of potassium on an oxide basis in the central portion. As used herein, "on an oxide basis" means the component is measured as if the non-oxygen components in the compound were converted into a specified oxide form or a fully oxidized oxide if a specific oxide form is not specified. For example, sodium (Na) on an oxide basis refers to amounts in terms of sodium oxide ($Na_2O$) while potassium on an oxide basis refers to amounts in terms of potassium oxide ($K_2O$). As such, a component need not actually be in the specified oxide form or in the fully oxidized oxide form in order for the component to count in measures on "an oxide basis." As such, a measurement "an oxide basis" for a specific component comprises conceptually converting materials comprising the non-oxygen element of the specific component into the specified oxide form or the fully oxidized oxide if a specific oxide form is not specified before calculating the concentration on an oxide basis. In even further aspects, a concentration of potassium on an oxide basis in the first alkali-metal ion-containing layer 2203 and/or the second alkali-metal ion-containing layer 2213 can contain a concentration of potassium on an oxide basis of about 1,000 ppm or less, about 500 ppm or less, about 300 ppm or less, about 1 ppm or more, or about 100 ppm or more. In even further aspects, the first alkali-metal ion-containing layer 2203 and/or the second alkali-metal ion-containing layer 2213 can be in a range from about 1 ppm to about 1,000 ppm, from about 1 ppm to about 500 ppm, from about 100 ppm to about 500 ppm, from about 100 ppm to about 300 ppm, or any range or subrange therebetween. In even further aspects, the concentration of potassium on an oxide basis in the first alkali-metal ion-containing layer 2203 and/or the second alkali-metal ion-containing layer 2213 as a percentage of the corresponding existing average concentration of the central portion 281 can be about 1% or more, about 10% or more, about 20% or more, about 80% or less, about 60% or less, about 50% or less, about 40% or less, or about 30% or less. In further aspects, the concentration of potassium on an oxide basis in the first alkali-metal ion-containing layer 2203 and/or the second alkali-metal ion-containing layer 2213 as a percentage of the corresponding existing average concentration of the central portion can be in a range from about 1% to about 80%, from about 1% to about 60%, from about 10% to about 60%, from about 10% to about 50%, from about 20% to about 50%, from about 20% to about 40%, from about 20% to about 30%, or any range or subrange therebetween. In even further aspects, a concentration of sodium and/or lithium on an oxide basis in the first alkali-metal ion-containing layer 2203 and/or the second alkali-metal ion-containing layer 2213 can be an oxide basis of about 1,000 ppm or more, about 5,000 ppm or more, about 10,000 ppm or more, about 25,000 ppm or more, about 500,000 ppm or less, about 200,000 ppm or less, about 100,000 ppm or less, or about 50,000 ppm or less. In further aspects, a concentration of sodium and/or lithium on an oxide basis in the first alkali-metal ion-containing layer 2203 and/or the second alkali-metal ion-containing layer 2213 can be in a range from about 1,000 ppm to about 500,000 ppm, from about 5,000 ppm to about 500,000, from about 5,000 ppm to about 200,000 ppm, from about 10,000 ppm to about 200,000 ppm, from about 10,000 ppm to about 100,000, from about 25,000 ppm to about 100,000 ppm, from about 25,000 ppm to about 50,000 ppm, or any range or subrange therebetween. Providing an alkali-metal ion-containing paste comprising sodium and/or lithium can be disposed over the central portion (e.g., first central surface area and/or the second central surface area) to decrease (e.g., relatively or absolutely) a chemical strengthening induced expansion strain of the corresponding portion by exchanging larger alkali-metal ions in the corresponding portion for smaller alkali-metal ions in the alkali-metal ion-containing paste, which can reduce an incidence of mechanical instabilities.

In aspects, the first alkali-metal ion-containing layer 2203 and/or the second alkali-metal ion-containing layer 2213 can be substantially free from alkali earth metals (e.g., alkali earth metal ions, alkali earth metal-containing compounds). As used herein, alkali earth metals include beryllium, magnesium, calcium, strontium, barium, and radium. In aspects, the first alkali-metal ion-containing layer 2203 and/or the second alkali-metal ion-containing layer 2213 can comprise one or more alkali earth metals (e.g., alkali earth metal ions, alkali earth metal-containing compounds). In further aspects, the one or more alkali earth metals in the first alkali-metal ion-containing layer 2203 and/or the second alkali-metal ion-containing layer 2213 can comprise calcium (e.g., calcium ions, calcium chloride, calcium nitrate, potassium carbonate). Without wishing to be bound by theory, providing one or more alkali earth metals in a salt paste can reduce the extent of chemically strengthening, for example, by competing with alkali metals in the salt paste, which reduces the rate of exchange between ions in the foldable substrate and alkali-metal ions in the salt paste. Without wishing to be bound by theory, providing calcium as the one or more alkali earth metals in the salt paste can more effectively compete with potassium than other alkali earth metals because of the similarity in ionic radius and mass between potassium ions and calcium ions. In further aspects, a concentration of one or more alkali earth metals (e.g., calcium) can be about 10 ppm or more, about 50 ppm or more, about 100 ppm or more, about 200 ppm or more, about 400 ppm or more, about 10,000 ppm or less, about 5,000 ppm or less, about 2,000 ppm or less, about 1,000 ppm or less, about 750 ppm or less, or about 500 ppm or less. In further aspects, a concentration of one or more alkali earth metals (e.g., calcium) can be in a range from about 10 ppm to about 10,000 ppm, from about 10 ppm to about 5,000 ppm, from about 50 ppm to about 5,000 ppm, from about 50 ppm to about 2,000 ppm, from about 100 ppm to about 2,000 ppm, from about 100 ppm to about 1,000 ppm, from about 200 ppm to about 1,000 ppm, from about 200 ppm to about 750 ppm, from about 400 ppm to about 750 ppm, from about 400 ppm to about 500 ppm, or any range or subrange therebetween.

After step 1007, as shown in FIG. 22, methods of the disclosure can proceed to step 1009 comprising heating the foldable substrate 201. In aspects, as shown, the foldable substrate 201 can be placed in an oven 2201. In further aspects, as shown, the foldable substrate 201 can comprise the first alkali-metal ion-containing layer 2203 and/or the second alkali-metal ion-containing layer 2213. In aspects, the foldable substrate 201 can be heated at a temperature of about 300° C. or more, about 360° C. or more, about 400° C. or more, about 500° C. or less, about 460° C. or less, or about 400° C. or less. In aspects, foldable substrate 201 can be heated at a temperature in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 300° C. to about 400° C., from about 360° C. to about 400° C., or any range or subrange therebetween. In aspects, the foldable substrate 201 can be heated for about 15 minutes or more, about 1 hour or more, about 3 hours or more, about 48 hours or less, about 24 hours or less, or about 8 hours or less. In aspects, the foldable substrate 201 can be heated for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween. After the foldable substrate 201 has been heated, an average concentration of potassium on an oxide basis in the central portion 281 can be less than the corresponding existing average concentration of the central portion 281 before step 1009. After the foldable substrate 201 has been heated, an average concentration of potassium on an oxide basis in the central portion 281 can be less than a corresponding average concentration of potassium on an oxide basis in the first transition region and/or the second transition region. Decreasing a concentration of potassium in the central portion in step 1009 can decrease a chemical strengthening induced expansion strain of the central portion in the final foldable substrate.

Figure 23:
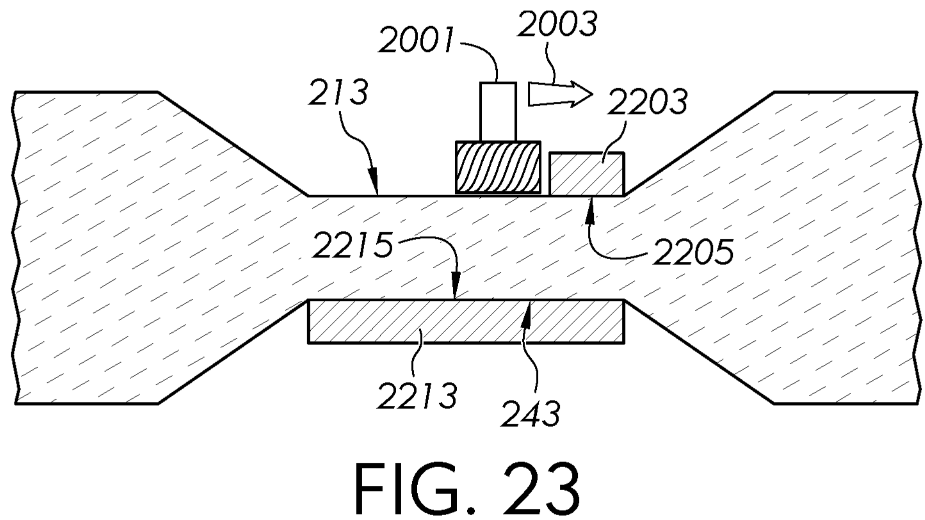

After step 1009, as shown in FIG. 23, methods of the disclosure can proceed to step 1011 comprising removing the first alkali-metal ion-containing layer 2203 and/or the second alkali-metal ion-containing layer 2213. In aspects, as shown, removing the first alkali-metal ion-containing layer 2203 can comprise moving a grinding tool 2001 in a direction 2003 across the surface (e.g., first central surface area 213). In even further aspects, using the tool may comprise sweeping, scraping, grinding, pushing, etc. In further aspects, the first alkali-metal ion-containing layer 2203 and/or the second alkali-metal ion-containing layer 2213 can be removed by washing the surface (e.g., first central surface area 213, second central surface area 243) with a solvent.

Figure 18:
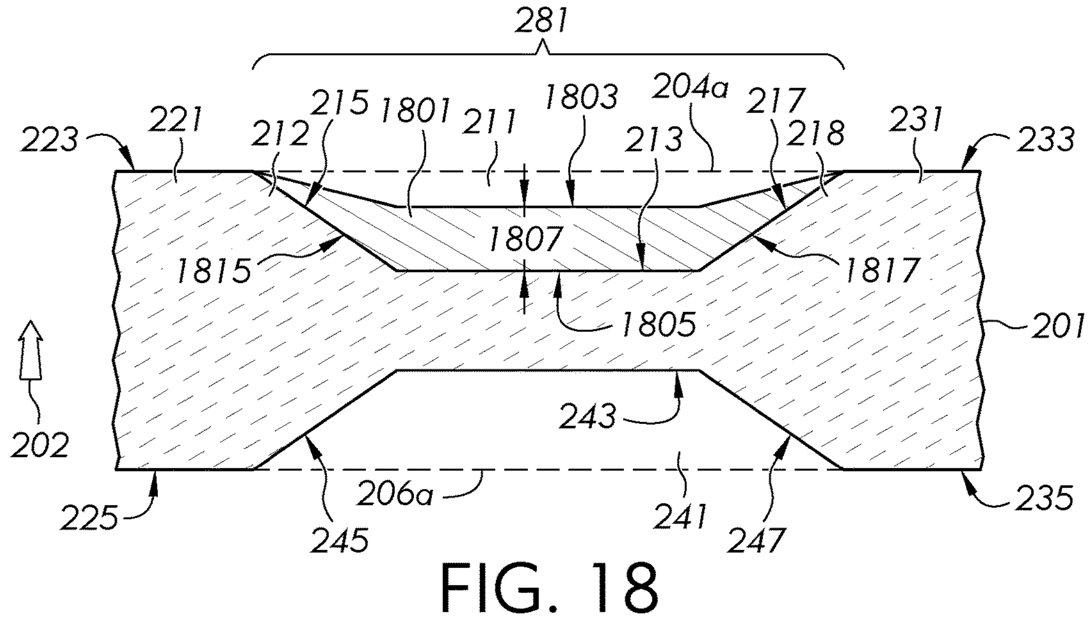

After step 1001 or 1005, as shown in FIG. 18, methods can proceed to step 1019 comprising disposing a layer (e.g., first layer 1801, second layer 1901) over the central portion 281. In aspects, disposing the layer (e.g., first layer 1801, second layer 1901) can comprise disposing a material using chemical vapor deposition (CVD) (e.g., low-pressure CVD, plasma-enhanced CVD), physical vapor deposition (PVD) (e.g., evaporation, molecular beam epitaxy, ion plating), atomic layer deposition (ALD), sputtering, spray pyrolysis, chemical bath deposition, and/or sol-gel deposition. In aspects, the layer can comprise a material comprising a diffusivity for one or more alkali metal ions less than a central diffusivity of the one or more alkali metal ions of the central portion of the foldable substrate. Without wishing to be bound by theory, a layer with a decreased diffusivity relative to a foldable substrate (e.g., central portion) can limit (e.g., decrease) the extent of chemically strengthening of a portion of the foldable substrate that the layer is disposed over, for example, by decreasing the concentration of the one or more alkali ions at a surface of the foldable substrate in the portion relative to another portion of the foldable substrate that the layer is not disposed over. In further aspects, the diffusivity of the layer relative to the diffusivity of the foldable substrate can be about 5% or more, about 10% or more about 20% or more, about 25% or more, about 80% or less, about 60% or less, about 50% or less, about 40% or less, or about 30% or less. In further aspects, the diffusivity of the layer relative to the diffusivity of the foldable substrate can be in a range from about 5% to about 80%, from about 5% to about 60%, from about 10% to about 60%, from about 10% to about 50%, from about 20% to about 50%, from about 25% to about 50%, from about 25% to about 40%, from about 25% to about 30%, or any range or subrange therebetween. In aspects, the layer can comprise titanium dioxide ($TiO_2$), zirconia ($ZrO_2$), tin oxide ($SnO_2$), alumina ($Al_2O_3$), silica ($SiO_2$), silicon nitride ($Si_3N_4$), and/or combinations thereof. An exemplary aspect comprises disposing a layer of $SiO_2$ using PVD. Providing a layer comprising a decreased (but still substantial) diffusivity relative to a foldable substrate can reduce chemically strengthening induced instabilities while keeping the number of required chemically strengthening steps low, keeping down processing costs and processing time.

Figure 19:
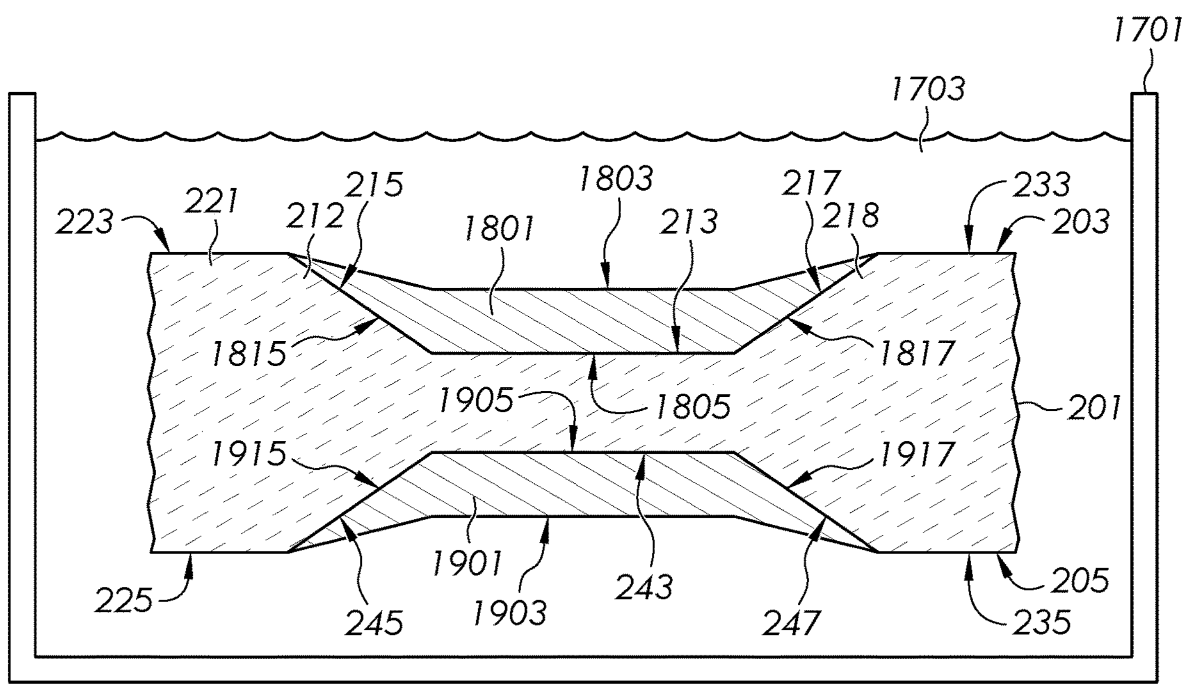

In aspects, as shown in FIG. 19, step 1019 can comprise disposing a first layer 1801 over the first central surface area 213 and/or a second layer 1901 over the second central surface area 243. In further aspects, as shown in FIG. 18, the first central surface area 213 can contact a second contact surface 1805 of the first layer 1801. In aspects, as shown in FIG. 18, the first layer 1801 can comprise a first central thickness 1807 defined between a first contact surface 1803 and the second contact surface 1805 opposite the first contact surface 1803. In further aspects, as shown, the second contact surface 1805 can contact the first central surface area 213. In further aspects, the first central thickness 1807 can be in the direction 202 of the central thickness 209 and/or the substrate thickness 207. In further aspects, as shown in FIG. 18, a thickness of the first layer over the first central surface area 213 can be substantially the same (e.g., equal to the first central thickness 1807). In further aspects, as shown in FIG. 19, the first layer 1801 can be disposed over the first transition region 212 and/or the second transition region 218, for example, with a first transition contact surface 1815 of the first layer 1801 contacting the first transition surface area 215 of the first transition region 212 and/or a third transition contact surface 1817 of the first layer 1801 contacting the third transition surface area 217 of the second transition region 218. In even further aspects, as shown, an average thickness of the first layer 1801 over the first transition surface area 215 and/or the third transition surface area 217 can be less than the first central thickness of the first layer 1801. In still further aspects, as shown, a thickness of the first layer 1801 decreases, continuously decreases, monotonically decreases, and/or continuously and monotonically decreases from the first central thickness over the first central surface area to zero over the first surface area 223. In even further aspects, as shown, an average thickness of the first layer 1801 over the first transition surface area 215 and/or the third transition surface area 217 can be less than the first central thickness of the first layer 1801. In still further aspects, as shown, a thickness of the first layer 1801 decreases, continuously decreases, monotonically decreases, and/or continuously and monotonically decreases from the first central thickness over the first central surface area to zero over the third surface area 233.

In aspects, as shown in FIGS. 19-20, the second layer 1901 can contact the second central surface area 243. In further aspects, the second layer 1901 can comprise a third contact surface 1903 and a fourth contact surface 1905 opposite the third contact surface 1903. In even further aspects, the fourth contact surface 1905 can contact the second central surface area 243. In even further aspects, a thickness of the second layer 1901 can be substantially the same over the second central surface area 243. In even further aspects, a second central thickness of the second layer 1901 over the second central surface area 243 can be substantially equal to first central thickness 1807 of the first layer 1801 over the first central surface area 213. In further aspects, as shown in FIGS. 19-20, the second layer 1901 can be disposed over the first transition region 212 and/or the second transition region 218, for example, with a third transition contact surface 1915 of the second layer 1901 contacting the second transition surface area 245 of the first transition region 212 and/or a fourth transition contact surface 1917 of the second layer 1901 contacting the fourth transition surface area 247 of the second transition region 218. In even further aspects, as shown, an average thickness of the second layer 1901 over the second transition surface area 245 and/or the fourth transition surface area 247 can be less than the second central thickness of the second layer 1901 over the second central surface area 243. In still further aspects, as shown, a thickness of the second layer 1901 decreases, continuously decreases, monotonically decreases, and/or continuously and monotonically decreases from the second central thickness over the second central surface area to zero over the second surface area 225. In even further aspects, as shown, an average thickness of the second layer 1901 over the second transition surface area 245 and/or the fourth transition surface area 247 can be less than the second central thickness of the second layer 1901 over the second central surface area 243. In still further aspects, as shown, a thickness of the second layer 1901 decreases, continuously decreases, monotonically decreases, and/or continuously and monotonically decreases from the second central thickness over the second central surface area to zero over the fourth surface area 235.

In aspects, the first central thickness 1807 of the first layer 1801 and/or the second central thickness of the second layer 1901 can be about 0.5 nm or more, about 1 nm or more, about 5 nm or more, about 10 nm or more, about 20 nm or more, about 250 nm or less, about 200 nm or less, about 150 nm or less, about 100 nm or less, or about 50 nm or less. In even further aspects, the first central thickness 1807 of the first layer 1801 and/or the second central thickness of the second layer 1901 can be in a range from about 0.5 nm to about 250 nm, from about 0.5 nm to about 200 nm, from about 1 nm to about 200 nm, from about 1 nm to about 150 nm, from about 5 nm to about 150 nm, from about 5 nm to about 100 nm, from about 10 nm to about 100 nm, from about 10 nm to about 50 nm, from about 20 nm to about 50 nm, or any range or subrange therebetween.

Figure 17:
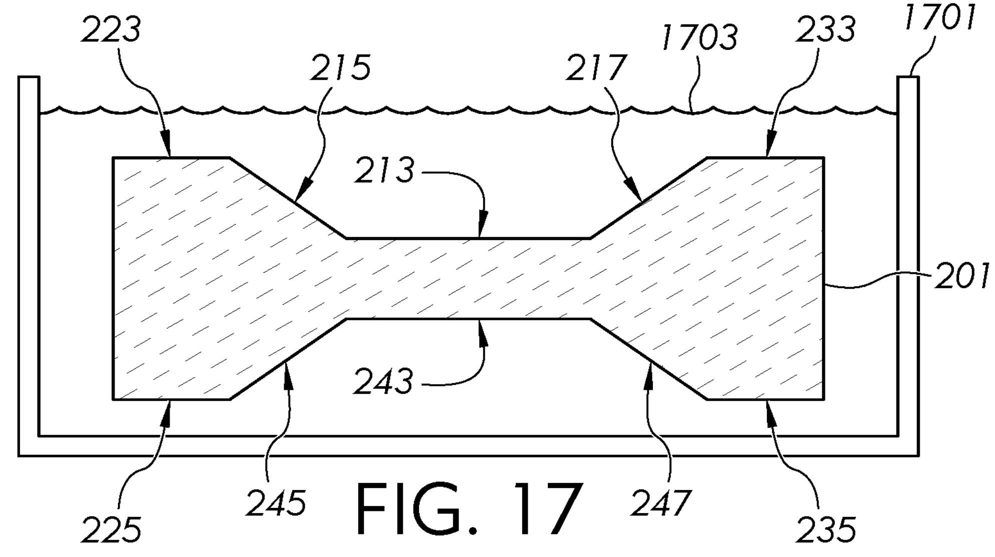

After step 1009, 1011, or 1019, as shown in FIGS. 17 and 19, methods can proceed to step 1013 comprising chemically strengthening the foldable substrate 201 by contacting the foldable substrate 201 with potassium cations and/or sodium cations. In aspects, as shown, the foldable substrate 201 can be immersed in a salt bath 1701 containing a salt solution 1703 comprising potassium cations and/or sodium cations. In further aspects, a composition of the salt solution 1703 can comprise one or more components discussed with reference to salt solution 1203 and/or can be the same as the salt solution 1203 in step 1003. In further aspects, a temperature of the salt solution 1703 can be within one or more of the ranges discussed above for the temperature of the salt solution 1203 in step 1003. In further aspects, the foldable substrate 201 can be in contact with the salt solution 1703 for about 1 minute or more, 5 minutes or more, about 15 minutes or more, about 30 minutes or more, about 8 hours or less, about 2 hours or less, or about 1 hour or less. In aspects, the foldable substrate 201 can be in contact with the salt solution 1703 for a time in a range from about 1 minute to about 8 hours, from about 1 minute to about 2 hours, from about 5 minutes to about 2 hours, from about 5 minutes to about 1 hour, from about 30 minutes to about 1 hour, or any range or subrange therebetween.

In aspects, a first time that the salt solution 1703 contacts the foldable substrate 201 in step 1013 can be less than an initial period of time that the salt solution 1203 contacts the foldable substrate 1205 in step 1003. In further aspects, a ratio of the initial period time divided by the first period of time can be greater than or equal to a ratio of the central thickness divided by the substrate thickness. In even further aspects, a ratio of the initial period time divided by the first period of time can be greater than or equal to a ratio of a square of the central thickness divided by a square of the substrate thickness.

In aspects, as shown in FIGS. 17 and 19, the salt solution 1703 can contact the first surface area 223, the second surface area 225, the third surface area 233, and the fourth surface area 235. In further aspects, as shown in FIG. 17, the salt solution 1703 can further contact the first central surface area 213 and the second central surface area 243, for example, if a layer was not applied over the central portion or if a layer applied over the central portion was removed (e.g., in step 1011) prior to step 1013. In further aspects, as shown in FIG. 19, a layer (e.g., first layer 1801, second layer 1901) can separate the first central surface area 213 and/or the second central surface area 243 from the salt solution 1703. In even further aspects, as shown, the layer (e.g., first layer 1801, second layer 1901) can separate the first transition region 212 (e.g., first transition surface area 215, second transition surface area 245) and/or the second transition region 218 (e.g., third transition surface area 217, fourth transition surface area 247) from the salt solution. In even further aspects, although not shown, the layer(s) of steps 1007 and/or 1009 (see FIGS. 21-22) can cover the first central surface area 213 and/or the second central surface area 243 but not the first transition region 212 or the second transition region 218. Providing a layer covering the first central surface area and/or the second central surface area can enable the relationship discussed above for the profile of the chemical strengthening induced expansion strain, for example, by reducing chemical strengthening induced expansion strain of the first central surface area and/or the second central surface area relative adjacent regions of the foldable substrate.

Providing the first alkali-metal ion-containing layer 2203 and/or the second alkali-metal ion-containing layer 2213 in one or more of steps 1007, 1009, 1011, and 1013 can decrease an incidence of mechanical instabilities, for example, by decreasing a chemical strengthening induced expansion strain of the central portion relative to the first portion and the second portion. In aspects, the first alkali-metal ion-containing layer 2203 and/or the second alkali-metal ion-containing layer 2213 reduces a chemical strengthening induced expansion strain of the central portion in step 1009 and/or 1013. For example, the foldable substrate resulting from methods using the first alkali-metal ion-containing layer 2203 and/or the second alkali-metal ion-containing layer 2213 can resemble curve 3211 shown in diamonds in FIG. 32, where portions corresponding to lower thickness (e.g., central portion) can optionally be chemically strengthened to an extent but still comprise a chemical strengthening induced expansion strain less than adjacent portions and/or regions comprising a greater thickness (e.g., first portion, second portion, first transition region, second transition region). Providing the first layer 1801 and/or the second layer 1901 in one or more of steps 1019 and 1013 can decrease an incidence of mechanical instabilities, for example, by decreasing a chemical strengthening induced expansion strain of the central portion relative to the first portion and the second portion. For example, the foldable substrate resulting from methods using the first layer 1801 and/or the second layer 1901 can resemble curve 3211 shown in diamonds in FIG. 32, where portions corresponding to lower thickness (e.g., central portion) can be chemically strengthened to an extent but still comprise a chemical strengthening induced expansion strain less than adjacent portions and/or regions comprising a greater thickness (e.g., first portion, second portion, first transition region, second transition region).

After step 1013, as shown in FIGS. 20, 23, and 29-31, methods can proceed to step 1015 comprising further processing the foldable substrate and/or assembling the foldable apparatus. In aspects, as shown in FIGS. 20 and 23, step 1015 can comprise removing a layer (e.g., first layer 1801 and/or second layer 1901, first alkali-metal ion-containing layer 2203 and/or second alkali-metal ion-containing layer 2213), for example, by moving a grinding tool 2001 in a direction 2003 across the surface (e.g., first central surface area 213), if the corresponding layer was applied in step 1013 or 1007 but not removed before step 1013.

Figures 29, 30, 31:
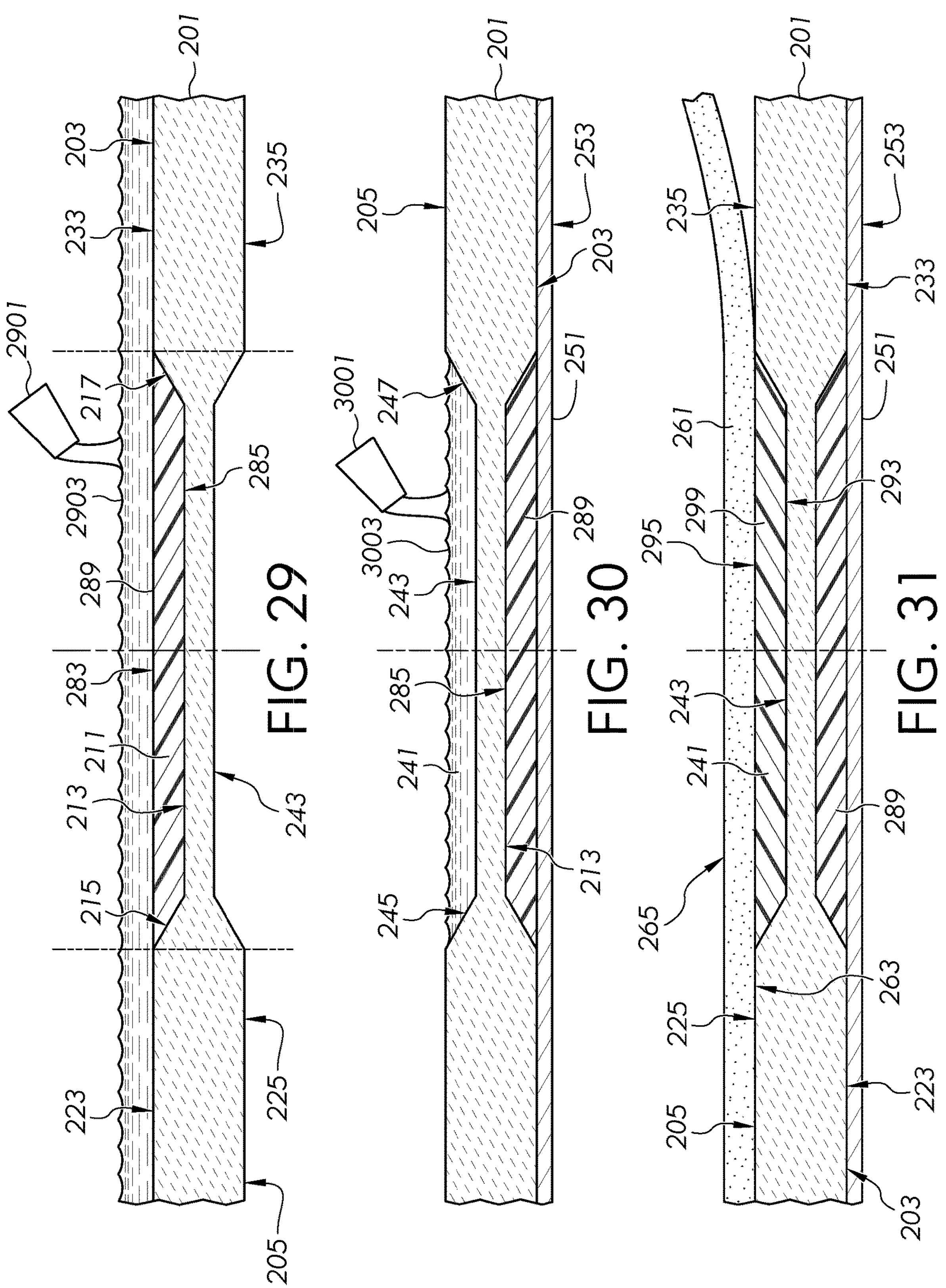

In aspects, as shown in FIGS. 29-31, step 1015 can comprise assembling the foldable apparatus by disposing a polymer-based portion (e.g., first polymer-based portion 289, second polymer-based portion 299), an adhesive layer 261, and/or a coating 251 over the foldable substrate 201. In further aspects, as shown in FIG. 29, a first polymer-based portion 289 can be disposed in the first recess 211 and/or over the first central surface area 213. In further aspects, as shown in FIGS. 29-30, a coating 251 can be disposed over the first major surface 203 (e.g., first surface area 223 and third surface area 233), for example, by dispensing a second liquid 2903 from a container 2901 (e.g., conduit, flexible tube, micropipette, or syringe) over the first major surface 203 that can be cured to form the coating 251. In even further aspects, the second liquid 2903 may comprise a coating precursor, a solvent, particles, nanoparticles, and/or fibers. In still further aspects, the coating precursor can comprise, without limitation, one or more of a monomer, an accelerator, a curing agent, an epoxy, and/or an acrylate. Curing the second liquid 2903 can comprise heating the second liquid 2903, irradiating the second liquid 2903 with ultraviolet (UV) radiation, and/or waiting a predetermined amount of time (e.g., from about 30 minutes to 24 hours, from about 1 hour to about 8 hours). In aspects, although not shown, the coating 251 can be disposed in the first recess 211 (e.g., fill the first recess 211) without contacting the first major surface 203 (e.g., first surface area 223, third surface area 233), for example, in place of the first polymer-based portion 289 in FIGS. 29-31. In further aspects, as shown in FIGS. 30-31, a second polymer-based portion 299 can be disposed in the second recess 241, for example, by dispensing a third liquid 3003 from a container 3001 (e.g., conduit, flexible tube, micropipette, or syringe) over the second central surface area 243 that can be cured to form the second polymer-based portion 299. Curing the third liquid 3003 can comprise heating the third liquid 3003, irradiating the third liquid 3003 with ultraviolet (UV) radiation, and/or waiting a predetermined amount of time (e.g., from about 30 minutes to 24 hours, from about 1 hour to about 8 hours). In further aspects, as shown in FIG. 31, an adhesive layer 261 can contact the second major surface 205 (e.g., the second surface area 225 and the fourth surface area 235). For example, the adhesive layer 261 can comprise one or more sheets of an adhesive material. In aspects, there can be an integral interface between the one or more sheets comprising the adhesive layer 261, which can reduce (e.g., avoid) optical diffraction and/or optical discontinuities as light travels between the sheets since the one or more sheets can include substantially the same index of refraction. In aspects, although not shown, at least a portion of the adhesive layer can be disposed in the second recess. In aspects, a release liner (e.g., see release liner 271 in FIG. 2) or a display device may be disposed on the adhesive layer 261 (e.g., second contact surface 265). After step 1013 or 1015, methods of the disclosure according to the flow chart in FIG. 10 of making the foldable substrate and/or foldable apparatus can be complete at step 1017.

The foldable substrate and/or foldable apparatus produced from methods discussed with reference to the flow chart in FIG. 10 can comprise one or more of the features discussed above for reducing mechanical instabilities. In aspects, a maximum first transition tensile stress of the first transition tensile stress region can be greater than or equal to the maximum central tensile stress. In aspects, the first transition average concentration of the one or more alkali-metal ions can be greater than or equal to the central average concentration of the one or more alkali-metal ions. In aspects, the first transition width of the first transition region can be less than or equal to 2.2 millimeters minus a product of the central TTV in micrometers and 0.2 millimeters per micrometer. In aspects, the first transition width of the first transition region is less than or equal to 2.2 millimeters minus a product of the central TTV in micrometers and 0.2 millimeters per micrometer.

Figure 10:
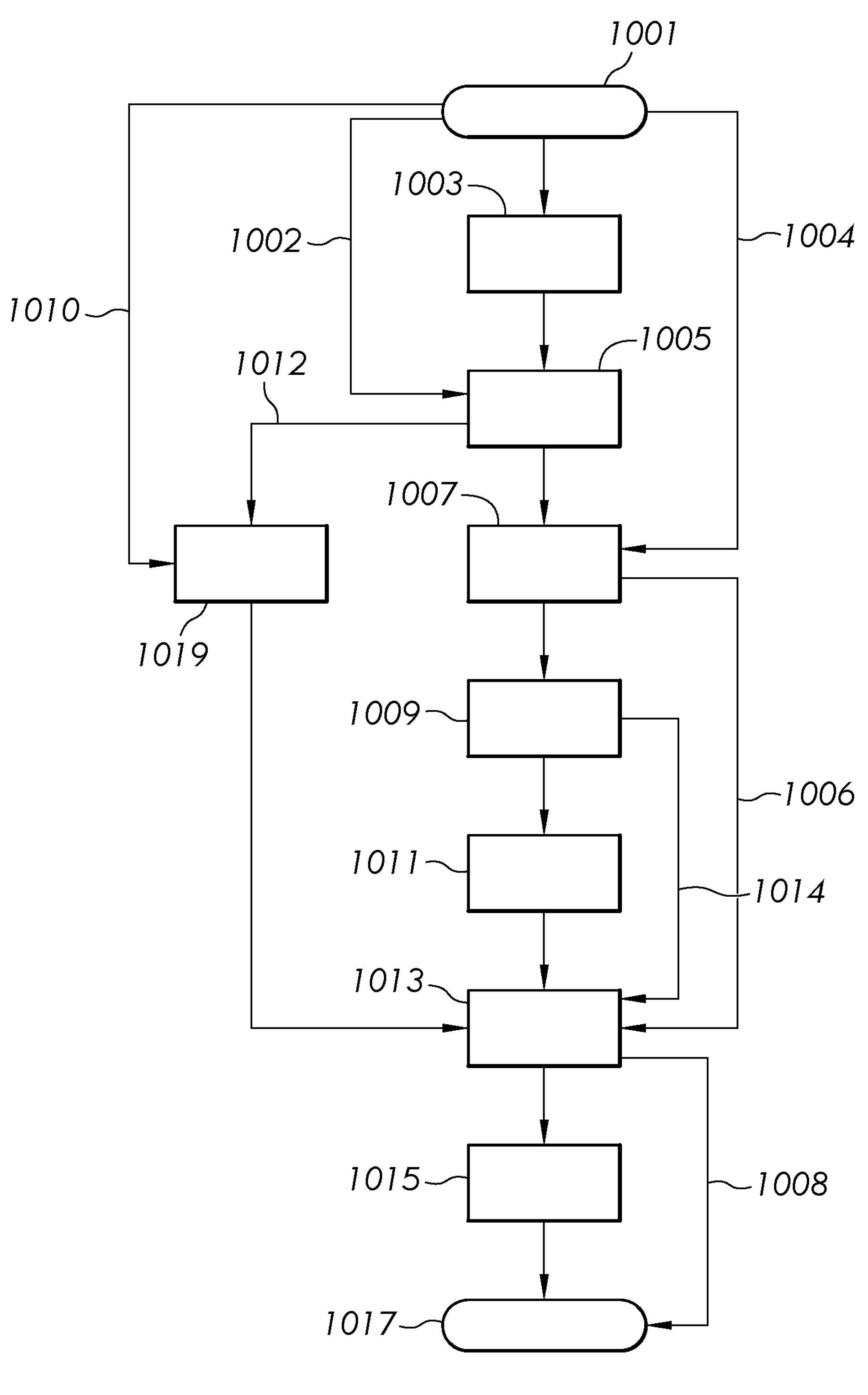
FIGS. 10-11 are flow charts illustrating example methods making foldable apparatus in accordance with aspects of the disclosure.

In aspects, methods of making a foldable apparatus in accordance with aspects of the disclosure can proceed along steps 1001, 1003, 1005, 1007, 1009, 1011, 1013, 1015, and 1017 of the flow chart in FIG. 10 sequentially, as discussed above. In aspects, arrow 1002 can be followed from step 1001 to step 1005, for example, when the foldable substrate 201 and/or 1205 comprises one or more compressive stress regions after step 1001. In aspects, arrow 1004 can be followed from step 1001 to step 1007, for example, when the foldable substrate 201 and/or 1205 comprises one or more compressive stress regions, a first recess 211, and/or a second recess 241 after step 1001. In aspects, arrow 1010 can be followed from step 1001 to step 1019, for example, when the foldable substrate 201 and/or 1205 comprises one or more compressive stress regions, a first recess 211, and/or a second recess 241 after step 1001. In aspects, methods can follow arrow 1012 from step 1005 to step 1019, for example, if the first layer 1801 is to be used. In aspects, methods can follow arrow 1006 from step 1007 to step 1013 comprising chemically strengthening the foldable substrate 201, for example, if the foldable substrate is to be chemically strengthened in step 1013 with the alkali-metal ion-containing layers 2203 and/or 2213 disposed over the central portion 281. In aspects, methods can follow arrow 1014 from step 1009 to step 1013 comprising chemically strengthening the foldable substrate 201, for example, if the foldable substrate is to be chemically strengthened in step 1013 with the alkali-metal ion-containing layers 2203 and/or 2213 disposed over the central portion 281. In aspects, methods can follow arrow 1008 from step 1013 to step 1017, for example, if the foldable apparatus fully assembled at the end of step 1013. Any of the above options may be combined to make a foldable apparatus in accordance with aspects of the disclosure.

Example aspects of making the foldable apparatus resembling foldable apparatus 101, 301, 401, 501, and/or 701 and/or a foldable substrate 201 will now be discussed with reference to FIGS. 12-17, 24-31, and 34-35 and the flow chart in FIG. 11. In a first step 1101 of methods of the disclosure, methods can start with providing a foldable substrate 201 and/or 1205. In aspects, the foldable substrate 201 and/or 1205 may be provided by purchase or otherwise obtaining a substrate or by forming the foldable substrate. In aspects, the foldable substrate 201 and/or 1205 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The foldable substrate 201 may comprise a second major surface 205 (see FIG. 28) that can extend along a plane. The second major surface 205 can be opposite a first major surface 203. In aspects, as shown in FIGS. 12-13, in step 1101, the foldable substrate 1205 can comprise an existing second central surface area 1225 that is coplanar with a second surface area 1325 and/or a fourth surface area 1335, for example, the initial second major surface 1215 can comprise the existing second central surface area 1225, the second surface area 1325, and the fourth surface area 1335.

In aspects, in step 1101, the foldable substrate 201 can be provided with a first recess 211 in the first major surface 203 of the foldable substrate 201 that exposes a first central surface area 213 of the foldable substrate 201 in the central portion 281. In aspects, in step 1101, the foldable substrate 201 can be provided with a second recess 241 in the second major surface 205 of the foldable substrate 201 that exposes a second central surface area 243 of the foldable substrate 201 in the central portion 281. In further aspects, the first central surface area 213 and/or the second central surface area 243 can comprise a first transition region 212 or 322 and/or a second transition region 218 or 328. In further aspects, the recess(es) (e.g., first recess 211, second recess 241) may be formed by etching, laser ablation or mechanically working the first major surface 203. For example, mechanically working the foldable substrate 201 and/or 1205 may resemble step 1105 and FIG. 16, as discussed above. In aspects, in step 1101, the foldable substrate 201 can be provided with one or more initial compressive stress regions, for example, with one or more of the properties discussed below with reference to step 1003.

After step 1101, as shown in FIG. 12, methods can proceed to step 1103 comprising chemically strengthening the foldable substrate 201 and/or 1205. In aspects, as shown, chemically strengthening the foldable substrate 201 and/or 1205 can comprise contacting at least a portion of a foldable substrate 201 and/or 1205 comprising potassium cations and/or sodium cations in a salt bath 1201 comprising salt solution 1203. Chemically strengthening the foldable substrate 201 and/or 1205 can comprise contacting at least a portion of a foldable substrate 201 and/or 1205 comprising lithium cations and/or sodium cations with a salt bath 1201 comprising salt solution 1203 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the foldable substrate 201 and/or 1205 to the salt solution 1203 contained in the salt bath 1201. In aspects, the temperature of the salt solution 1203, a time that the foldable substrate 201 and/or 1205 is in contact with the salt solution 1203, and/or composition of the salt solution 1203 can be within one or more of the ranges or options discussed above with reference to step 1003 and FIG. 12.

In aspects, chemically strengthening the foldable substrate 201 and/or 1205 in step 1103 can comprise chemically strengthening the initial first major surface 1213 of the foldable substrate 1205 to form an initial first compressive stress region extending to an initial first depth of compression from the initial first major surface 1213. In aspects, chemically strengthening the foldable substrate 1205 in step 1103 can comprise chemically strengthening the initial second major surface 1215 to form an initial second compressive stress region extending to an initial second depth of compression from the initial second major surface 1215. The initial first compressive stress region and/or the initial second compressive stress region can extend across portions of the foldable substrate 1205 corresponding to the first portion, the second portion, and the central portion. For example, the first initial compressive stress region can extend from a first surface area 1323 and/or a third surface area 1333, and/or the second initial compressive stress region can extend from a second surface area 1325 and/or a fourth surface area 1335. In aspects, the initial first depth of compression and/or the initial second depth of compression, as a percentage of the substrate thickness 207 (see FIG. 12), can be about 5% or more, 10% or more, about 12% or more, about 14% or more, about 25% or less, about 20% or less, about 18% or less, or about 16% or less. In aspects, the initial first depth of compression and/or the initial second depth of compression, as a percentage of the substrate thickness 207 (see FIG. 12), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 12), can be about 5% or more, 10% or more, about 12% or more, about 14% or more, about 25% or less, about 20% or less, about 18% or less, or about 16% or less. In aspects, an initial first depth of layer of one or more alkali-metal ions associated with the initial first compressive stress region and/or an initial second depth of layer of one or more alkali-metal ions associated with the initial second compressive stress region, as a percentage of the substrate thickness 207 (see FIG. 12), can be in a range from about 5% to about 25%, from about 8% to about 25%, from about 8% to about 20%, from about 10% to about 20%, from about 10% to about 18%, from about 12% to about 18%, from about 12% to about 16%, from about 14% to about 16%, or any range or subrange therebetween. In aspects, before step 1103, the foldable substrate 201 and/or 1205 can be substantially unstrengthened (e.g., unstressed, not chemically strengthened, not thermally strengthened). As used herein, substantially unstrengthened refers to a substrate comprising either no depth of layer or a depth of layer in a range from 0% to about 5% of the substrate thickness.

After step 1101 or 1103, methods can proceed to step 1105 comprising forming the central portion comprising the first transition region, the second transition region, a first central surface area recessed from the first major surface, and a second central surface area recessed from the second major surface. In aspects, as shown in FIGS. 13-15, step 1105 can comprise etching the foldable substrate, for example, where a mask is deposited over the first portion and the second portion before contacting the central portion with an etchant. In further aspects, as shown in FIG. 13, step 1105 can comprise disposing a first liquid 1307 over one or more portions of the foldable substrate 1205, for example by dispensing the first liquid 1307 from a container 1301 (e.g., conduit, flexible tube, micropipette, or syringe). In even further aspects, as shown, the first liquid 1307 can be disposed over the first surface area 1323 as a first liquid deposit 1303 and over the third surface area 1333 as a second liquid deposit 1305. Although not shown, it is to be understood that similar liquid deposits can be formed over the second surface area and/or the fourth surface area. In further aspects, the liquid deposits (e.g., first liquid deposit 1303 and second liquid deposit 1305 shown in FIG. 13) can be cured to form masks (e.g., first mask 1405 and third mask 1409 shown in FIG. 14). Curing the first liquid can comprise heating the first liquid 1307, irradiating the first liquid 1307 with ultraviolet (UV) radiation, and/or waiting a predetermined amount of time (e.g., from about 30 minutes to 24 hours, from about 1 hour to about 8 hours). In aspects, another method, for example one of the methods discussed above with reference to step 1005, may be used to form the mask(s) (e.g., masks 1405, 1407, 1409, and 1411). As shown in FIG. 14, the result of disposing the mask (e.g., disposing a liquid and curing the liquid) can comprise a first mask 1405 disposed over the first surface area 1323, a second mask 1407 disposed over a second surface area 1325, a third mask 1409 disposed over a third surface area 1333, and/or a fourth mask 1411 disposed over a fourth surface area 1335. In aspects, a material of the mask can comprise titanium dioxide ($TiO_2$), zirconia ($ZrO_2$), tin oxide ($SnO_2$), alumina ($Al_2O_3$), silica ($SiO_2$), silicon nitride ($Si_3N_4$), and/or combinations thereof, although other materials for masks can be used in other aspects.

In aspects, as shown in FIG. 14, step 1105 can comprise etching the foldable substrate 1205. In aspects, as shown, etching can comprise exposing the foldable substrate 1205 to an etchant 1403. In further aspects, as shown, the etchant 1403 can be a liquid etchant contained in an etchant bath 1401. In even further aspects, the etching solution can comprise one or more mineral acids (e.g., HCl, HF, $H_2SO_4$, $HNO_3$). In aspects, as shown, etching can comprise etching the central portion 281 of the initial first major surface 1213 to form a first central surface area 213. In further aspects, as shown, the etching can form the first recess 1441 between the first plane 1404*a* and the first central surface area 213. In aspects, as shown, etching can comprise etching the central portion 281 of the initial second major surface 1215 to form a second central surface area 243. In further aspects, as shown, the etching can form the second recess 1447 between the second plane 1406*a* and the second central surface area 243. In aspects, as shown in FIG. 15, step 1105 can further comprise removing the mask(s). In aspects, as shown, removing the mask(s) (e.g., masks 1405, 1407, 1409, and 1411) can comprise moving a grinding tool 1501 in a direction 1503 across the surface (e.g., third surface area 1333). In even further aspects, using the tool may comprise sweeping, scraping, grinding, pushing, etc. In further aspects, the mask(s) (e.g., masks 1405, 1407, 1409, and 1411) can be removed by washing the surface (e.g., first surface area 1323, second surface area 1325, third surface area 1333, fourth surface area 1335) with a solvent. In aspects, removing the mask(s) can comprise removing the masks 1405, 1407, 1409, and 1411 from the first surface area 1323, the second surface area 1325, the third surface area 1333, and the fourth surface area 1335, respectively.

In aspects, as shown in FIG. 16, step 1105 can further comprise forming the first transition region 212 and/or the second transition region 218. In further aspects, the foldable substrate 201 or 1205 can be mechanically worked to form the first transition region 212 and/or the second transition region 218. In even further aspects, diamond engraving can be used, for example, a diamond-tip probe 1603 can be controlled using a computer numerical control (CNC) machine 1601. Materials other than diamond can be used for engraving with a CNC machine. For example, as shown in FIG. 16, the diamond-tip probe 1603 is shown forming an intermediate transition surface 1613 as material is removed from the foldable substrate 201 or 1205, and the intermediate transition surface 1613 can be further developed into the third transition surface area 217 (see FIG. 2). In aspects, although not shown, a similar process may be used to form the fourth transition surface area, the first transition surface area, and/or the second transition surface area. It is to be understood that other methods of forming the recess(es) can be used, for example, lithography and laser ablation.

In aspects, as shown in FIG. 16, step 1105 can comprise forming the central portion 281 by mechanically working the foldable substrate 201 or 1205, for example, instead of etching the foldable substrate 1205. In further aspects, diamond engraving can be used, for example, a diamond-tip probe 1603 can be controlled using a computer numerical control (CNC) machine 1601. Materials other than diamond can be used for engraving with a CNC machine. For example, as shown in FIG. 16, the diamond-tip probe 1603 is shown forming an intermediate transition surface 1613 as material is removed from the foldable substrate 201 or 1205, and the intermediate transition surface 1613 can be further developed into the third transition surface area 217 (see FIG. 2). In even further aspects, the first central surface area 213 and/or the second central surface area 243 can be formed as a result of step 1105. In aspects, although not shown, a similar process may be used to form the fourth transition surface area, the first transition surface area, and/or the second transition surface area.

Alternatively, as shown in FIGS. 34-35, step 1105 can comprise disposing an etch mask and then etching the foldable substrate 1205. In further aspects, step 1105 can be substantially the same as step 1005 described above.

As a result of forming the first central surface area 213 in step 1105, the first central surface area 213 can be recessed from the first plane 204*a* (e.g., first surface area 223, third surface area 233) (see FIGS. 2-4 and 16) or the first plane 1404*a* (e.g., first surface area 1323, third surface area 1333) (see FIG. 14) by a first distance, which can be within one or more of the ranges discussed above for the first distance 219 shown in FIGS. 2-3). As a result of forming the second central surface area 243 in step 1105, the second central surface area 243 can be recessed from the second plane 206*a* (e.g., second surface area 225, fourth surface area 235) (see FIGS. 2-3 and 16) or the second plane 1406*a* (e.g., second surface area 1325, fourth surface area 1335) (see FIG. 14) by a second distance, which can be within one or more of the ranges discussed above for the second distance 249 shown in FIGS. 2-3). In aspects, the first distance can be substantially equal to the second distance. In aspects, the first distance can be greater than the second distance.

Figure 24:
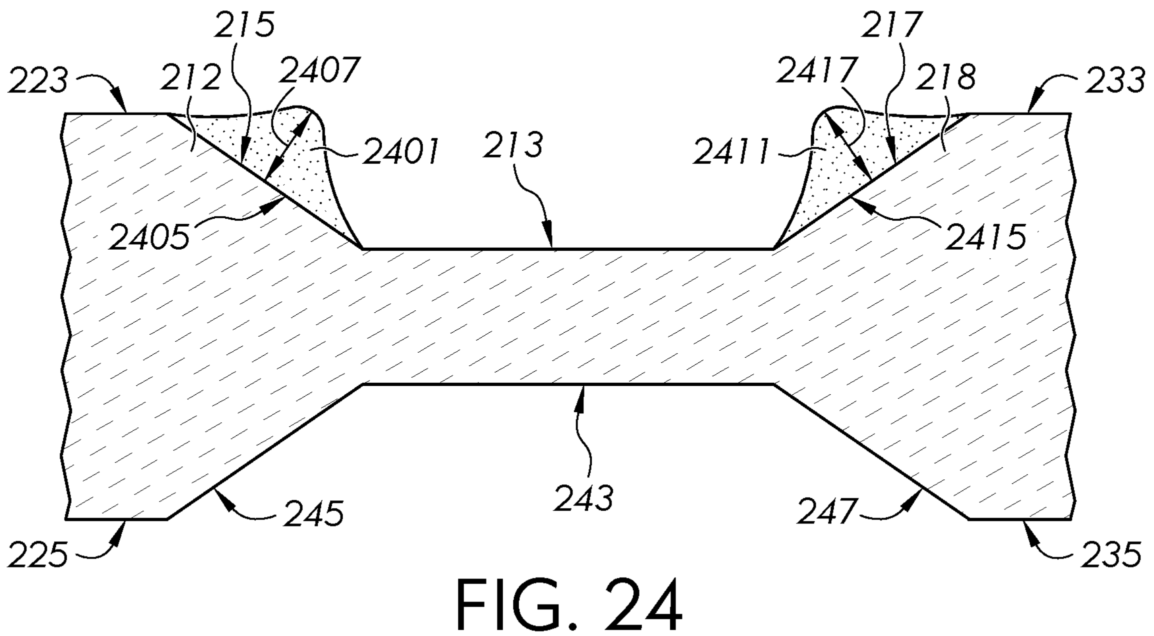
Figure 25:
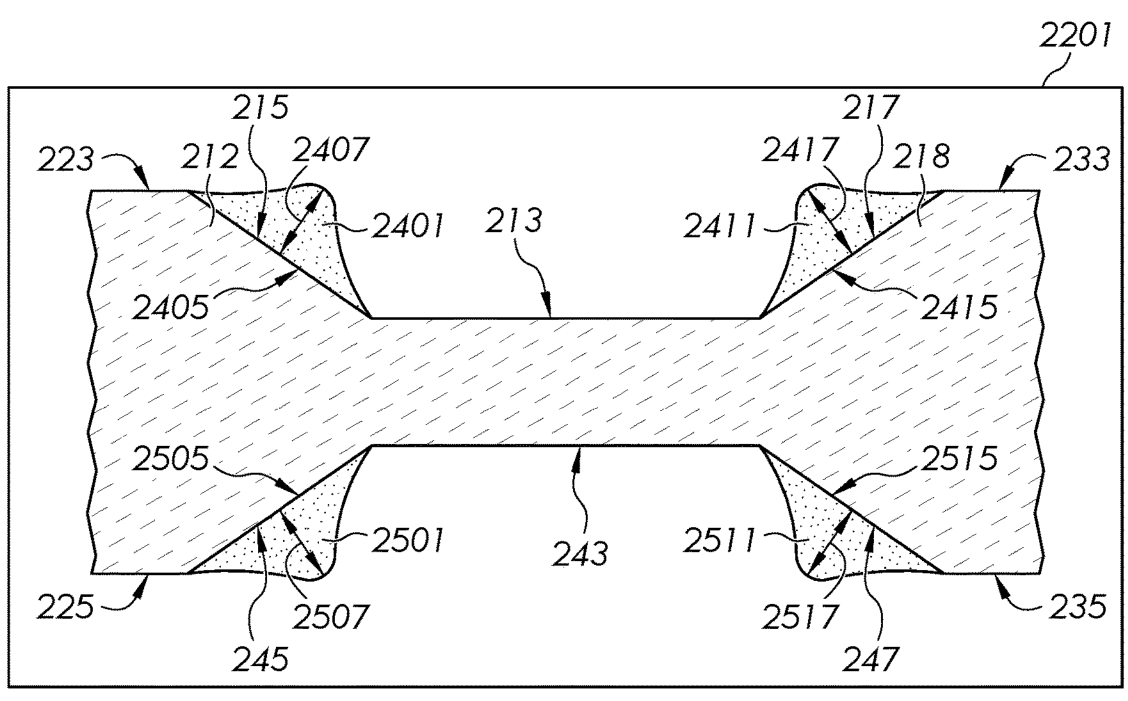

After step 1101 or 1105, as shown in FIGS. 24-25, methods can proceed to step 1107 comprise applying a paste comprising alkali-metal ions to the first transition region 212 and/or the second transition region 218. In aspects, as shown, step 1107 can comprise disposing a first alkali-metal ion-containing paste 2401 on the first transition surface area 215 and a third alkali-metal ion-containing paste 2411 on the third transition surface area 217. In further aspects, as shown in FIG. 25, a second alkali-metal ion-containing paste 2501 can be applied to the second transition surface area 245, and a fourth alkali-metal ion-containing paste 2511 can be applied to the fourth transition surface area 247. In aspects, alkali-metal ion-containing pastes can be dispensed from a container (e.g., flexible tube, micropipette, or syringe).

As used herein, the alkali-metal ion-containing paste contains potassium and/or sodium. In aspects, the alkali-metal ion-containing paste 2401, 2411, 2501, and/or 2511 can comprise one or more of one or more of potassium nitrate, potassium phosphate, potassium chloride, potassium sulfate, sodium chloride, sodium sulfate, sodium nitrate, and/or sodium phosphate. In further aspects, the alkali-metal ion-containing paste can comprise potassium nitrate and potassium phosphate. In further aspects, the alkali-metal ion-containing paste can be substantially free from alkali earth metals (e.g., alkali earth metal ions, alkali earth metal-containing compounds). As used herein, alkali earth metals include beryllium, magnesium, calcium, strontium, barium, and radium. In further aspects, the alkali-metal ion-containing paste can contain a concentration of potassium and/or sodium on an oxide basis of about 1,000 ppm or more, about 5,000 ppm or more, about 10,000 ppm or more, about 25,000 ppm or more, about 500,000 ppm or less, about 200,000 ppm or less, about 100,000 ppm or less, or about 50,000 ppm or less. In further aspects, the alkali-metal ion-containing paste can contain a concentration of potassium and/or sodium on an oxide basis in a range from about 1,000 ppm to about 500,000 ppm, from about 5,000 ppm to about 500,000, from about 5,000 ppm to about 200,000 ppm, from about 10,000 ppm to about 200,000 ppm, from about 10,000 ppm to about 100,000, from about 25,000 ppm to about 100,000 ppm, from about 25,000 ppm to about 50,000 ppm, or any range or subrange therebetween. In further aspects, a concentration of potassium in the alkali-metal ion-containing paste can be greater than an existing average concentration of potassium in the first transition region, the second transition region, and/or the central portion.

In aspects, the alkali-metal ion-containing paste 2401, 2411, 2501, and/or 2511 can comprise an organic binder or a solvent. The organic binder can comprise one or more of cellulose, a cellulose derivative, a hydrophobically modified ethylene oxide urethane modifier (HUER), and an ethylene acrylic acid. Examples of a cellulose derivate comprise ethyl cellulose, methyl cellulose, and AQUAZOL (poly 2 ethyl-2 oxazine). The solvent can comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene). In aspects, the alkali-metal ion-containing paste 2401, 2411, 2501, and/or 2511 can be heated to remove the solvent and/or the organic binder. In further aspects, the solvent and/or organic binder can be removed by drying the alkali-metal ion-containing paste 2401, 2411, 2501, and/or 2511 at room temperature (e.g., from about 20° C. to about 30° C.) for eight hours or more. In further aspects, the solvent and/or organic binder can be removed by drying the alkali-metal ion-containing paste 2401, 2411, 2501, and/or 2511 at a temperature in a range from about 100° C. to about 140° C. or from about 100° C. to about 120° C. for a time period in a range from about 8 minutes to about 30 minutes, or from about 8 minutes to about 20 minutes, or from about 8 minutes to about 15 minutes.

Figure 26:
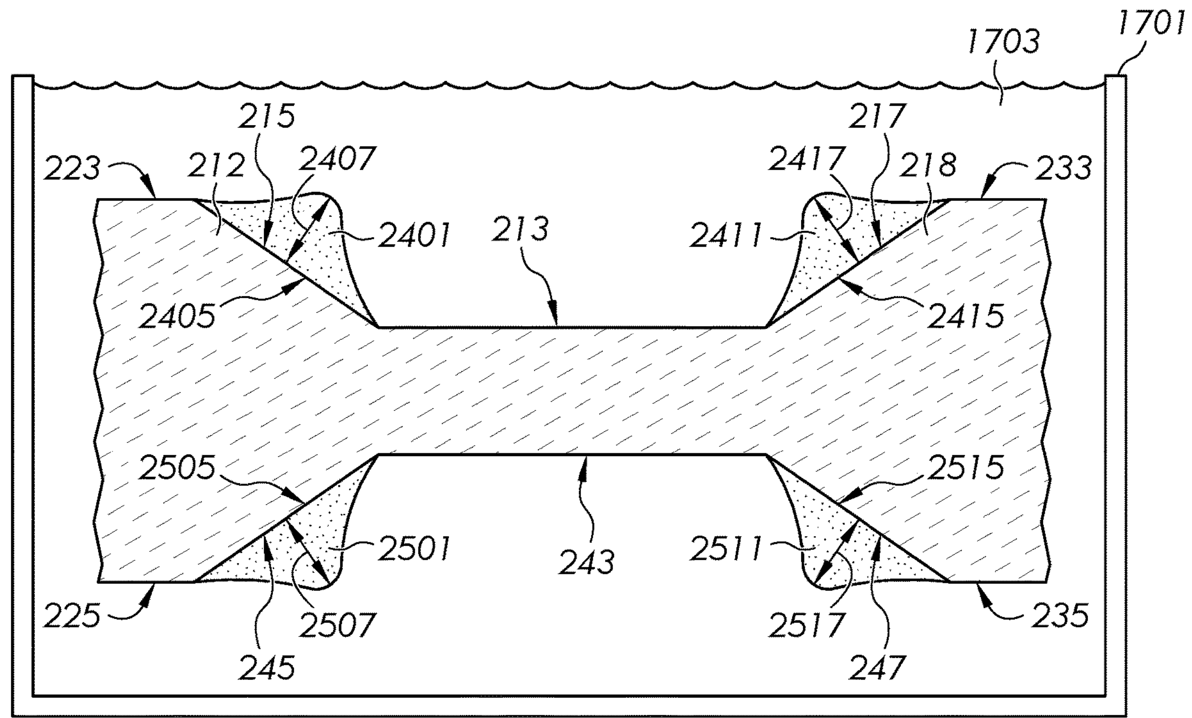

In aspects, as shown in FIGS. 24-26, the first alkali-metal ion-containing paste 2401 can contact the first transition region 212, for example, a first contact surface 2405 of the first alkali-metal ion-containing paste 2401 can contact the first transition surface area 215 of the first transition region 212. In aspects, as shown in FIGS. 24-25, the third alkali-metal ion-containing paste 2411 can contact the third transition surface area 217, for example, a third contact surface 2415 of the third alkali-metal ion-containing paste 2411 can contact the third transition surface area 217 of the second transition region 218. In aspects, as shown in FIG. 25, the second alkali-metal ion-containing paste 2501 can contact the first transition region 212, for example, a second contact surface 2505 of the second alkali-metal ion-containing paste 2501 can contact the second transition surface area 245 of the first transition region 212. In aspects, as shown in FIG. 25, the fourth alkali-metal ion-containing paste 2511 can contact the fourth transition surface area 247, for example, a fourth contact surface 2515 of the fourth alkali-metal ion-containing paste 2511 can contact the fourth transition surface area 247 of the second transition region 218.

In aspects, as shown in FIGS. 24-25, the first alkali-metal ion-containing paste 2401 can comprise a maximum first paste thickness 2407 measured perpendicular to the first transition surface area 215. In further aspects, as shown, the maximum first paste thickness 2407 can occur at a midline of the first transition region 212. In further aspects, a thickness of the first alkali-metal ion-containing paste 2401 can decrease from the maximum first paste thickness 2407 to zero going towards the first surface area 223. In further aspects, a thickness of the first alkali-metal ion-containing paste 2401 can decrease from the maximum first paste thickness 2407 to zero going towards the first central surface area 213. In aspects, as shown in FIGS. 24-25, the third alkali-metal ion-containing paste 2411 can comprise a maximum third paste thickness 2417 measured perpendicular to the third transition surface area 217. In further aspects, as shown, the maximum third paste thickness 2417 can occur at a midline of the second transition region 218. In further aspects, a thickness of the third alkali-metal ion-containing paste 2411 can decrease from the maximum third paste thickness 2417 to zero going towards the third surface area 233. In further aspects, a thickness of the third alkali-metal ion-containing paste 2411 can decrease from the maximum third paste thickness 2417 to zero going towards the first central surface area 213.

In aspects, as shown in FIG. 25, the second alkali-metal ion-containing paste 2501 can comprise a maximum second paste thickness 2507 measured perpendicular to the second transition surface area 245. In further aspects, as shown, the maximum second paste thickness 2507 can occur at a midline of the first transition region 212. In further aspects, a thickness of the second alkali-metal ion-containing paste 2501 can decrease from the maximum second paste thickness 2507 to zero going towards the second surface area 225. In further aspects, a thickness of the second alkali-metal ion-containing paste 2501 can decrease from the maximum second paste thickness 2507 to zero going towards the second central surface area 243. In aspects, as shown in FIG. 25, the fourth alkali-metal ion-containing paste 2511 can comprise a maximum fourth paste thickness 2517 measured perpendicular to the fourth transition surface area 247. In further aspects, as shown, the maximum fourth paste thickness 2517 can occur at a midline of the second transition region 218. In further aspects, a thickness of the fourth alkali-metal ion-containing paste 2511 can decrease from the maximum fourth paste thickness 2517 to zero going towards the fourth surface area 235. In further aspects, a thickness of the fourth alkali-metal ion-containing paste 2511 can decrease from the maximum fourth paste thickness 2517 to zero going towards the second central surface area 243. Tapering a thickness of the alkali-metal ion-containing paste over the first transition region and/or the second transition region away from a midline of the corresponding transition region can further provide the relationship between chemical strengthening induced expansion strain of the different portions of the foldable substrate discussed above.

In aspects, the maximum first paste thickness 2407 of the first alkali-metal ion-containing paste 2401, and/or the maximum second paste thickness 2507 of the second alkali-metal ion-containing paste 2501, the maximum third paste thickness 2417 of the third alkali-metal ion-containing paste 2411, the maximum fourth paste thickness 2517 of the fourth alkali-metal ion-containing paste 2511 can be about 1 nm or more, about 10 nm or more, about 100 nm or more, about 500 nm or more, about 1 μm or more, about 100 μm or less, about 50 μm or less, about 20 μm or less, or about 10 μm or less. In even further aspects, the maximum first paste thickness 2407 of the first alkali-metal ion-containing paste 2401, and/or the maximum second paste thickness 2507 of the second alkali-metal ion-containing paste 2501, the maximum third paste thickness 2417 of the third alkali-metal ion-containing paste 2411, the maximum fourth paste thickness 2517 of the fourth alkali-metal ion-containing paste 2511 can be in a range from about 1 nm to about 50 μm, from about 10 nm to about 50 μm, from about 10 nm to about 20 μm, from about 100 nm to about 20 μm, from about 100 nm to about 10 μm, from about 500 nm to about 10 μm, from about 1 μm to about 10 μm, or any range or subrange therebetween.

In aspects, the first alkali-metal ion-containing paste 2401 can comprise a concentration of the one or more alkali metal ions that varies along the first transition surface area 215 and/or the first contact surface 2405. In further aspects, the first alkali-metal ion-containing paste 2401 can comprise a maximum first paste concentration at a midline of the first transition region 212. In even further aspects, the concentration of the one or more alkali metal ions can decrease from the maximum first paste concentration at the midline of the first transition region 212 towards the first surface area 223. In even further aspects, the concentration of the one or more alkali metal ions can decrease from the maximum first paste concentration at the midline of the first transition region 212 towards the first central surface area 213. In even further aspects, a profile of the concentration of the one or more alkali metal ions of the first alkali-metal ion-containing paste can be generated by disposing a plurality of alkali-metal ion-containing pastes, for example, with decreasing concentrations further from the midline of the first transition surface area 215. In still further aspects, a number of alkali-metal ion-containing pastes in the plurality of alkali-metal ion-containing pastes in the first alkali-metal ion-containing paste can be 5 or more, 6 or more, 10 or more, for example, in a range from about 5 to 100, from about 6 to 50, from about 10 to 30, or any range or subrange therebetween.

In aspects, the second alkali-metal ion-containing paste 2501 can comprise a concentration of the one or more alkali metal ions that varies along the second transition surface area 245 and/or the second contact surface 2505. In further aspects, the second alkali-metal ion-containing paste 2501 can comprise a maximum second paste concentration at a midline of the first transition region 212. In even further aspects, the concentration of the one or more alkali metal ions can decrease from the maximum second paste concentration at the midline of the first transition region 212 towards the second surface area 225. In even further aspects, the concentration of the one or more alkali metal ions can decrease from the maximum second paste concentration at the midline of the first transition region 212 towards the second central surface area 243. In even further aspects, a profile of the concentration of the one or more alkali metal ions of the second alkali-metal ion-containing paste can be generated by disposing a plurality of alkali-metal ion-containing pastes, for example, with decreasing concentrations further from the midline of the second transition surface area 245. In still further aspects, a number of alkali-metal ion-containing pastes in the plurality of alkali-metal ion-containing pastes in the second alkali-metal ion-containing paste can be 5 or more, 6 or more, 10 or more, for example, in a range from about 5 to 100, from about 6 to 50, from about 10 to 30, or any range or subrange therebetween.

In aspects, the third alkali-metal ion-containing paste 2411 can comprise a concentration of the one or more alkali metal ions that varies along the third transition surface area 217 and/or the third contact surface 2415. In further aspects, the third alkali-metal ion-containing paste 2411 can comprise a maximum third paste concentration at a midline of the second transition region 218. In even further aspects, the concentration of the one or more alkali metal ions can decrease from the maximum third paste concentration at the midline of the second transition region 218 towards the third surface area 233. In even further aspects, the concentration of the one or more alkali metal ions can decrease from the maximum third paste concentration at the midline of the second transition region 218 towards the first central surface area 213. In even further aspects, a profile of the concentration of the one or more alkali metal ions of the third alkali-metal ion-containing paste can be generated by disposing a plurality of alkali-metal ion-containing pastes, for example, with decreasing concentrations further from the midline of the third transition surface area 217. In still further aspects, a number of alkali-metal ion-containing pastes in the plurality of alkali-metal ion-containing pastes in the third alkali-metal ion-containing paste can be 5 or more, 6 or more, 10 or more, for example, in a range from about 5 to 100, from about 6 to 50, from about 10 to 30, or any range or subrange therebetween.

In aspects, the fourth alkali-metal ion-containing paste 2511 can comprise a concentration of the one or more alkali metal ions that varies along the fourth transition surface area 247 and/or the fourth contact surface 2515. In further aspects, the fourth alkali-metal ion-containing paste 2511 can comprise a maximum fourth paste concentration at a midline of the second transition region 218. In even further aspects, the concentration of the one or more alkali metal ions can decrease from the maximum fourth paste concentration at the midline of the second transition region 218 towards the fourth surface area 235. In even further aspects, the concentration of the one or more alkali metal ions can decrease from the maximum fourth paste concentration at the midline of the second transition region 218 towards the second central surface area 243. In even further aspects, a profile of the concentration of the one or more alkali metal ions of the fourth alkali-metal ion-containing paste can be generated by disposing a plurality of alkali-metal ion-containing pastes, for example, with decreasing concentrations further from the midline of the fourth transition surface area 247. In still further aspects, a number of alkali-metal ion-containing pastes in the plurality of alkali-metal ion-containing pastes in the fourth alkali-metal ion-containing paste can be 5 or more, 6 or more, 10 or more, for example, in a range from about 5 to 100, from about 6 to 50, from about 10 to 30, or any range or subrange therebetween.

In aspects, the maximum first paste concentration can be substantially equal to the maximum second paste concentration, the maximum third paste concentration, and/or fourth maximum paste concentration. In aspects, the maximum first paste concentration, maximum second paste concentration, the maximum third paste concentration, and/or fourth maximum paste concentration can be a concentration of potassium on an oxide basis. Providing a concentration profile discussed in this paragraph can enable provide the relationship between chemical strengthening induced expansion strain of the different portions of the foldable substrate discussed above.

After step 1107, as shown in FIG. 25, methods of the disclosure can proceed to step 1109 comprising heating the foldable substrate 201. In aspects, as shown, the foldable substrate 201 can be placed in an oven 2201. In further aspects, as shown, the foldable substrate 201 can comprise alkali-metal ion-containing paste 2401, 2411, 2501, and/or 2511 disposed thereon. In aspects, the foldable substrate 201 can be heated at a temperature of about 300° C. or more, about 360° C. or more, about 400° C. or more, about 500° C. or less, about 460° C. or less, or about 400° C. or less. In aspects, foldable substrate 201 can be heated at a temperature in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 300° C. to about 400° C., from about 360° C. to about 400° C., or any range or subrange therebetween. In aspects, the foldable substrate 201 can be heated for about 15 minutes or more, about 1 hour or more, about 3 hours or more, about 48 hours or less, about 24 hours or less, or about 8 hours or less. In aspects, the foldable substrate 201 can be heated for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween. Step 1007 can increase a chemical strengthening induced expansion strain of the first transition region 212 and/or the second transition region 218 such that the chemical strengthening induced expansion strain at the first central surface area 213 and/or the second central surface area 243 is less than a corresponding chemical strengthening induced expansion strain of the first transition region and/or the second transition region.

Figure 27:
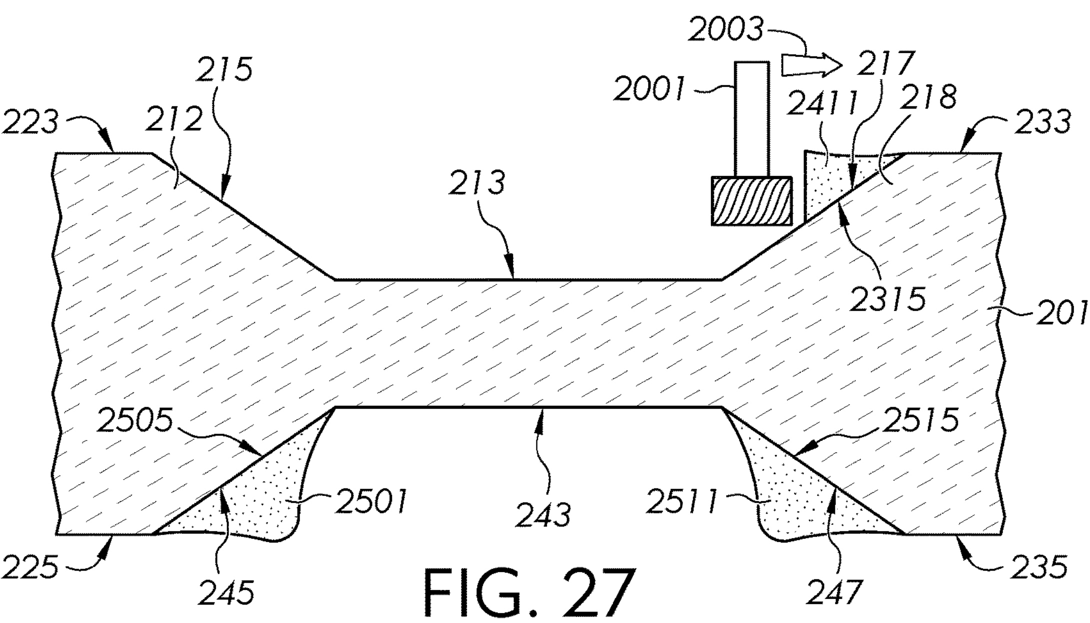

After step 1109, as shown in FIG. 27, methods of the disclosure can proceed to step 1111 comprising removing the alkali-metal ion-containing paste. In aspects, as shown, removing the alkali-metal ion-containing paste can comprise moving a grinding tool 2001 in a direction 2003 across the surface (e.g., third transition surface area 217). In even further aspects, using the tool may comprise sweeping, scraping, grinding, pushing, etc. In further aspects, the paste (e.g., alkali-metal ion-containing paste 2401, 2411, 2501, and/or 2511) can be removed by washing the surface (e.g., first transition surface area 215, second transition surface area 245, third transition surface area 217, fourth transition surface area 247) with a solvent.

After step 1107 or 1111, as shown in FIGS. 17 and 26, methods can proceed to step 1113 comprising chemically strengthening the foldable substrate 201 by contacting the foldable substrate 201 with potassium cations and/or sodium cations. In aspects, as shown, the foldable substrate 201 can be immersed in a salt bath 1701 containing a salt solution 1703 comprising potassium cations and/or sodium cations. In further aspects, a composition of the salt solution 1703 can comprise one or more components discussed with reference to salt solution 1203 and/or can be the same as the salt solution 1203 in step 1003. In further aspects, a temperature of the salt solution 1703 can be within one or more of the ranges discussed above for the temperature of the salt solution 1203 in step 1003. In further aspects, the foldable substrate 201 can be in contact with the salt solution 1703 for about 1 minute or more, 5 minutes or more, about 15 minutes or more, about 30 minutes or more, about 8 hours or less, about 2 hours or less, or about 1 hour or less. In aspects, the foldable substrate 201 can be in contact with the salt solution 1703 for a time in a range from about 1 minute to about 8 hours, from about 1 minute to about 2 hours, from about 5 minutes to about 2 hours, from about 5 minutes to about 1 hour, from about 30 minutes to about 1 hour, or any range or subrange therebetween.

In aspects, a first time that the salt solution 1703 contacts the foldable substrate 201 in step 1113 can be less than an initial period of time that the salt solution 1203 contacts the foldable substrate 1205 in step 1103. In further aspects, a ratio of the initial period time divided by the first period of time can be greater than or equal to a ratio of the central thickness divided by the substrate thickness. In even further aspects, a ratio of the initial period time divided by the first period of time can be greater than or equal to a ratio of a square of the central thickness divided by a square of the substrate thickness.

In aspects, as shown in FIGS. 17 and 26, the salt solution 1703 can contact the first surface area 223, the second surface area 225, the third surface area 233, and the fourth surface area 235. In further aspects, as shown, the salt solution 1703 can further contact the first central surface area 213 and the second central surface area 243. In even further aspects, as shown in FIG. 17, the salt solution 1703 can contact the first transition surface area 215, the second transition surface area 245, the third transition surface area 217, and/or the fourth transition surface area 247. In even further aspects, as shown in FIG. 26, alkali-metal ion-containing paste (e.g., alkali-metal ion-containing paste 2401, 2411, 2501, and/or 2511) can separate the first transition surface area 215, the second transition surface area 245, the third transition surface area 217, and/or the fourth transition surface area 247 from the salt solution 1703. Covering the transition regions can enable control of the resulting chemical strengthening induced expansion strain of the transition regions independent of the first portion and/or second portion.

Providing the alkali-metal ion-containing paste (e.g., alkali-metal ion-containing paste 2401, 2411, 2501, and/or 2511) in one or more of steps 1107, 1109, 1111, and 1113 can decrease an incidence of mechanical instabilities, for example, by increasing a chemical strengthening induced expansion strain of the first transition region 212 and/or the second transition region 218 relative to the first central surface area 213 and/or the second central surface area 243. For example, the foldable substrate resulting from methods using alkali-metal ion-containing paste (e.g., alkali-metal ion-containing paste 2401, 2411, 2501, and/or 2511) can resemble curve 3213 shown in squares in FIG. 32, where portions corresponding to lower thickness (e.g., central portion) can be chemically strengthened to an extent but adjacent portions and/or regions comprising a greater thickness (e.g., first portion, second portion, first transition region, second transition region) comprise greater chemical strengthening induced expansion strain (e.g., curve 3213 is above line 3215 for thicknesses greater than 30 μm) than the portions corresponding to lower thickness.

Figure 28:
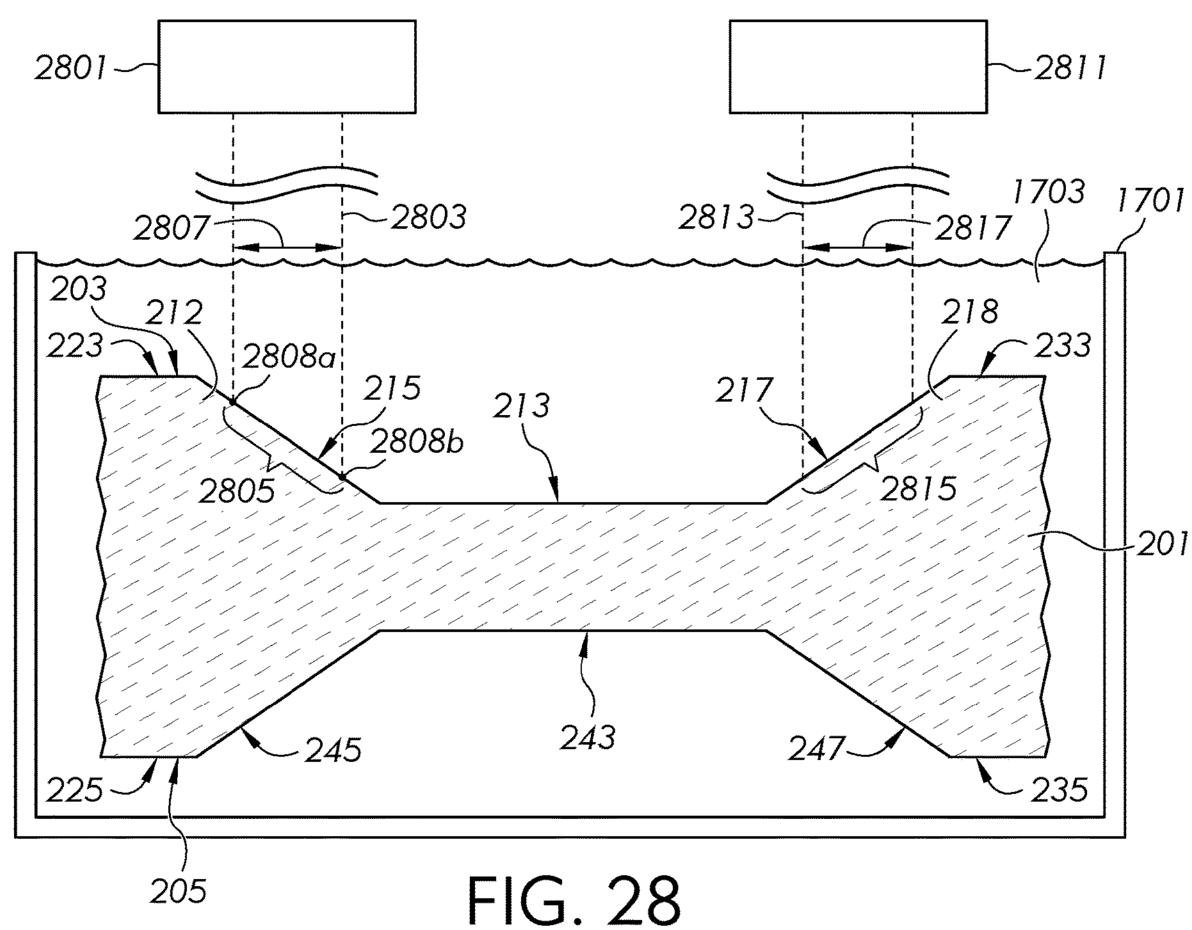

After step 1101 or 1105, as shown in FIG. 28, methods can proceed to step 1119 comprising locally heating the first transition region 212 and/or the second transition region 218 while chemically strengthening the foldable substrate 201. In aspects, as shown, locally heating the first transition region 212 can comprise locally heating the first transition surface area 215 by impinging a first laser beam 2803 on a portion 2805 the first transition surface area 215 of the first transition region 212. In aspects, as shown, locally heating the second transition region 218 can comprise locally heating the third transition surface area 217 by impinging a second laser beam 2813 on a portion 2815 the third transition surface area 217 of the second transition region 218. In further aspects, as shown, the first laser beam 2803 can be emitted from a first laser 2801, and/or the second laser beam 2813 can be emitted from a second laser 2811. In even further aspects, the first laser beam 2803 can be scanned over a portion of the first transition region 212 (e.g., first transition surface area 215) to be heated and/or comprise a plurality of first laser beams spaced along the first transition surface area 215. In even further aspects, although not shown, an additional first laser beam can locally heat the first transition region by impinging the second transition surface area and/or an additional second laser beam can locally heat the second transition region by impinging the fourth transition surface area.

In further aspects, the first laser beam 2803 and/or the second laser beam 2813 can comprise a wavelength of about 1.5 micrometers (μm) or more, about 2.5 μm or more, about 3.5 μm or more, about 5 μm or more, about 9 μm or more, about 9.4 μm or more, about 20 μm or less, about 15 μm or less, about 12 μm or less, about 11 μm or less, or about 10.6 nm or less. In further aspects, the first laser beam 2803 and/or the second laser beam 2813 the laser beam can comprise a wavelength in a range from about 1.5 μm to about 20 μm, from about 1.5 μm to about 15 μm, from about 1.5 μm to about 12 μm, from about 1.5 μm to about 11 μm, from about 2.5 μm to about 20 μm, from about 2.5 μm to about 15 μm, from about 2.5 nm to about 12 μm, from about 3.6 μm to about 20 μm, from about 3.6 μm to about 15 μm, from about 3.6 μm to about 12 μm, from about 5 μm to about 20 μm, from about 5 μm to about 15 μm, from about 5 μm to about 12 μm, from about 5 μm to about 11 μm, from about 9 μm to about 20 μm, from about 9 μm to about 15 μm, from about 9 μm to about 12 μm, from about 9 μm to about 11 μm, from about 9 μm to about 1.6 μm, from about 9.4 μm to about 15 μm, from about 9.4 μm to about 12 μm, from about 9.4 μm to about 11 μm, from about 9.4 μm to about 10.6 μm, or any range or subrange therebetween. Exemplary aspects of lasers capable of producing a laser beam with a wavelength within the aforementioned ranges include a carbon dioxide ($CO_2$) laser and a nitrous oxide ($N_2O$) laser.

Throughout the disclosure, a width of a laser beam impinging on a portion of the foldable substrate is defined as the distance in a direction across a propagation direction of the laser beam measured between a first point on the surface area impinged by the laser beam and a second point on the corresponding surface area impinged by the laser beam with an intensity of about 13.5% (i.e., $1/e^2$) of a maximum intensity of the laser beam impinging the corresponding surface area, where the first point and the second point are as far apart as possible in the direction across the propagation direction of the laser. For example, with reference to FIG. 28, a width 2807 of the first laser beam 2803 is measured in a direction perpendicular to a propagation direction of the first laser beam 2803 (e.g., the left-right direction is perpendicular to the vertical propagation direction shown in FIG. 28) as a distance between a first point **2808*a* on the first transition surface area 215 and a second point 2808*b* on the first transition surface area 215 that comprise an intensity of about 13.5% of a maximum intensity of the first laser beam 2803 impinging the first transition surface area 215, where the first point 2808*a* and the second point 2808*b* are as far apart as possible in the direction perpendicular to the propagation direction of the first laser beam 2803. In aspects, the width 2807 of the first laser beam 2803 and/or a width 2817 of the second laser beam 2813, as a percentage of the width of the first transition region 212 and/or the width the of second transition region 218, respectively, can be about 30% or more, about 50% or more, about 66% or more, about 100% or less, about 90% or less, about 80% or less, or about 75% or less. In aspects, the width 2807 of the first laser beam 2803 and/or a width 2817 of the second laser beam 2813, as a percentage of the width of the first transition region 212 and/or the width of the second transition region 218, respectively, can be in a range from about 30% to about 100%, from about 30% to about 90%, from about 50% to about 90%, from about 50% to about 80%, from about 66% to about 80%, from about 66% to about 75%, or any range or subrange therebetween. In aspects, the width 2807 of the first laser beam 2803 and/or a width 2817 of the second laser beam 2813 can be about 0.2 mm or more, about 0.3 mm or more, about 0.4 mm or more, about 0.5 mm or more, about 2 mm or less, about 1.5 mm or less, about 1 mm or less, or about 0.8 mm or less. In aspects, the width 2807 of the first laser beam 2803 and/or a width 2817 of the second laser beam 2813** can be in a range from about 0.2 mm to about 2 mm, from about 0.2 mm to about 1.5 mm, from about 0.3 mm to about 1.5 mm, from about 0.3 mm to about 1 mm, from about 0.4 mm to about 1 mm, from about 0.4 mm to about 0.8 mm, from about 0.5 mm to about 0.8 mm, or any range or subrange therebetween.

In aspects, the local heating in step 1119 can be the greatest at a midline of the first transition region 212 and/or at a midline of the second transition region 218. In further aspects, an extent of the local heating of the first transition region 212 (e.g., first transition surface area 215) can decrease from the midline towards the first portion (e.g., first surface area 223) and/or towards the first central surface area 213. In further aspects, an extent of the local heating of the second transition region 218 (e.g., third transition surface area 217) can decrease from the midline towards the second portion (e.g., third surface area 233) and/or towards the first central surface area 213. In further aspects, the first laser beam and/or the second laser beam can comprise a beam shape of an intensity along the width of the corresponding laser beam comprising a gaussian shape, although top-hat shapes are possible in further aspects. Locally heating a transition region can increase a diffusivity of one or more alkali metal ions locally, which can reduce an incidence of mechanical instabilities.

Locally heating the first transition region 212 and/or the second transition region 218 in step 1119 can decrease an incidence of mechanical instabilities, for example, by increasing a chemical strengthening induced expansion strain of the first transition region 212 and/or the second transition region 218 relative to the first central surface area 213 and/or the second central surface area 243. For example, the foldable substrate resulting from methods locally heating the first transition region 212 and/or the second transition region 218 can resemble curve 3213 shown in squares in FIG. 32, where portions corresponding to lower thickness (e.g., central portion) can be chemically strengthened to an extent but adjacent portions and/or regions comprising a greater thickness (e.g., first portion, second portion, first transition region, second transition region) comprise greater chemical strengthening induced expansion strain (e.g., curve 3213 is above line 3215 for thicknesses greater than 30 μm) than the portions corresponding to lower thickness.

In aspects, as shown in FIG. 28, the foldable substrate can be chemically strengthened by contacting the foldable substrate 201 with potassium cations and/or sodium cations, for example, by immersing the foldable substrate 201 in a salt bath 1701 containing a salt solution 1703 comprising potassium cations and/or sodium cations. In further aspects, a composition of the salt solution 1703 can comprise one or more components discussed with reference to salt solution 1203 and/or can be the same as the salt solution 1203 in step 1003. In further aspects, a temperature of the salt solution 1703 can be within one or more of the ranges discussed above for the temperature of the salt solution 1203 in step 1003. In further aspects, a second period of time that the foldable substrate 201 is in contact with the salt solution 1703 for can be within one or more of the ranges discussed above in discussing step 1113. In aspects, a third period of time that first transition region 212 and/or the second transition region 218 is locally heated can be less than, greater than, or equal to the second period of time that the foldable substrate is chemically strengthened, for example, in contact with the salt solution. Without wishing to be bound by theory, a diffusivity of an alkali metal ion increases as temperature increases. Consequently, increasing a local temperature at a location can increase an extent of chemical strengthening because of the increase in diffusivity of the one or more alkali metal ions.

After step 1113 or 1119, as shown in FIGS. 27, and 29-31, methods can proceed to step 1115 comprising further processing the foldable substrate and/or assembling the foldable apparatus. In aspects, as shown in FIGS. 27, step 1115 can comprise removing the alkali-metal ion-containing paste (e.g., alkali-metal ion-containing paste 2401, 2411, 2501, and/or 2511), for example, by moving a grinding tool 2001 in a direction 2003 across the surface (e.g., third transition surface area 217), if the alkali-metal ion-containing paste was applied in step 1107 but not removed before step 1115.

In aspects, as shown in FIGS. 29-31, step 1115 can comprise assembling the foldable apparatus by disposing a polymer-based portion (e.g., first polymer-based portion 289, second polymer-based portion 299), an adhesive layer 261, and/or a coating 251 over the foldable substrate 201. In further aspects, as shown in FIG. 29, a first polymer-based portion 289 in the first recess 211 and/or over the first central surface area 213. In further aspects, as shown in FIGS. 29-30, a coating 251 can be disposed over the first major surface 203 (e.g., first surface area 223 and third surface area 233), for example, by dispensing a second liquid 2903 from a container 2901 (e.g., conduit, flexible tube, micropipette, or syringe) over the first major surface 203 that can be cured to form the coating 251. In even further aspects, the second liquid 2903 may comprise a coating precursor, a solvent, particles, nanoparticles, and/or fibers. In still further aspects, the coating precursor can comprise, without limitation, one or more of a monomer, an accelerator, a curing agent, an epoxy, and/or an acrylate. Curing the second liquid 2903 can comprise heating the second liquid 2903, irradiating the second liquid 2903 with ultraviolet (UV) radiation, and/or waiting a predetermined amount of time (e.g., from about 30 minutes to 24 hours, from about 1 hour to about 8 hours). In aspects, although not shown, the coating 251 can be disposed in the first recess 211 (e.g., fill the first recess 211) without contacting the first major surface 203 (e.g., first surface area 223, third surface area 233), for example, in place of the first polymer-based portion 289 in FIGS. 29-31. In further aspects, as shown in FIGS. 30-31, a second polymer-based portion 299 can be disposed in the second recess 241, for example, by dispensing a third liquid 3003 from a container 3001 (e.g., conduit, flexible tube, micropipette, or syringe) over the second central surface area 243 that can be cured to form the second polymer-based portion 299. Curing the third liquid 3003 can comprise heating the third liquid 3003, irradiating the third liquid 3003 with ultraviolet (UV) radiation, and/or waiting a predetermined amount of time (e.g., from about 30 minutes to 24 hours, from about 1 hour to about 8 hours). In further aspects, as shown in FIG. 31, an adhesive layer 261 can contact the second major surface 205 (e.g., the second surface area 225 and the fourth surface area 235). For example, the adhesive layer 261 can comprise one or more sheets of an adhesive material. In aspects, there can be an integral interface between the one or more sheets comprising the adhesive layer 261, which can reduce (e.g., avoid) optical diffraction and/or optical discontinuities as light travels between the sheets since the one or more sheets can include substantially the same index of refraction. In aspects, although not shown, at least a portion of the adhesive layer can be disposed in the second recess. In aspects, a release liner (e.g., see release liner 271 in FIG. 2) or a display device may be disposed on the adhesive layer 261 (e.g., first contact surface 263). After step 1113, 1115, or 1119, methods of the disclosure according to the flow chart in FIG. 11 of making the foldable substrate and/or foldable apparatus can be complete at step 1117.

The foldable substrate and/or foldable apparatus produced from methods discussed with reference to the flow chart in FIG. 11 can comprise one or more of the features discussed above for reducing mechanical instabilities. In aspects, a maximum first transition tensile stress of the first transition tensile stress region can be greater than or equal to the maximum central tensile stress. In aspects, the first transition average concentration of the one or more alkali-metal ions can be greater than or equal to the central average concentration of the one or more alkali-metal ions. In aspects, the first transition width of the first transition region can be less than or equal to 2.2 millimeters minus a product of the central TTV in micrometers and 0.2 millimeters per micrometer. In aspects, the first transition width of the first transition region is less than or equal to 2.2 millimeters minus a product of the central TTV in micrometers and 0.2 millimeters per micrometer.

Figure 11:
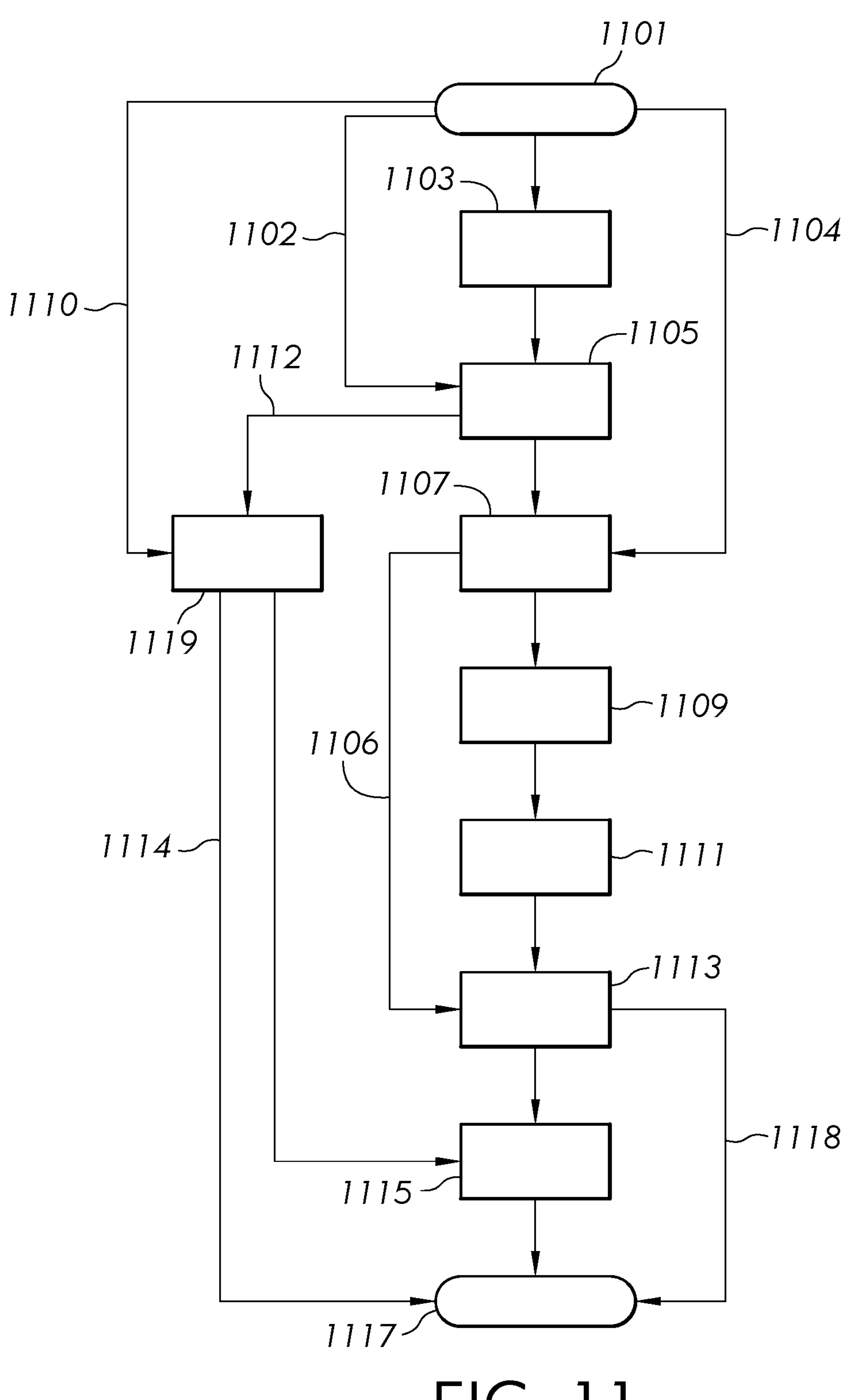

In aspects, methods of making a foldable apparatus in accordance with aspects of the disclosure can proceed along steps 1101, 1103, 1105, 1107, 1109, 1111, 1113, 1115, and 1117 of the flow chart in FIG. 11 sequentially, as discussed above. In aspects, arrow 1102 can be followed from step 1101 to step 1105, for example, when the foldable substrate 201 and/or 1205 comprises one or more compressive stress regions after step 1101. In aspects, arrow 1104 can be followed from step 1101 to step 1107, for example, when the foldable substrate 201 and/or 1205 comprises one or more compressive stress regions, a first recess 211, and/or a second recess 241 after step 1101. In aspects, arrow 1110 can be followed from step 1101 to step 1119, for example, when the foldable substrate 201 and/or 1205 comprises one or more compressive stress regions, a first recess 211, and/or a second recess 241 after step 1101. In aspects, methods can follow arrow 1112 from step 1105 to step 1119, for example, if the first transition region is to be locally heated during chemically strengthening the foldable substrate. In aspects, methods can follow arrow 1106 from step 1107 to step 1113 comprising chemically strengthening the foldable substrate 201, for example, if the foldable substrate is to be chemically strengthened in step 1113 with the alkali-metal ion-containing paste 2401, 2411, 2501, and/or 2511 disposed over the central portion 281. In aspects, methods can follow arrow 1118 from step 1113 to step 1117, for example, if the foldable apparatus fully assembled at the end of step 1113. In aspects, methods can follow arrow 1114 from step 1119 to step 1117, for example, for example, if the foldable apparatus fully assembled at the end of step 1119. Any of the above options may be combined to make a foldable apparatus in accordance with aspects of the disclosure.

EXAMPLES

Various aspects will be further clarified by the following examples. Examples A-F demonstrate example methods of aspects of the disclosure for forming a foldable apparatus 101, 301, 401, 501, or 701 comprising foldable substrate 201 shown in FIGS. 2-4 and 6-7. Examples A-F comprise a glass-based substrate (Composition 1 having a nominal composition in mol % of: 63.6 $SiO_2$; 15.7 $Al_2O_3$; 10.8 $Na_2O$; 6.2 $Li_2O$; 1.16 ZnO; 0.04 $SnO_2$; and 2.5 $P_2O_5$) with a substrate thickness 207 of 100 μm, a central thickness of 30 μm, a width of the central portion is 20 mm, a width of the first transition region is 2 mm, and a width of the second transition region is 2 mm. A critical buckling strain for the central portion of the foldable substrate is 0.0011566%. Table 1 present the treatment conditions and whether mechanical instabilities were observed for Examples A-F. Unless otherwise indicated, initial chemical strengthening and/or chemical strengthening comprised immersing the foldable substrate in a 100 wt % $KNO_3$ solution maintained at 410° C. for the period of time indicated in Table 1.

Modeled chemical strengthening induced expansion strain of the foldable substrate 201 is shown in FIG. 32. Example A comprises a foldable substrate that is only chemically strengthened after the first recess and the second recess are formed, wherein the chemical strengthening comprises immersing the foldable substrate for 5 minutes. Curve 3207, shown in triangles in FIG. 32, corresponds to Example A. Curve 3207 shows that the chemical strengthening induced expansion strain continuously and monotonically decreases as thickness increases. Consequently, a chemical strengthening induced expansion strain of the first transition region and/or the second transition region is not greater than (i.e., is less than) a chemical strengthening induced expansion strain corresponding to the central thickness (e.g., first surface area, second surface area). Example A exhibited mechanical instability, namely buckling of the central portion.

Example B comprises a foldable substrate that is chemically strengthened before and after forming the first recess and the second recess are formed, wherein the initial chemical strengthening comprises immersing the foldable substrate for 80 minutes and the post-recess chemical strengthening comprises immersing the foldable substrate for 5 minutes. Curve 3209, shown in circles in FIG. 32, corresponds to Example B. Curve 3209 shows that the chemical strengthening induced expansion strain decreases as thickness increases from 30 μm to about 70 μm and increases as thickness increases from about 70 μm to about 100 μm. Consequently, a chemical strengthening induced expansion strain of the first transition region and/or the second transition region is not greater than a chemical strengthening induced expansion strain corresponding to the central thickness (e.g., first surface area, second surface area) over the entire corresponding transition regions. Example B exhibited mechanical instability, namely buckling of the central portion.

Example C comprises the foldable substrate of Example B, but layer 1801 and/or 1901 were disposed over the central portion before the post-recess chemical strengthening and removed thereafter. The layer comprises $SiO_2$ and a maximum thickness over the first central surface area and the second central surface area of 100 nm with the thickness tapering over the first transition region and the second transition region, as shown in FIGS. 18-19. Curve 3211, shown in diamonds in FIG. 32, corresponds to Example C. Curve 3211 continuously and monotonically decreases as thickness decreases. Consequently, a chemical strengthening induced expansion strain of the first transition region and/or the second transition region is greater than a chemical strengthening induced expansion strain of the first central surface area and/or the second central surface area. No mechanical instabilities were observed for Example C.

Example D comprises the foldable substrate of Example B, but alkali-metal ion-containing layer 2203 and/or 2205 were disposed over the first central surface area and/or the second central surface area (as shown in FIGS. 21-22) before the post-recess chemical strengthening, the foldable substrate was then heated in an oven maintained at 420° C. for 20 minutes, and the pastes were removed before the post-recess chemical strengthening. The alkali-metal ion-containing layer 2203 and/or 2205 (Paste #1) consisted of sodium phosphate, sodium sulfate, and sodium nitrate. Curve 3211, shown in diamonds in FIG. 32, also corresponds to Example D. As discussed above, curve 3211 continuously and monotonically decreases as thickness decreases. Consequently, a chemical strengthening induced expansion strain of the first transition region and/or the second transition region is greater than a chemical strengthening induced expansion strain of the first central surface area and/or the second central surface area. No mechanical instabilities were observed for Example D.

Example E comprises the foldable substrate of Example B, but alkali-metal ion-containing paste 2401, 2411, 2501, and/or 2511 were disposed over the first transition region 212 and/or the second transition region 218 before the post-recess chemical strengthening, the foldable substrate was then heated in an oven maintained at 420° C. for 20 minutes (see FIG. 26), and then the pastes were removed before the post-recess chemical strengthening. The alkali-metal ion-containing paste 2401, 2411, 2501, and/or 2511 consisted of potassium phosphate and potassium sulfate. Curve 3213, shown in squares in FIG. 32, corresponds to Example E. Curve 3213 continuously and monotonically decreases as thickness decreases. Consequently, a chemical strengthening induced expansion strain of the first transition region and/or the second transition region is greater than a chemical strengthening induced expansion strain of the first central surface area and/or the second central surface area. No mechanical instabilities were observed for Example E.

Example F comprises the foldable substrate of Example B, but the first transition region 212 and second transition region 218 were locally heated with continuous wave (CW) $CO_2$ lasers during the post-recess chemical strengthening, as shown in FIG. 28. Curve 3213, shown in squares in FIG. 32, corresponds to Example F. Curve 3213 continuously and monotonically decreases as thickness decreases. Consequently, a chemical strengthening induced expansion strain of the first transition region and/or the second transition region is greater than a chemical strengthening induced expansion strain of the first central surface area and/or the second central surface area. No mechanical instabilities were observed for Example F.

TABLE 1

Treatment and Properties of Examples A-F

| Example | Initial Chemical Strengthening | Post-Recess Chemical Strengthening | Additional Treatment | Mechanical Instability? |
|---|---|---|---|---|
| A | n/a | 5 minutes | n/a | Yes |
| B | 80 minutes | 5 minutes | n/a | Yes |
| C | 80 minutes | 5 minutes | Layer | No |
| D | 80 minutes | 5 minutes | Paste #1 on central surface areas | No |
| E | 80 minutes | 5 minutes | Paste #2 on transition regions | No |
| F | 80 minutes | 5 minutes | Local Heating | No |

Examples G-H comprise the foldable substrate of Example B, but Examples G-H comprises a central TTV of 7 μm, Example G comprises a width of the first transition region and/or the second transition region of 1 mm, and Example H comprises a width of the first transition region and/or the second transition of 0.7 mm. Like Example B, Example G exhibited mechanical instability, namely buckling. However, no mechanical instability was observed for Example H. Further combination of transition width and central TTV were modeled and are reported in FIG. 33, as discussed above.

The above observations can be combined to provide foldable substrate comprising a low minimum parallel plate distance, high impact resistance, increased durability, reduced fatigue, and reduced incidence of mechanical instabilities. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) can enable a small parallel plate distance (e.g., about 10 millimeters or less) based on the reduced thickness in the central portion.

In aspects, the foldable apparatus and/or foldable substrates can comprise a plurality of recesses, for example, a first central surface area recessed from a first major surface by a first distance and a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Moreover, providing a first recess opposite a second recess can reduce a bend-induced strain of a material positioned in the first recess and/or second recess compared to a single recess with a surface recessed by the sum of the first distance and the second distance. Providing a reduced bend-induced strain of a material positioned in the first recess and/or the second recess can enable the use of a wider range of materials because of the reduced strain requirements for the material. For example, stiffer and/or more rigid materials can be positioned in the first recess, which can improve impact resistance, puncture resistance, abrasion resistance, and/or scratch resistance of the foldable apparatus. Additionally, controlling properties of a first material positioned in a first recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition region attaching the central portion to the first portion and/or a second transition region attaching the central portion to the second portion. Providing transition regions with smoothly and/or monotonically decreasing (e.g., continuously decreasing) thicknesses can reduce stress concentration in the transition regions and/or avoid optical distortions. Providing a sufficient length of the transition region(s) (e.g., about 0.5 mm or more) can avoid optical distortions that may otherwise exist from a sharp change in thickness of the foldable substrate. Providing a sufficiently small length of the transition regions (e.g., about 2 mm or less) can reduce the amount of the foldable apparatus and/or foldable substrates having an intermediate thickness that may have reduced impact resistance and/or reduced puncture resistance.

Foldable substrates, foldable apparatus, and methods of aspects of the disclosure can reduce (e.g., mitigate, eliminate) the incidence of mechanical instabilities and/or apparatus failure by controlling thickness variations and/or the dimensions of the transition regions. In aspects, a central total thickness variation (TTV) can be minimized to reduce differences in chemical strengthening induced expansion strain in the central portion. In aspects, a width of the first transition region and/or the second transition region can be minimized to reduce a total chemical strengthening induced stress exerted on the central portion by the corresponding transition regions such that a strain of the first central surface area and/or the second central surface area is less than a critical buckling strain (e.g., onset of mechanical instabilities). In aspects, a slope of the first transition region and/or the second transition region can be at least a predetermined amount to reduce an amount of the corresponding transition region comprising intermediate thicknesses, for example, comprising a chemical strengthening induced expansion strain less than a portion of the corresponding transition region closer to the first central surface area and/or the second central surface area and/or than the first central surface area and/or the second central surface area. In further aspects, minimizing the central TTV can be combined with minimizing the width of the transition regions and/or maximizing the slope of the transition regions to further reduce the incidence of mechanical instabilities.

Foldable substrates, foldable apparatus, and methods of aspects of the disclosure can reduce (e.g., mitigate, eliminate) the incidence of mechanical instabilities and/or apparatus failure by controlling a profile of chemical strengthening induced expansion strain along a length of the foldable substrate and/or foldable apparatus. For example, a chemical strengthening induced expansion strain of the first transition region and/or the second transition region can be greater than a chemical strengthening induced expansion strain on the first central surface area and/or the second central surface area (e.g., central portion) by controlling a relationship between a maximum tensile stress and/or an average concentration of one or more alkali-metal ions between these regions. In aspects, providing a maximum first transition tensile stress and/or a maximum second transition tensile stress greater than or equal to a maximum central tensile stress can reduce the incidence of mechanical instabilities (e.g., of the central portion). In aspects, providing a first transition average concentration of one or more alkali metal ions (e.g., potassium) and/or a second transition average concentration of one or more alkali metal ions (e.g., potassium) greater than a central average concentration of one or more alkali metal ions (e.g., potassium) can reduce an incidence of mechanical instabilities (e.g., of the central portion).

Methods of the disclosure can enable making foldable substrates comprising one or more of the above-mentioned benefits. Further, methods can provide one or more of the above relationships throughout the methods—not just in the final foldable substrate. For example, after the first recess and/or second recess are formed or provided, a chemical strengthening induced expansion strain of the first transition region and/or the second transition region can be greater than a chemical strengthening induced expansion strain on the first central surface area and/or the second central surface area (e.g., central portion) by controlling a relationship between a maximum tensile stress and/or an average concentration of one or more alkali-metal ions between these regions throughout the remaining steps in the methods.

In aspects, one or more of the above relationships can be maintained by reducing or reversing chemical strengthening of the central portion relative to the first portion and/or the second portion. In further aspects, a layer can be disposed over the central portion with a decreased diffusivity of one or more alkali metal ions to reduce a chemical strengthening induced expansion strain on the first central surface area and/or the second central surface area. In even further aspects, tapering a thickness of the layer over the first transition region and/or the second transition region can provide chemical strengthening induced expansion strain of the corresponding transition regions greater than chemical strengthening induced expansion strain of the first central surface area and/or the second central surface area, which can reduce the incidence of mechanical instabilities. In further aspects, an alkali-metal ion-containing paste comprising sodium and/or lithium can be disposed over the central portion (e.g., first central surface area and/or the second central surface area) to decrease (e.g., relatively or absolutely) a chemical strengthening induced expansion strain of the corresponding portion by exchanging larger alkali-metal ions in the corresponding portion for smaller alkali-metal ions in the alkali-metal ion-containing paste, which can reduce an incidence of mechanical instabilities.

In aspects, one or more of the above relationships can be maintained by increasing chemical strengthening of the first transition region and/or the second transition region relative to the central portion (e.g., first central surface area and/or the second central surface area). In further aspects, an alkali-metal ion-containing paste can be disposed over the first transition region and/or the second transition region to increase a chemical strengthening induced expansion strain of the corresponding transition regions. In even further aspects, tapering a thickness of the alkali-metal ion-containing paste over the first transition region and/or the second transition region away from a midline of the corresponding transition region can further provide the relationship between chemical strengthening induced expansion strain of the different portions of the foldable substrate discussed above. In further aspects, a diffusivity of one or more alkali metal ions can be locally increased for the first transition region and/or the second transition region, for example, by locally heating the corresponding regions during chemically strengthening the foldable substrate. Chemically strengthening the central portion to an extent can achieve greater compressive stresses without encountering mechanical deformation and/or mechanical instability, and the greater compressive stresses can further increase the impact and/or puncture resistance of the foldable substrate.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A foldable substrate comprising:

a substrate thickness in a range from about 60 micrometers to about 2 millimeters defined between a first major surface and a second major surface opposite the first major surface;

a first portion comprising the substrate thickness, a first compressive stress region extending from a first surface area of the first major surface, and a second compressive stress region extending from a second surface area of the second major surface;

a second portion comprising the substrate thickness, a third compressive stress region extending from a third surface area of the first major surface, and a fourth compressive stress region extending from a fourth surface area of the second major surface; and a central portion positioned between the first portion and the second portion, the central portion comprising:

a central thickness less than the substrate thickness and in a range from about 25 micrometers to about 80 micrometers defined between a first central surface area and a second central surface area opposite the first central surface area, a first central compressive stress region extending from the first central surface area, a second central compressive stress region extending from the second central surface area, and a central total thickness variation (TTV) of the central portion over the first central surface area is less than or equal to 10 micrometers;

a first transition region comprising a first transition surface area extending between the first surface area and the first central surface area, a second transition surface area extending between the second surface area and the second central surface area, a first transition compressive stress region extending from the first transition surface area, and a second transition compressive stress region extending from the second transition surface area; and a second transition region comprising a third transition surface area extending between the third surface area and the first central surface area, a fourth transition surface area extending between the fourth surface area and the second central surface area, a third transition compressive stress region extending from the third transition surface area, and a fourth transition compressive stress region extending from the fourth transition surface area, wherein the first central surface area is recessed from the first major surface by a first distance, a thickness of the first transition region smoothly and monotonically decreases between the substrate thickness of the first portion and the central thickness of the central portion, a thickness of the second transition region smoothly and monotonically decreases between the substrate thickness of the second portion and the central thickness of the central portion, and a first transition width of the first transition region is less than or equal to 2.2 millimeters minus a product of the central TTV in micrometers and 0.2 millimeters per micrometer.

2. The foldable substrate of claim 1, wherein the central TTV is about 7 micrometers or less and the second transition width is in a range from about 0.5 millimeters to about 0.8 millimeters.

3. The foldable substrate of claim 1, wherein the first transition surface area comprises a first average transition slope, the third transition surface area comprises a second average transition slope, and the first average transition slope in millimeters per millimeter is greater than or equal to 5 micrometers per millimeter times a quotient of a first quantity in millimeters consisting of the substrate thickness minus the central thickness and a second quantity in micrometers consisting of 11 micrometers minus the central TTV.

4. The foldable substrate of claim 3, wherein the central TTV is about 5 micrometers or less, and the first average transition slope is about 0.058 millimeters per millimeters or more.

5. The foldable substrate of claim 1, further comprising:

a central tensile stress region comprising a maximum central tensile stress positioned between the first central compressive stress region and the second central compressive stress region;

a first transition tensile stress region comprising a maximum first transition tensile stress positioned between the first transition compressive stress region and the second transition compressive stress region; and a second transition tensile stress region comprising a maximum second transition tensile stress positioned between the third transition compressive stress region and the fourth transition compressive stress region, wherein the maximum first transition tensile stress is greater than or equal to the maximum central tensile stress.

6. The foldable substrate of claim 1, further comprising:

a central average concentration of one or more alkali-metal ions associated with the first central compressive stress region and the second central compressive stress region;

a first transition average concentration of one or more alkali-metal ions associated with the first transition compressive stress region and the second transition compressive stress region; and a second transition average concentration of one or more alkali-metal ions associated with the third transition compressive stress region and the fourth transition compressive stress region, wherein the first transition average concentration of the one or more alkali-metal ions is greater than or equal to the central average concentration of the one or more alkali-metal ions.

7. The foldable substrate of claim 1, wherein the foldable substrate comprises a glass-based substrate or a ceramic-based substrate.

8. The foldable substrate of claim 1, wherein the foldable substrate achieves an effective bend radius of 5 millimeters.

9. The foldable substrate of claim 1, wherein the foldable substrate comprises a minimum effective bend radius in a range from about 1 millimeter to about 5 millimeters.

* * * * *